United States Patent
Lietz et al.

(10) Patent No.: US 10,360,062 B2
(45) Date of Patent: Jul. 23, 2019

(54) SYSTEM AND METHOD FOR PROVIDING A SELF-MONITORING, SELF-REPORTING, AND SELF-REPAIRING VIRTUAL ASSET CONFIGURED FOR EXTRUSION AND INTRUSION DETECTION AND THREAT SCORING IN A CLOUD COMPUTING ENVIRONMENT

(71) Applicant: Intuit Inc., Mountain View, CA (US)

(72) Inventors: M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 15/903,963

(22) Filed: Feb. 23, 2018

(65) Prior Publication Data

US 2018/0191753 A1    Jul. 5, 2018

Related U.S. Application Data

(60) Division of application No. 15/581,835, filed on Apr. 28, 2017, now Pat. No. 9,923,909, which is a
(Continued)

(51) Int. Cl.
    *G06F 21/55*    (2013.01)
    *G06F 21/50*    (2013.01)
    (Continued)

(52) U.S. Cl.
    CPC .......... *G06F 9/45558* (2013.01); *G06F 21/50* (2013.01); *G06F 21/55* (2013.01);
    (Continued)

(58) Field of Classification Search
    CPC ............... H04L 63/14–1433; G06F 21/55–554
    See application file for complete search history.

(56) References Cited

U.S. PATENT DOCUMENTS 5,712,641 A    1/1998    Casabona et al.
5,731,991 A    3/1998    Kinra et al.
(Continued)

FOREIGN PATENT DOCUMENTS

CN    101374051    2/2009
EP    2 541 420    1/2013
(Continued)

OTHER PUBLICATIONS

Tupakula, et al.; "Security Techniques for Zero Day Attacks;" Proceedings of the 7th International Wireless Communications and Mobile Computing Conference; Jul. 4-8, 2011; IEEE.
(Continued)

*Primary Examiner* — Daniel B Potratz
(74) *Attorney, Agent, or Firm* — Hawley Troxell Ennis & Hawley LLP; Philip McKay

(57) ABSTRACT

A trigger event monitoring system is provided in one or more virtual assets. One or more trigger parameters, including security threat patterns, are defined and trigger data is generated. The one or more trigger monitoring systems are used to monitor extrusion and intrusion capabilities and self-monitored trigger events that may harm or otherwise leave a virtual asset in a vulnerable state. In one embodiment, trigger events and monitoring of at least a portion of message traffic sent to, or sent from, the one or more virtual assets are initiated and/or performed to detect any message including one or more of the one or more of the trigger parameters. Any message meeting the one or more trigger parameters is identified as a potential security threat and is assigned a threat score, which is provided to the virtual asset. Various corrective actions may take place.

22 Claims, 7 Drawing Sheets

Related U.S. Application Data continuation of application No. 14/256,289, filed on Apr. 18, 2014, now abandoned, and a continuation of application No. 15/067,528, filed on Mar. 11, 2016, now Pat. No. 9,686,301, and a continuation of application No. 14/171,438, filed on Feb. 3, 2014, now Pat. No. 9,325,726, which is a continuation of application No. 14/292,700, filed on May 30, 2014, now Pat. No. 9,342,690.

(51) Int. Cl.
    *H04L 29/06*     (2006.01)
    *G06F 9/455*     (2018.01)
    *H04L 12/24*     (2006.01)

(52) U.S. Cl.
    CPC ...... *H04L 41/0886* (2013.01); *H04L 41/5025* (2013.01); *H04L 41/5032* (2013.01); *H04L 63/14* (2013.01); *H04L 63/1408* (2013.01); *H04L 63/1416* (2013.01); *H04L 63/1425* (2013.01); *H04L 63/1433* (2013.01); *G06F 2009/45591* (2013.01); *G06F 2009/45595* (2013.01); *H04L 41/5096* (2013.01)

(56) References Cited

U.S. PATENT DOCUMENTS

| | | | |
|---|---|---|---|
| 5,732,218 A | 3/1998 | Bland et al. | |
| 6,085,224 A | 7/2000 | Wagner | |
| 6,178,452 B1 | 1/2001 | Miyamoto | |
| 6,202,066 B1 | 3/2001 | Barkley et al. | |
| 6,205,552 B1 | 3/2001 | Fudge | |
| 6,321,338 B1 | 11/2001 | Porras et al. | |
| 6,343,236 B1 | 1/2002 | Gibson et al. | |
| 6,549,932 B1 | 4/2003 | McNally et al. | |
| 6,651,183 B1 | 11/2003 | Gensler et al. | |
| 7,055,062 B2 | 5/2006 | Shah et al. | |
| 7,114,183 B1 | 9/2006 | Joiner | |
| 7,228,438 B2 | 6/2007 | Bushmitch et al. | |
| 7,292,990 B2 | 11/2007 | Hughes | |
| 7,296,261 B2 | 11/2007 | Witchel et al. | |
| 7,373,524 B2 | 5/2008 | Motsinger et al. | |
| 7,426,745 B2 | 9/2008 | McCarty | |
| 7,437,764 B1 | 10/2008 | Sobel et al. | |
| 7,506,371 B1 | 3/2009 | Ben-Natan | |
| 7,552,424 B1 | 6/2009 | Bischof et al. | |
| 7,574,746 B2 | 8/2009 | Hill et al. | |
| 7,577,722 B1 | 8/2009 | Khandekar et al. | |
| 7,596,625 B2 | 9/2009 | Manion et al. | |
| 7,600,153 B2 | 10/2009 | Cabrera et al. | |
| 7,640,458 B2 | 12/2009 | Rao et al. | |
| 7,761,923 B2 | 7/2010 | Khuti et al. | |
| 7,779,247 B2 | 8/2010 | Roegner | |
| 7,788,235 B1 | 8/2010 | Yeo | |
| 7,792,256 B1 | 9/2010 | Arledge et al. | |
| 7,831,570 B2 | 11/2010 | Sack et al. | |
| 7,836,506 B2 | 11/2010 | Liu | |
| 7,908,658 B1 | 3/2011 | Oeij | |
| 7,925,527 B1 | 4/2011 | Flam | |
| 7,925,923 B1 | 4/2011 | Hyser et al. | |
| 7,934,229 B1 | 4/2011 | Vogel | |
| 7,944,355 B2 | 5/2011 | Kumar et al. | |
| 7,996,836 B1 | 8/2011 | McCorkendale et al. | |
| 8,001,422 B1 | 8/2011 | Sun et al. | |
| 8,095,962 B2 | 1/2012 | Condon | |
| 8,108,855 B2 | 1/2012 | Dias et al. | |
| 8,132,231 B2 | 3/2012 | Amies et al. | |
| 8,161,475 B2 | 4/2012 | Araujo, Jr. et al. | |
| 8,171,485 B2 | 5/2012 | Muller | |
| 8,171,554 B2 | 5/2012 | Elovici et al. | |
| 8,181,036 B1 | 5/2012 | Nachenberg | |
| 8,191,149 B2 | 5/2012 | Yun et al. | |
| 8,266,284 B2 | 9/2012 | Iverson | |
| 8,266,670 B1 | 9/2012 | Merkow et al. | |
| 8,281,399 B1 | 10/2012 | Chen et al. | |
| 8,312,516 B1 | 11/2012 | Malatesta | |
| 8,325,727 B2 | 12/2012 | Eddleston et al. | |
| 8,327,373 B2 | 12/2012 | Srinivasan | |
| 8,341,625 B2 | 12/2012 | Ferris et al. | |
| 8,347,281 B2 | 1/2013 | Arsenault et al. | |
| 8,381,289 B1 | 2/2013 | Pereira et al. | |
| 8,392,496 B2 | 3/2013 | Linden et al. | |
| 8,424,091 B1 | 4/2013 | Su et al. | |
| 8,438,643 B2 | 5/2013 | Wiemer et al. | |
| 8,510,821 B1 | 8/2013 | Brandwine et al. | |
| 8,527,631 B1 | 9/2013 | Liang | |
| 8,555,388 B1 | 10/2013 | Wang et al. | |
| 8,561,126 B2 | 10/2013 | Ananthanarayanan et al. | |
| 8,561,127 B1 | 10/2013 | Agrawal et al. | |
| 8,566,932 B1 | 10/2013 | Hotta et al. | |
| 8,566,946 B1 * | 10/2013 | Aziz | G06F 21/554 726/25 |
| 8,572,733 B1 | 10/2013 | Rockwood | |
| 8,574,085 B1 | 11/2013 | Jackson | |
| 8,615,785 B2 | 12/2013 | Elrod et al. | |
| 8,621,618 B1 | 12/2013 | Ramsey et al. | |
| 8,639,923 B2 | 1/2014 | Lo et al. | |
| 8,656,482 B1 | 2/2014 | Tosa et al. | |
| 8,683,585 B1 | 3/2014 | Chen et al. | |
| 8,688,820 B1 | 4/2014 | Bhogi et al. | |
| 8,726,383 B2 | 5/2014 | Blackwell | |
| 8,776,050 B2 | 7/2014 | Plouffe et al. | |
| 8,789,187 B1 | 7/2014 | Pennington et al. | |
| 8,799,431 B2 | 8/2014 | Pabari | |
| 8,800,029 B2 | 8/2014 | Horn et al. | |
| 8,813,225 B1 | 8/2014 | Fuller et al. | |
| 8,863,284 B1 | 10/2014 | Polyakov et al. | |
| 8,869,036 B1 | 10/2014 | Deshpande et al. | |
| 8,918,785 B1 | 12/2014 | Brandwine et al. | |
| 8,959,633 B1 | 2/2015 | Dokey et al. | |
| 8,990,935 B1 | 3/2015 | Cutts | |
| 9,015,795 B2 | 4/2015 | B'Far et al. | |
| 9,027,135 B1 | 5/2015 | Aziz | |
| 9,047,582 B2 | 6/2015 | Hutchinson et al. | |
| 9,049,105 B1 | 6/2015 | Feinstein et al. | |
| 9,112,841 B1 | 8/2015 | Brandwine et al. | |
| 9,215,153 B2 | 12/2015 | DeLuca et al. | |
| 9,245,117 B2 | 1/2016 | Weaver et al. | |
| 9,246,935 B2 | 1/2016 | Lietz et al. | |
| 9,270,690 B2 | 2/2016 | Kraitsman et al. | |
| 9,276,945 B2 | 3/2016 | Lietz et al. | |
| 9,298,927 B2 | 3/2016 | Lietz et al. | |
| 9,313,281 B1 | 4/2016 | Lietz et al. | |
| 9,319,415 B2 | 4/2016 | Lietz et al. | |
| 9,323,926 B2 | 4/2016 | Cabrera et al. | |
| 9,325,726 B2 | 4/2016 | Lietz et al. | |
| 9,330,263 B2 | 5/2016 | Cabrera et al. | |
| 9,342,690 B2 | 5/2016 | Lietz et al. | |
| 9,374,389 B2 | 6/2016 | Bishop et al. | |
| 9,390,288 B2 | 7/2016 | Gryb et al. | |
| 9,418,236 B2 | 8/2016 | Cabrera et al. | |
| 9,459,987 B2 | 10/2016 | Weaver et al. | |
| 9,473,481 B2 | 10/2016 | Lietz et al. | |
| 9,501,345 B1 | 11/2016 | Lietz et al. | |
| 9,516,044 B2 | 12/2016 | Lietz et al. | |
| 9,686,301 B2 | 6/2017 | Lietz et al. | |
| 9,811,435 B2 | 11/2017 | Babakhan et al. | |
| 9,866,581 B2 | 1/2018 | Lietz et al. | |
| 2002/0066034 A1 | 5/2002 | Schlossberg et al. | |
| 2002/0099992 A1 | 7/2002 | Distler et al. | |
| 2002/0103801 A1 | 8/2002 | Lyons | |
| 2002/0116404 A1 | 8/2002 | Cha et al. | |
| 2002/0138416 A1 | 9/2002 | Lovejoy et al. | |
| 2002/0147803 A1 | 10/2002 | Dodd et al. | |
| 2002/0156904 A1 | 10/2002 | Gullotta et al. | |
| 2003/0037263 A1 | 2/2003 | Kamat et al. | |
| 2003/0046128 A1 | 3/2003 | Heinrich | |
| 2003/0051154 A1 | 3/2003 | Barton et al. | |
| 2003/0084327 A1 | 5/2003 | Lingafelt et al. | |
| 2003/0088791 A1 | 5/2003 | Porras et al. | |
| 2003/0110392 A1 | 6/2003 | Aucsmith et al. | |
| 2003/0188191 A1 | 10/2003 | Aaron et al. | |
| 2003/0195959 A1 | 10/2003 | Labadie et al. | |

(56) References Cited

U.S. PATENT DOCUMENTS

| | | |
|---|---|---|
| 2003/0233438 A1 | 12/2003 | Hutchinson et al. |
| 2004/0006704 A1 | 1/2004 | Dahlstrom et al. |
| 2004/0010571 A1 | 1/2004 | Hutchinson et al. |
| 2004/0044891 A1 | 3/2004 | Hanzlik et al. |
| 2004/0044912 A1 | 3/2004 | Connary et al. |
| 2004/0181775 A1 | 9/2004 | Anonsen et al. |
| 2004/0237093 A1 | 11/2004 | Sluiman et al. |
| 2004/0249973 A1 | 12/2004 | Alkhatib et al. |
| 2004/0249974 A1 | 12/2004 | Alkhatib et al. |
| 2005/0018618 A1 | 1/2005 | Mualem et al. |
| 2005/0066309 A1 | 3/2005 | Creamer et al. |
| 2005/0091304 A1 | 4/2005 | Trayler |
| 2005/0108571 A1 | 5/2005 | Lu et al. |
| 2005/0114836 A1 | 5/2005 | Fu |
| 2005/0155013 A1 | 7/2005 | Carrigan |
| 2005/0172162 A1 | 8/2005 | Takahashi et al. |
| 2005/0182969 A1 | 8/2005 | Ginter et al. |
| 2005/0183138 A1 | 8/2005 | Phillips et al. |
| 2005/0188222 A1 | 8/2005 | Motsinger et al. |
| 2005/0193231 A1 | 9/2005 | Scheuren |
| 2005/0193269 A1 | 9/2005 | Haswell et al. |
| 2005/0204151 A1 | 9/2005 | Fang et al. |
| 2005/0278790 A1 | 12/2005 | Birk et al. |
| 2006/0031407 A1 | 2/2006 | Dispensa et al. |
| 2006/0037077 A1 | 2/2006 | Gadde et al. |
| 2006/0042483 A1 | 3/2006 | Work et al. |
| 2006/0064740 A1 | 3/2006 | Kelley et al. |
| 2006/0090206 A1 | 4/2006 | Ladner et al. |
| 2006/0101519 A1 | 5/2006 | Lasswell et al. |
| 2006/0101520 A1 | 5/2006 | Schumaker et al. |
| 2006/0117209 A1 | 6/2006 | Drouet et al. |
| 2006/0136720 A1 | 6/2006 | Armstrong et al. |
| 2006/0184838 A1 | 8/2006 | Singonahalli et al. |
| 2006/0195745 A1 | 8/2006 | Keromytis et al. |
| 2006/0203739 A1 | 9/2006 | Padmanabhan et al. |
| 2006/0248573 A1 | 11/2006 | Pannu et al. |
| 2006/0272018 A1 | 11/2006 | Fouant |
| 2006/0293940 A1 | 12/2006 | Tsyganskiy et al. |
| 2007/0006304 A1 | 1/2007 | Kramer et al. |
| 2007/0027999 A1 | 2/2007 | Allen et al. |
| 2007/0043860 A1 | 2/2007 | Pabari |
| 2007/0073630 A1 | 3/2007 | Greene et al. |
| 2007/0079168 A1 | 4/2007 | Sivakumar et al. |
| 2007/0094711 A1 | 4/2007 | Corley et al. |
| 2007/0101400 A1 | 5/2007 | Freeman et al. |
| 2007/0157311 A1 | 7/2007 | Meier et al. |
| 2007/0169194 A1 | 7/2007 | Church et al. |
| 2007/0169204 A1 | 7/2007 | Janakiraman et al. |
| 2007/0180509 A1 | 8/2007 | Swartz et al. |
| 2007/0185875 A1 | 8/2007 | Chang et al. |
| 2007/0204346 A1 | 8/2007 | Meier |
| 2007/0250424 A1 | 10/2007 | Kothari |
| 2008/0005223 A1 | 1/2008 | Flake et al. |
| 2008/0016570 A1 | 1/2008 | Capalik |
| 2008/0025288 A1 | 1/2008 | Benner et al. |
| 2008/0044018 A1 | 2/2008 | Scrimsher et al. |
| 2008/0141332 A1 | 6/2008 | Treinen |
| 2008/0148398 A1 | 6/2008 | Mezack et al. |
| 2008/0177691 A1 | 7/2008 | Alperovitch et al. |
| 2008/0184079 A1 | 7/2008 | Merriman et al. |
| 2008/0244744 A1 | 10/2008 | Thomas et al. |
| 2008/0256639 A1 | 10/2008 | Onoda et al. |
| 2008/0262990 A1 | 10/2008 | Kapoor et al. |
| 2008/0263670 A1 | 10/2008 | Stavrica |
| 2008/0295076 A1 | 11/2008 | McKain et al. |
| 2008/0307525 A1 | 12/2008 | Nickle |
| 2009/0007100 A1 | 1/2009 | Field et al. |
| 2009/0007264 A1 | 1/2009 | Chatterjee et al. |
| 2009/0049553 A1 | 2/2009 | Vasudeva |
| 2009/0083695 A1 | 3/2009 | Mir et al. |
| 2009/0089682 A1 | 4/2009 | Baier et al. |
| 2009/0089860 A1 | 4/2009 | Forrester et al. |
| 2009/0103539 A1 | 4/2009 | Keeler et al. |
| 2009/0106838 A1 | 4/2009 | Clark et al. |
| 2009/0172788 A1 | 7/2009 | Vedula et al. |
| 2009/0177717 A1 | 7/2009 | Meehan et al. |
| 2009/0199273 A1 | 8/2009 | Yalamanchi |
| 2009/0205039 A1 | 8/2009 | Ormazabal et al. |
| 2009/0228294 A1 | 9/2009 | Choi et al. |
| 2009/0228973 A1 | 9/2009 | Kumar et al. |
| 2009/0254970 A1 | 10/2009 | Agarwal et al. |
| 2009/0254990 A1 | 10/2009 | McGee |
| 2009/0288078 A1 | 11/2009 | Makonahalli et al. |
| 2009/0293056 A1 | 11/2009 | Ferris et al. |
| 2009/0300045 A1 | 12/2009 | Chaudhry et al. |
| 2009/0300423 A1 | 12/2009 | Ferris |
| 2009/0300720 A1 | 12/2009 | Guo et al. |
| 2009/0319527 A1 | 12/2009 | King et al. |
| 2009/0328209 A1* | 12/2009 | Nachenberg ........... G06Q 10/10 726/22 |
| 2010/0005099 A1 | 1/2010 | Goodman et al. |
| 2010/0020700 A1 | 1/2010 | Kailash et al. |
| 2010/0030544 A1 | 2/2010 | Gopalan et al. |
| 2010/0030878 A1 | 2/2010 | Grabowski et al. |
| 2010/0042734 A1 | 2/2010 | Olafsson et al. |
| 2010/0057660 A1 | 3/2010 | Kato |
| 2010/0070964 A1 | 3/2010 | Blumfield et al. |
| 2010/0076987 A1 | 3/2010 | Schreiner |
| 2010/0077203 A1 | 3/2010 | Ogawa et al. |
| 2010/0114744 A1 | 5/2010 | Gonen |
| 2010/0122317 A1 | 5/2010 | Yadav |
| 2010/0169192 A1 | 7/2010 | Zoldi et al. |
| 2010/0175108 A1 | 7/2010 | Protas |
| 2010/0192220 A1 | 7/2010 | Heizmann et al. |
| 2010/0199351 A1 | 8/2010 | Protas |
| 2010/0212010 A1 | 8/2010 | Stringer et al. |
| 2010/0217850 A1 | 8/2010 | Ferris |
| 2010/0235828 A1 | 9/2010 | Nishimura et al. |
| 2010/0251004 A1* | 9/2010 | Schuba .................. G06F 21/55 714/3 |
| 2010/0251363 A1 | 9/2010 | Todorovic |
| 2010/0257267 A1 | 10/2010 | Sohn et al. |
| 2010/0257580 A1 | 10/2010 | Zhao |
| 2010/0257599 A1 | 10/2010 | Gleichauf |
| 2010/0269121 A1 | 10/2010 | Montesissa et al. |
| 2010/0280958 A1 | 11/2010 | Hasson et al. |
| 2010/0287530 A1 | 11/2010 | MacLean et al. |
| 2010/0293094 A1 | 11/2010 | Kolkowitz et al. |
| 2010/0306268 A1 | 12/2010 | Bhatti et al. |
| 2010/0306354 A1 | 12/2010 | DeHaan et al. |
| 2010/0306772 A1 | 12/2010 | Arnold et al. |
| 2010/0318481 A1 | 12/2010 | Feynman |
| 2011/0029957 A1 | 2/2011 | Shufer et al. |
| 2011/0034182 A1 | 2/2011 | Issa et al. |
| 2011/0040825 A1 | 2/2011 | Ramzan et al. |
| 2011/0047621 A1 | 2/2011 | Brando et al. |
| 2011/0055921 A1 | 3/2011 | Narayanaswamy et al. |
| 2011/0067097 A1 | 3/2011 | Park et al. |
| 2011/0101109 A1 | 5/2011 | Bona et al. |
| 2011/0107398 A1 | 5/2011 | Earl et al. |
| 2011/0138382 A1 | 6/2011 | Hauser et al. |
| 2011/0138469 A1 | 6/2011 | Ye et al. |
| 2011/0145657 A1 | 6/2011 | Bishop et al. |
| 2011/0154324 A1 | 6/2011 | Pagan et al. |
| 2011/0167494 A1* | 7/2011 | Bowen .................. G06F 21/566 726/24 |
| 2011/0173699 A1* | 7/2011 | Figlin ................. H04L 63/1408 726/23 |
| 2011/0185421 A1 | 7/2011 | Wittenstein et al. |
| 2011/0197065 A1 | 8/2011 | Stauth et al. |
| 2011/0202551 A1 | 8/2011 | Agrawal |
| 2011/0208677 A1 | 8/2011 | Zhou et al. |
| 2011/0208797 A1 | 8/2011 | Kim |
| 2011/0238855 A1 | 9/2011 | Korsunsky et al. |
| 2011/0249970 A1 | 10/2011 | Eddleston et al. |
| 2011/0258692 A1 | 10/2011 | Morrison et al. |
| 2011/0276468 A1 | 11/2011 | Lewis et al. |
| 2011/0296519 A1 | 12/2011 | Ide et al. |
| 2011/0302415 A1 | 12/2011 | Ahmad et al. |
| 2012/0005750 A1 | 1/2012 | Satish |
| 2012/0011510 A1 | 1/2012 | Yamakabe |
| 2012/0030767 A1 | 2/2012 | Rippert et al. |
| 2012/0039336 A1 | 2/2012 | Richmond et al. |
| 2012/0042362 A1 | 2/2012 | Vlasov et al. |

(56) References Cited

U.S. PATENT DOCUMENTS

| | | |
|---|---|---|
| 2012/0060207 A1 | 3/2012 | Mardikar et al. |
| 2012/0072985 A1 | 3/2012 | Davne et al. |
| 2012/0084856 A1 | 4/2012 | Horn et al. |
| 2012/0110672 A1 | 5/2012 | Judge et al. |
| 2012/0117654 A1 | 5/2012 | Yalakanti |
| 2012/0137367 A1 | 5/2012 | Dupont et al. |
| 2012/0144489 A1 | 6/2012 | Jarrett et al. |
| 2012/0151488 A1 | 6/2012 | Arcese et al. |
| 2012/0151553 A1 | 6/2012 | Burgess et al. |
| 2012/0167167 A1 | 6/2012 | Kruger et al. |
| 2012/0174219 A1 | 7/2012 | Hernandez et al. |
| 2012/0185390 A1 | 7/2012 | Palnitkar et al. |
| 2012/0185913 A1 | 7/2012 | Martinez et al. |
| 2012/0209947 A1 | 8/2012 | Glaser et al. |
| 2012/0210425 A1 | 8/2012 | Porras et al. |
| 2012/0210437 A1 | 8/2012 | Karande et al. |
| 2012/0233668 A1 | 9/2012 | Leafe et al. |
| 2012/0239557 A1 | 9/2012 | Weinflash et al. |
| 2012/0240193 A1 | 9/2012 | Littlefield et al. |
| 2012/0266167 A1 | 10/2012 | Spiers et al. |
| 2012/0278886 A1 | 11/2012 | Luna |
| 2012/0291094 A9 | 11/2012 | Forrester et al. |
| 2012/0303776 A1 | 11/2012 | Ferris |
| 2012/0304300 A1 | 11/2012 | LaBumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0317644 A1* | 12/2012 | Kumar ................ G06F 21/552 726/24 |
| 2012/0324446 A1 | 12/2012 | Fries et al. |
| 2012/0324572 A1 | 12/2012 | Gordon et al. |
| 2012/0324576 A1 | 12/2012 | Clark et al. |
| 2013/0018972 A1 | 1/2013 | Sargent et al. |
| 2013/0019242 A1 | 1/2013 | Chen et al. |
| 2013/0019314 A1 | 1/2013 | Ji et al. |
| 2013/0046667 A1 | 2/2013 | Hill et al. |
| 2013/0054792 A1 | 2/2013 | Sharaf |
| 2013/0055246 A1 | 2/2013 | Li et al. |
| 2013/0055398 A1 | 2/2013 | Li et al. |
| 2013/0067067 A1 | 3/2013 | Miri et al. |
| 2013/0074181 A1* | 3/2013 | Singh ................ H04L 41/0668 726/22 |
| 2013/0091376 A1 | 4/2013 | Raspudic et al. |
| 2013/0097316 A1 | 4/2013 | Bender et al. |
| 2013/0097701 A1 | 4/2013 | Moyle et al. |
| 2013/0104237 A1 | 4/2013 | Riley et al. |
| 2013/0117567 A1 | 5/2013 | Chang et al. |
| 2013/0117809 A1 | 5/2013 | McDougal et al. |
| 2013/0117852 A1 | 5/2013 | Stute |
| 2013/0124644 A1 | 5/2013 | Hunt et al. |
| 2013/0124712 A1 | 5/2013 | Parker |
| 2013/0125121 A1 | 5/2013 | White |
| 2013/0132854 A1 | 5/2013 | Raleigh et al. |
| 2013/0132950 A1* | 5/2013 | McLeod ................ G06F 8/63 718/1 |
| 2013/0133072 A1 | 5/2013 | Kraitsman et al. |
| 2013/0160072 A1 | 6/2013 | Reus et al. |
| 2013/0174259 A1 | 7/2013 | Pearcy et al. |
| 2013/0185795 A1 | 7/2013 | Winn et al. |
| 2013/0227695 A1 | 8/2013 | Shankar |
| 2013/0238786 A1 | 9/2013 | Khesin |
| 2013/0247133 A1 | 9/2013 | Price et al. |
| 2013/0247135 A1 | 9/2013 | Kundu et al. |
| 2013/0247206 A1 | 9/2013 | Hugard et al. |
| 2013/0247207 A1 | 9/2013 | Hugard et al. |
| 2013/0263209 A1 | 10/2013 | Panuganty |
| 2013/0263226 A1 | 10/2013 | Sudia |
| 2013/0268994 A1 | 10/2013 | Cooper et al. |
| 2013/0276108 A1 | 10/2013 | Blackwell |
| 2013/0276152 A1 | 10/2013 | Hirsch et al. |
| 2013/0290694 A1 | 10/2013 | Civilini et al. |
| 2013/0291068 A1 | 10/2013 | Huang |
| 2013/0291087 A1 | 10/2013 | Kailash et al. |
| 2013/0304693 A1 | 11/2013 | Jaeger et al. |
| 2013/0305357 A1 | 11/2013 | Ayyagari et al. |
| 2013/0305369 A1 | 11/2013 | Karta et al. |
| 2013/0305371 A1 | 11/2013 | Figlin et al. |
| 2013/0318599 A1 | 11/2013 | Fadida et al. |
| 2013/0326580 A1 | 12/2013 | Barclay et al. |
| 2013/0333040 A1 | 12/2013 | Diehl et al. |
| 2013/0339514 A1 | 12/2013 | Crank et al. |
| 2013/0343207 A1 | 12/2013 | Cook et al. |
| 2013/0346596 A1 | 12/2013 | Balakrishnan et al. |
| 2013/0347131 A1 | 12/2013 | Mooring et al. |
| 2014/0013452 A1 | 1/2014 | Aissi et al. |
| 2014/0026122 A1 | 1/2014 | Markande et al. |
| 2014/0026179 A1 | 1/2014 | Devarajan et al. |
| 2014/0026231 A1 | 1/2014 | Barak et al. |
| 2014/0033200 A1 | 1/2014 | Tompkins |
| 2014/0040299 A1 | 2/2014 | Datla et al. |
| 2014/0047546 A1 | 2/2014 | Sidagni |
| 2014/0068784 A1 | 3/2014 | Merkow et al. |
| 2014/0074560 A1 | 3/2014 | B'Far et al. |
| 2014/0074799 A1 | 3/2014 | Karampuri et al. |
| 2014/0081681 A1 | 3/2014 | Sundaresan |
| 2014/0082621 A1 | 3/2014 | Fitzgerald et al. |
| 2014/0082733 A1 | 3/2014 | Benefield |
| 2014/0089204 A1 | 3/2014 | Spies et al. |
| 2014/0096134 A1* | 4/2014 | Barak ................ G06F 9/45558 718/1 |
| 2014/0109192 A1 | 4/2014 | Pidault et al. |
| 2014/0115578 A1 | 4/2014 | Cooper et al. |
| 2014/0137199 A1 | 5/2014 | Hefetz |
| 2014/0137257 A1* | 5/2014 | Martinez ............ H04L 63/1433 726/25 |
| 2014/0165130 A1 | 6/2014 | Zaitsev |
| 2014/0172806 A1 | 6/2014 | Wilding |
| 2014/0173738 A1 | 6/2014 | Condry et al. |
| 2014/0189090 A1* | 7/2014 | Mikkilineni ........ H04L 41/0886 709/223 |
| 2014/0189680 A1 | 7/2014 | Kripalani |
| 2014/0196104 A1 | 7/2014 | Chari et al. |
| 2014/0196115 A1 | 7/2014 | Pelykh |
| 2014/0201836 A1 | 7/2014 | Amsler |
| 2014/0201841 A1 | 7/2014 | Deshpande et al. |
| 2014/0214460 A1 | 7/2014 | Rahnama |
| 2014/0215608 A1 | 7/2014 | Rajagopalan et al. |
| 2014/0223554 A1 | 8/2014 | Roden, III |
| 2014/0223555 A1 | 8/2014 | Sanz Hernando et al. |
| 2014/0258446 A1 | 9/2014 | Bursell |
| 2014/0258715 A1 | 9/2014 | Rodniansky |
| 2014/0259169 A1 | 9/2014 | Harrison |
| 2014/0282840 A1 | 9/2014 | Guinan |
| 2014/0282889 A1 | 9/2014 | Ishaya et al. |
| 2014/0289854 A1 | 9/2014 | Mahvi |
| 2014/0310806 A1 | 10/2014 | Horn et al. |
| 2014/0317737 A1 | 10/2014 | Shin et al. |
| 2014/0344933 A1 | 11/2014 | Huh et al. |
| 2014/0359259 A1 | 12/2014 | Ali et al. |
| 2015/0032587 A1 | 1/2015 | Broom et al. |
| 2015/0033340 A1 | 1/2015 | Giokas |
| 2015/0052108 A1 | 2/2015 | Volk et al. |
| 2015/0052402 A1 | 2/2015 | Gurumurthy et al. |
| 2015/0052520 A1 | 2/2015 | Crowell et al. |
| 2015/0052608 A1 | 2/2015 | Sallam |
| 2015/0067865 A1 | 3/2015 | Seacat Deluca et al. |
| 2015/0082307 A1 | 3/2015 | Bell et al. |
| 2015/0095691 A1 | 4/2015 | Edwards |
| 2015/0120928 A1 | 4/2015 | Gummaraju et al. |
| 2015/0128130 A1 | 5/2015 | Weaver et al. |
| 2015/0128246 A1 | 5/2015 | Feghali et al. |
| 2015/0128274 A1 | 5/2015 | Giokas |
| 2015/0150123 A1 | 5/2015 | Be'ery |
| 2015/0180903 A1 | 6/2015 | Cooper et al. |
| 2015/0215327 A1 | 7/2015 | Cabrera et al. |
| 2015/0222653 A1 | 8/2015 | Cabrera et al. |
| 2015/0229661 A1 | 8/2015 | Balabine et al. |
| 2015/0242631 A1 | 8/2015 | Cabrera et al. |
| 2015/0269064 A1 | 9/2015 | Bishop et al. |
| 2015/0271195 A1 | 9/2015 | Lietz et al. |
| 2015/0278523 A1 | 10/2015 | Brinkley et al. |
| 2015/0304343 A1 | 10/2015 | Cabrera et al. |
| 2015/0319186 A1 | 11/2015 | Lietz et al. |
| 2015/0341357 A1 | 11/2015 | Rambur et al. |

(56) References Cited

U.S. PATENT DOCUMENTS

| | | |
|---|---|---|
| 2015/0347773 A1 | 12/2015 | Bonney et al. |
| 2015/0371044 A1 | 12/2015 | Horne et al. |
| 2015/0381641 A1 | 12/2015 | Cabrera et al. |
| 2016/0034359 A1 | 2/2016 | Cabrera et al. |
| 2016/0092535 A1 | 3/2016 | Kuchibhotla et al. |
| 2016/0234167 A1 | 8/2016 | Engel et al. |
| 2016/0371178 A1 | 12/2016 | Bishop et al. |
| 2018/0152473 A1 | 5/2018 | Lietz et al. |
| 2018/0341512 A1 | 11/2018 | Cabrera et al. |

FOREIGN PATENT DOCUMENTS

| | | |
|---|---|---|
| WO | WO 2002/091182 | 11/2002 |
| WO | WO 2006/071985 | 7/2006 |
| WO | WO 2009/079648 | 6/2009 |
| WO | WO 2012/023657 | 2/2012 |
| WO | WO 2012/135192 | 10/2012 |
| WO | WO 2013/048111 | 4/2013 |
| WO | WO 2013/067404 | 5/2013 |
| WO | WO 2013/123548 | 8/2013 |
| WO | WO 2013/152311 | 10/2013 |
| WO | WO 2015/102776 | 7/2015 |

OTHER PUBLICATIONS

Tupakula, et al.; "Intrusion Detection Techniques for Infrastructure as a Service Cloud;" 2011 IEEE Ninth International Conference on Dependable, Autonomic and Secure Computing; Dec. 12-14, 2011; IEEE.

Schwarzkopf et al., "Increasing Virtual Machine Security in Cloud Environments," *Journal of Cloud Computing: Advances, Systems and Applications*, Jul. 2012, pp. 1-12.

"VMware Backdoor I/O Port," 38 pages [online], Retrieved on Sep. 2, 2015 from the Internet: <URL: https://sites.google.com/site/chitchatvmback/backdoor>.

"What is the virtual machine backdoor?" 9 pages [online], Aug. 27, 2009, Retrieved on Feb. 22, 2016 from the Internet: <URL: https://communities.vmware.com/thread/228415?start=0& tstart=0>.

\* cited by examiner

SYSTEM AND METHOD FOR PROVIDING A SELF-MONITORING, SELF-REPORTING, AND SELF-REPAIRING VIRTUAL ASSET CONFIGURED FOR EXTRUSION AND INTRUSION DETECTION AND THREAT SCORING IN A CLOUD COMPUTING ENVIRONMENT

RELATED APPLICATIONS

This application is a divisional of Lietz, et al., U.S. patent application Ser. No. 15/581,835, filed on Apr. 28, 2017, entitled "SYSTEM AND METHOD FOR PROVIDING A SELF-MONITORING, SELF-REPORTING, AND SELF-REPAIRING VIRTUAL ASSET CONFIGURED FOR EXTRUSION AND INTRUSION DETECTION AND THREAT SCORING IN A CLOUD COMPUTING ENVIRONMENT," which is a continuation of Lietz, et al., U.S. patent application Ser. No. 14/256,289, filed on Apr. 18, 2014, entitled "METHOD AND SYSTEM FOR PROVIDING SELF-MONITORING, SELF-REPORTING, AND SELFREPAIRING VIRTUAL ASSETS IN A CLOUD COMPUTING ENVIRONMENT," and is a continuation of Lietz, et al., U.S. patent application Ser. No. 15/067,528, filed on Mar. 11, 2016, now U.S. Pat. No. 9,686,301 entitled "METHOD AND SYSTEM FOR VIRTUAL ASSET ASSISTED EXTRUSION AND INTRUSION DETECTION AND THREAT SCORING IN A CLOUD COMPUTING ENVIRONMENT," which is a continuation of Lietz, et al., U.S. patent application Ser. No. 14/171,438, filed Feb. 3, 2014, now U.S. Pat. No. 9,325,726 entitled "METHOD AND SYSTEM FOR VIRTUAL ASSET ASSISTED EXTRUSION AND INTRUSION DETECTION IN A CLOUD COMPUTING ENVIRONMENT" and is also a continuation of U.S. patent application Ser. No. 14/292,700, filed May 30, 2014 now U.S. Pat. No. 9,342,690 entitled "METHOD AND APPARATUS FOR A SCORING SERVICE FOR SECURITY THREAT MANAGEMENT," all of which are incorporated by reference in their entirety as if they were fully set forth herein.

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because many owners and operators of data centers that provide access to data and other resources are extremely hesitant to allow their data and resources to be accessed, processed, and/or otherwise used, by virtual assets, such as virtual machine and server instances, in the cloud.

In a cloud computing environment, various virtual assets, such as, but not limited to, virtual machine instances, data stores, and various services, are created, launched, or instantiated, in the cloud for use by an "owner" of the virtual asset, herein also referred to as a user of the virtual asset.

Herein the terms "owner" and "user" of a virtual asset include, but are not limited to, applications, systems, and sub-systems of software and/or hardware, as well as persons or entities associated with an account number, or other identity, through which the virtual asset is purchased, approved, managed, used, and/or created.

Typically, a given cloud computing environment receives message traffic through one or more network communications channels. One long standing problem associated with cloud computing environments is the fact that malware can be introduced into the cloud computing environment, just as in any computing environment, via these network communications channels. The introduction of malware into a virtual asset, and therefore into an application, service, enterprise, or cloud infrastructure of a cloud computing environment is known as intrusion. However, once introduced, some forms of malware take control of some, or all, of the infected virtual asset functionality and use the virtual asset to send outbound messages and data. This outbound malware mechanism is referred to as extrusion.

The detection of both malware intrusion and extrusion is an important part of making cloud computing environments more secure. However, a given cloud computing environment can include hundreds, thousands, or even millions, of virtual machines and other assets, owned or used by hundreds, thousands, or even millions, of parties and, in many cases, a given application or service can operate within, and interface with, multiple cloud computing environments. Consequently, detecting malware intrusion and extrusion is an extremely difficult and resource intensive task.

Further, with respect to cloud computing environments, one major security issue in a cloud computing environment is that vulnerabilities associated with virtual assets are not always known or understood at the time the virtual assets are created and deployed, e.g., instantiated, in a given computing environment and, once deployed, detecting and/or responding to newly identified vulnerabilities through "normal" communications channels associated with the virtual assets can be challenging, if not impossible.

In addition, in some cases, a malicious entity is able to take control of a virtual asset. In these cases, the malicious entity often takes over, or closes down, normal communications channels associated with the virtual asset. Consequently, in some cases, the malicious entity can mask the fact they have taken control of the virtual asset from other entities outside the virtual asset, such as entities deployed by the owner to monitor and enforce security policies. This leaves the malicious entity relatively free to manipulate the virtual asset under its control and access any data used by the virtual asset, with little concern of detection by the legitimate owner of the virtual asset. Even in cases where the legitimate owner of the virtual asset does become aware that the virtual asset has been compromised, if the malicious entity has shut down, or taken control of, the normal communications channels associated with the virtual asset, the malicious entity can thwart any traditional efforts by the legitimate owner to communicate with the virtual asset and/or repair the virtual asset.

The situation described above represents a significant issue that must be resolved before highly sensitive data, such as financial data, can be safely processed in a cloud computing environment.

For reasons described above, what is needed is a method and system for providing a virtual asset that can independently and automatically detect one or more trigger events within the virtual asset, generate suspicious event reporting data from the virtual asset, and provide the reporting data to a monitoring system external to the virtual asset, all without relying on detection of the suspicious event by entities outside the virtual asset itself or the use of normal communications channels Additionally, what is further needed is a method and system for detecting and prioritizing malware intrusion and extrusion in cloud computing environments that makes use of existing cloud computing environment infrastructure, features, and assets.

SUMMARY

In accordance with one embodiment, a method and system for virtual asset assisted extrusion detection in a cloud computing environment includes process operations and system modules for self-monitoring and self-reporting virtual assets includes providing a virtual asset monitoring system.

In one embodiment, one or more of the one or more virtual assets in a cloud computing environment is provided a trigger monitoring system; thereby transforming the one or more virtual assets into extrusion detection capable virtual assets. In one embodiment, one or more trigger parameters are defined and trigger data representing the trigger parameters is generated and provided to the trigger monitoring systems of the extrusion detection capable virtual assets which are then used to monitor at least a portion of the message traffic sent from the virtual assets in the cloud computing environment to detect any message including one or more of the one or more trigger parameters. In one embodiment, any detected message including one or more of the one or more trigger parameters is identified as a suspect message.

In one embodiment, for each suspect message, a threat score is assigned to each suspect message at least partially based on a potential impact of the suspect message's potential security threats on the extrusion detection capable virtual assets. In one embodiment, each threat score is provided to the extrusion detection capable virtual assets to enable the extrusion detection capable assets to secure against the potential security threats.

Figure 1:
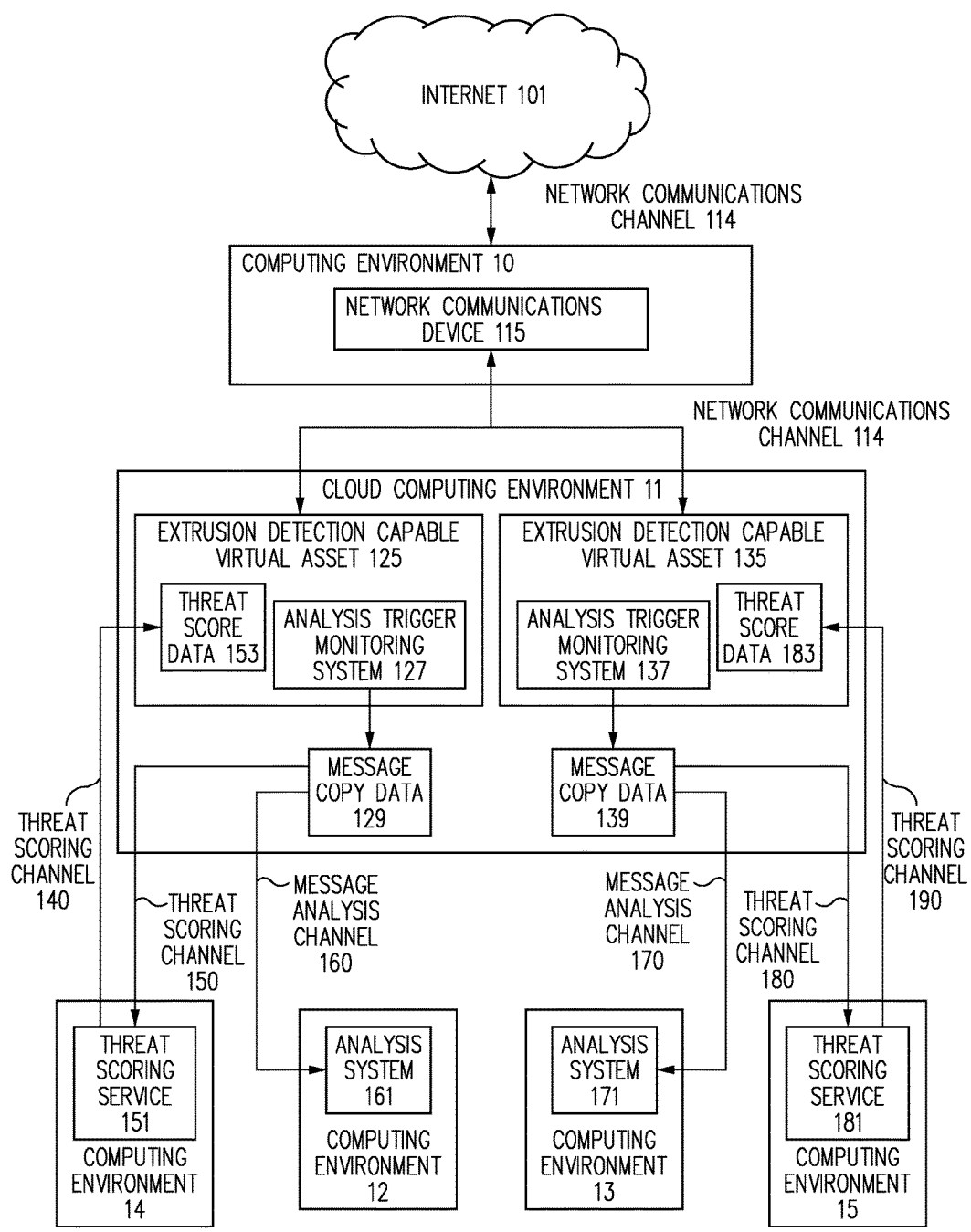
FIG. 1 is a functional block diagram showing the interaction of various elements for implementing one embodiment.

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

In accordance with one embodiment, methods and systems for virtual asset assisted extrusion, and/or intrusion, detection in a cloud computing environment include processes for virtual asset assisted extrusion, and/or intrusion, detection in a cloud computing environment implemented, at least in part, by one or more computing systems.

Herein, the term "production environment" includes the various components, or assets/virtual assets, used to deploy, implement, access, and use a given application as that application is intended to be used. In various embodiments, production environments include multiple virtual assets that are combined, communicatively coupled, virtually and/or physically connected, and/or associated with one another, to provide the production environment implementing the application.

As specific illustrative examples, virtual assets making up a given production environment can include, but are not limited to, one or more computing environments used to implement the application in the production environment such as a data center, a cloud computing environment, a dedicated hosting environment, and/or one or more other computing environments in which one or more virtual assets used by the application in the production environment are implemented; one or more computing systems or computing entities used to implement the application in the production environment; one or more supervisory or control systems, such as hypervisors, or other monitoring and management systems, used to monitor and control virtual or other assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other virtual or other assets/components making up an actual production environment in which an application is deployed, implemented, accessed, and run, e.g., operated, as discussed herein, and/or as known in the art at the time of filing, and/or as developed after the time of filing.

As used herein, the terms "computing system," "computing device," and "computing entity," include, but are not limited to, a virtual asset, a server computing system; a workstation; a desktop computing system; a mobile computing system, including, but not limited to, smart phones, portable devices, and/or devices worn or carried by a user; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the processes for virtual asset assisted extrusion, and/or intrusion, detection in a cloud computing environment are logically or physically located, and/or associated with, two or more computing environments. As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the virtual and/or other assets and components, infrastructure, communication and networking systems, and security systems associated with the computing systems making up the trusted computing environment, are either under the control of, or known to, a party. In contrast, unknown, or untrusted computing environments are environments and systems where the virtual and/or other assets and components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the virtual and/or other assets and components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that a party desires to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations a party may wish to transfer data between two trusted computing environments, and/or two untrusted computing environments.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

FIG. 1 is a functional diagram of the interaction of various elements associated with one embodiment of the methods and systems for virtual asset assisted extrusion, and/or intrusion, detection in a cloud computing environment discussed herein. Of particular note, the various elements in FIG. 1 are shown for illustrative purposes as being associated with specific computing environments, such as computing environment 10, computing environment 11, computing environment 12, computing environment 13, computing environment 14, and computing environment 15. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure virtual and/or other assets and components, such as one or more hardware systems, one or more software systems, one or more data centers, more or more clouds or cloud types, one or more third party service capabilities, or any other computing environments, architectural, and/or infrastructure virtual and/or other assets and components as discussed herein, and/or as known in the art at the time of filing, and/or as developed/made available after the time of filing.

In addition, the elements shown in FIG. 1, and/or the computing environments, systems and architectural and/or infrastructure virtual and/or other assets and components, deploying the elements shown in FIG. 1, can be under the control of, or otherwise associated with, various parties or entities, or multiple parties or entities, such as, but not limited to, the owner of a data center, a party and/or entity providing all or a portion of a cloud-based computing environment, the owner or a provider of a service, the owner or provider of one or more resources, and/or any other party and/or entity providing one or more functions, and/or any other party and/or entity as discussed herein, and/or as known in the art at the time of filing, and/or as made known after the time of filing.

In one embodiment, one or more cloud computing environments are provided. In various embodiments, the one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); any security/communications grouping; or any other cloud-based infrastructure, sub-structure, or architecture, as discussed herein, and/or as known in the art at the time of filing, and/or as developed after the time of filing.

In many cases, a given application or service provided through a cloud computing infrastructure may utilize, and interface with, multiple cloud computing environments, including multiple VPCs, in the course of providing the associated service. As noted above, each cloud computing environment includes allocated virtual assets associated with, and controlled or used by, the party utilizing the cloud computing environment.

As used herein, the term "virtual asset" includes any virtualized entity or resource, and/or part of an actual, or "bare metal" entity requiring access to various resources, and types of resources. In various embodiments, the virtual assets can be, but are not limited to, virtual machines, virtual servers, and instances implemented in a cloud computing environment; databases implemented, or associated with, a cloud computing environment, and/or instances implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc. requiring access to various resources, and/or types of resources, located within a data center, within a cloud computing environment, and/or any other physical or logical location, as discussed herein, and/or as known/available in the art at the time of filing, and/or as developed/made available after the time of filing.

As discussed below, in one embodiment, virtual asset creation data is generated through a virtual asset creation system such as a virtual asset template through which the creator of a virtual asset can generate operational logic and assign resources and attributes to the virtual assets to be instantiated in a cloud computing environment, such as a virtual private cloud computing environment.

In one embodiment, a network communications device is included with each cloud computing environment provided. In one embodiment, outgoing message traffic sent from one or more of the virtual assets associated with a given cloud computing environment to a destination external to the cloud computing environment, such as the Internet, and/or incoming message traffic sent to one or more of the virtual assets associated with a given cloud computing environment from an origin external to the cloud computing environment, such as the Internet, is relayed through the network communications device for that cloud computing environment.

In various embodiments, the network communications devices for the cloud computing environment include, but are not limited to, one or more of a switching system, such as a network switch; a router; a border router; any gateway system; a firewall system; a load balancing system; a hypervisor; or any communication, relay, or routing system, as discussed herein, and/or as known in the art at the time of filing, and/or as developed after the time of filing, through which message traffic on a network communications channel to, or from, an external network, such as the Internet, is relayed, and/or routed, to one or more virtual assets in a cloud computing environment.

In one embodiment, the outgoing message traffic, and/or incoming message traffic, is relayed through the network communications device via at least one communications channel, e.g., a network communications channel, herein also referred to as a first communications channel.

As noted above, in various embodiments, the outgoing, and/or incoming, message traffic to, and/or from, the virtual assets associated with a given cloud computing environment are susceptible to the introduction of malware and, in particular, extrusion, and/or intrusion, related malware.

As also noted above, the fact that malware can be introduced into the cloud computing environment is a long standing problem. As also noted above, the introduction of malware into a virtual asset via one or more messages included in message traffic relayed by the network communications device, is known as intrusion. However, as also noted above, once introduced, some forms of malware take control of some, or all, of the infected virtual asset functionality and use the virtual asset to send outgoing messages and data through the message traffic relayed by the network communications device. This outbound malware mechanism is referred to as extrusion.

Consequently, the detection of both malware intrusion and extrusion is an important part of making cloud computing environments more secure. However, as also noted above, a given cloud computing environment, and/or VPC, can include hundreds, thousands, or even millions, of virtual assets, owned or used by hundreds, thousands, or even millions, of parties. Consequently, detecting malware intrusion and extrusion in a cloud computing environment is currently an extremely difficult and resource intensive task.

To address this issue, as discussed below, in one embodiment, one or more virtual assets within, and/or assigned to, a cloud computing environment are provided a trigger monitoring system.

In one embodiment, by virtue of the addition of the trigger monitoring system logic to one or more of the one or more virtual assets in the cloud computing environment, the one or more virtual assets in the cloud computing environment provided a trigger monitoring system are transformed into extrusion, and/or intrusion, detection capable virtual assets for the cloud computing environment.

In various embodiments, the trigger monitoring system is a module of software and/or logic implemented in, or on, the one or more virtual assets and capable of monitoring at least a portion of the message traffic to, and/or between, and/or from, one or more virtual assets instantiated in the cloud computing environment.

In various embodiments, the methods and systems for intrusion and extrusion detection discussed herein are applied to network communications, e.g., message traffic, which is in plain text or is encrypted. Consequently, in some embodiments, the trigger monitoring system, and/or the network communications device, and/or the extrusion, and/or intrusion, detection capable virtual assets include a decryption capability to decrypt outgoing and incoming message traffic as part of the monitoring and analysis. In other embodiments, a decryption capability is provided to decrypt outgoing and incoming message traffic prior to being provided to trigger monitoring system and any monitoring and analysis.

As discussed below, in some embodiments, the trigger monitoring system allows for analysis policies to be added, or removed, dynamically based on alerts that are received.

Referring to FIG. 1, cloud computing environment 11 is shown, along with illustrative computing environments 10, 12, 13, 14, and 15. Herein, cloud computing environment 11 and computing environments 10, 12, 13, 14, and 15 are referred to collectively as computing environments 10, 11, 12, 13, 14, and 15.

Also shown in FIG. 1 is Internet 101 that, in this specific illustrative example, is the origin, and/or destination, external to cloud computing environment 11. As seen in FIG. 1, Internet 101 is communicatively coupled to cloud computing environment 11 via network communications channel 114 and network communications device 115, shown in this illustrative example as implemented computing environment 10.

As seen in FIG. 1, Internet 101 is communicatively coupled to network communications device 115, through which message traffic to, and from, representative extrusion detection capable virtual asset 125 and representative intrusion detection capable virtual asset 135 in cloud computing environment 11 is relayed via network communications channel 114, also referred to herein as the first communications channel.

As seen in FIG. 1, network communications device 115 is shown as implemented in computing environment 10 that is distinct from computing environment 11 of representative extrusion detection capable virtual asset 125 and representative intrusion detection capable virtual asset 135. However, as noted above, this illustrative placement of network communications device 115 is not limiting and, in other embodiments, network communications device 115 can be implemented in any of computing environments 10, 11, 12, 13, 14, and 15.

As also seen in FIG. 1, representative extrusion detection capable virtual asset 125 and representative intrusion detection capable virtual asset 135 are provided with trigger monitoring system 127 and trigger monitoring system 137, respectively. Those of skill in the art will readily recognize that while a single representative example of an extrusion detection capable virtual asset, i.e., extrusion detection capable virtual asset 125, is shown in FIG. 1, extrusion detection capable virtual asset 125 is representative of any number of extrusion detection capable virtual assets that can be created and instantiated in cloud computing environment 11. Likewise, while a single representative example of an intrusion detection capable virtual asset, i.e., intrusion detection capable virtual asset 135, is shown in FIG. 1, intrusion detection capable virtual asset 135 is representative of any number of intrusion detection capable virtual assets that can be created and instantiated in cloud computing environment 11.

In addition, in various embodiments, only extrusion detection capable virtual assets are created and instantiated in cloud computing environment 11, and/or only intrusion detection capable virtual assets are instantiated in cloud computing environment 11, and/or a mix of extrusion detection capable virtual assets and intrusion detection capable virtual assets are created and instantiated in cloud computing environment 11.

In addition, in various embodiments, extrusion detection capable virtual asset 125 can include intrusion detection capabilities and intrusion detection capable virtual asset 135 can include extrusion detection capabilities. Consequently, in various embodiments, extrusion detection capable virtual asset 125 and intrusion detection capable virtual asset 135 are similar, or identical, extrusion/intrusion detection capable virtual assets.

As discussed above, in one embodiment, virtual asset creation data is generated through a virtual asset creation system such as a virtual asset template through which the creator of a virtual asset can generate operational logic and assign resources and attributes to the virtual assets to be instantiated in a cloud computing environment.

In addition to extrusion and intrusion capabilities for which virtual assets depicted and described herein may be configured, in various embodiments, further disclosure is made regarding virtual assets having self-monitoring and self-reporting characteristics and function. As one of ordinary skill will readily appreciate, virtual assets may be configured to perform any or all of the features and process operations described herein.

Figure 2:
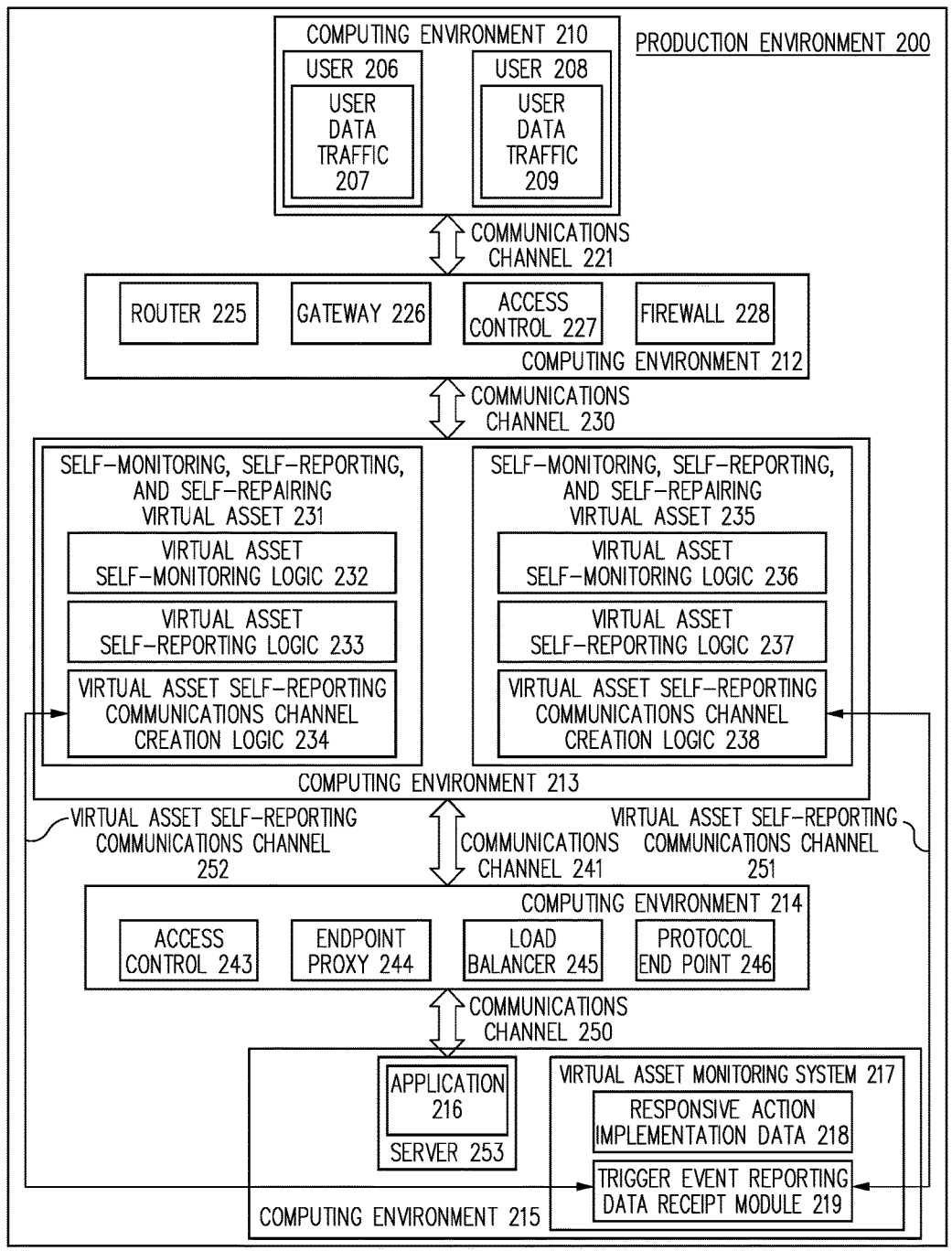
FIG. 2 is a functional block diagram showing the interaction of various elements for implementing one embodiment.

FIG. 2 is a functional diagram of the interaction of various elements associated with exemplary embodiments of the methods and systems for providing self-monitoring, self-reporting, and self-repairing virtual assets discussed herein.

Of particular note, the various elements/assets in FIG. 2 are shown for illustrative purposes as being associated with production environment 200 and specific computing environments within production environment 200, such as computing environments 210, 212, 213, 214, and 215. However, the exemplary placement of the various elements/assets within these environments and systems in FIG. 2 is made for illustrative purposes only and, in various embodiments, any individual element/asset shown in FIG. 2, or combination of elements/assets shown in FIG. 2, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components, as discussed herein, and/or as known in the art at the time of filing, and/or as developed/made available after the time of filing.

In addition, the elements shown in FIG. 2, and/or the computing environments, systems and architectural and/or infrastructure components, deploying the elements shown in FIG. 2, can be under the control of, or otherwise associated with, various parties or entities, or multiple parties or entities, such as, but not limited to, the owner of a data center, a party and/or entity providing all or a portion of a cloud-based computing environment, the owner or a provider of an application or service, the owner or provider of one or more resources, and/or any other party and/or entity providing one or more functions, and/or any other party and/or entity as discussed herein, and/or as known in the art at the time of filing, and/or as made known after the time of filing.

In one embodiment, a production environment is provided for implementing an application. In particular, FIG. 2 shows a given application, e.g., application 216 implemented in production environment 200 on server 253 and using various assets.

As seen in FIG. 2, in this specific illustrative example, application 216 is to be implemented using, and including, assets such as, but not limited to, computing environments 210, 212, 213, 214, and 215, used to implement application 216 in production environment 200, such as a data center, a cloud computing environment, and/or one or more other computing environments in which one or more assets and/or services used to implement application 216 in production environment 200 are deployed.

As seen in FIG. 2, production environment 200 includes computing environment 210, for instance a local area network, or the Internet, that includes users 206 and 208 generating user data traffic 207 and 209, respectively, using one or more computing systems (not shown). As seen in FIG. 2, user data traffic 207 and 209 is provided to computing environment 212, such as an access layer or Internet Service Provider (ISP) service used to access application 216, via communications channel 221.

As seen in FIG. 2, production environment 200 includes computing environment 212 which, in turn, includes, as illustrative examples, one or more assets such as router 225, gateway 226, access control 227, and firewall 228. As seen in FIG. 2, in this specific illustrative example, computing environment 212 is commutatively coupled to computing environment 213 of production environment 200 by communications channel 230.

In the specific illustrative example of FIG. 2, computing environment 213 of production environment 200 is a cloud computing environment and includes representative self-monitoring, self-reporting, and self-repairing virtual assets 231 and 235 used to implement application 216. Self-monitoring, self-reporting, and self-repairing virtual assets 231 and 235 are discussed in more detail below.

In the specific illustrative example of FIG. 2, production environment 200 includes computing environment 214, such as an access control layer, commutatively coupled to computing environment 213 by communications channel 241. In this specific illustrative example, computing environment 214 includes assets such as exemplary access control systems, e.g., one or more of access control 243, endpoint proxy 244, load balancer 245, and protocol endpoint 246.

As seen in the specific illustrative example of FIG. 2, production environment 200 includes computing environment 215, such as a data center or infrastructure provider environment, commutatively coupled to computing environment 214 by communications channel 250. In this specific illustrative example, computing environment 215 includes assets such server 253 associated with application 216 and virtual asset monitoring system 217. Virtual asset monitoring system 217 is discussed in more detail below.

In one embodiment, a cloud computing environment is provided. In various embodiments, the provided cloud computing environment can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In one embodiment, one more self-monitoring and self-reporting virtual assets, and/or and self-monitoring, self-reporting, and self-repairing virtual assets are provided in a production environment.

As noted above, as used herein, the term "virtual asset", such as is used in the terms "self-monitoring and self-reporting virtual asset" and "self-monitoring, self-reporting, and self-repairing virtual asset" includes any virtualized entity or resource, and/or part of an actual, or "bare metal" entity.

As also noted above, in the specific illustrative example of FIG. 2, computing environment 213 is a cloud computing environment that is part of production environment 200 and includes representative self-monitoring, self-reporting, and self-repairing virtual assets 231 and 235 which also include, in one embodiment, any or all of the features discussed herein as being part of extrusion detection capable virtual asset 125 (FIG. 1) and representative intrusion detection capable virtual asset 135 (FIG. 1), for example.

As discussed in more detail below, in one embodiment, self-monitoring, self-reporting, and self-repairing virtual assets 231 (FIG. 2) and 235 include virtual asset self-monitoring logic 232 and 236, respectively. In one embodiment, virtual asset self-monitoring logic 232 and 236 include data and instructions for detecting one or more trigger events within self-monitoring, self-reporting, and self-repairing virtual assets 231 and 235, respectively.

As discussed in more detail below, in one embodiment, self-monitoring, self-reporting, and self-repairing virtual assets 231 and 235 include virtual asset self-reporting logic 233 and 237, respectively. In one embodiment, virtual asset self-reporting logic 233 and 237 includes data and instructions for generating trigger event reporting data if one of the one or more trigger events is detected in self-monitoring, self-reporting, and self-repairing virtual assets 231 and 235 by virtual asset self-monitoring logic 232 and 236, respectively.

As discussed in more detail below, in one embodiment, self-monitoring, self-reporting, and self-repairing virtual assets 231 and 235 include virtual asset self-reporting communications channel creation logic 234 and 238, respectively. In one embodiment, virtual asset self-reporting communications channel creation logic 234 and 238 includes data and instructions for opening a virtual asset self-reporting communications channel, such as virtual asset self-reporting communications channels 252 and 251, respectively, between self-monitoring, self-reporting, and self-repairing virtual assets 231 and 235, respectively, and virtual asset monitoring system 217, if one of the one or more trigger events is detected in self-monitoring, self-reporting, and self-repairing virtual assets 231 and 235 by the virtual asset self-monitoring logic 232 and 236, respectively.

As seen in FIG. 2 and as discussed in more detail below, virtual asset monitoring system 217 includes trigger event reporting data receipt module 219 for receiving trigger event reporting data from self-monitoring, self-reporting, and self-repairing virtual assets 231 and 235 if one of the one or more trigger events is detected in self-monitoring, self-reporting, and self-repairing virtual assets 231 and 235 by the virtual asset self-monitoring logic 232 and 236, respectively.

As also seen in FIG. 2, and as discussed in more detail below, virtual asset monitoring system 217 includes responsive action implementation data 218, which, in one embodiment, is provided to self-monitoring, self-reporting, and self-repairing virtual assets 231 and 235 in response to the receipt of trigger event data from self-monitoring, self-reporting, and self-repairing virtual assets 231 and 235.

In one embodiment, various types of trigger parameters representing trigger events are predetermined and include message-related trigger parameters such as trigger parameters discussed herein as well as other trigger parameters.

In various embodiments, the one or more trigger events defined can include, but are not limited to, one or more of: a network message from a virtual asset directed to a location known to be associated with malicious entities, i.e., a black-listed destination; the frequency of outgoing network messages changing to a level above a defined threshold level, i.e., the frequency of outgoing network messages changing to a level deemed "not normal"; a response to a customer request being directed to a destination that is not the customer location of record; a virtual asset receiving a high-frequency of login attempts that fail; a size of the parameters sent into a virtual asset being outside a defined "normal" range of sizes for parameters; a size of outgoing network messages being outside a defined "normal" range of sizes of outgoing messages; a total amount of data in any one communication connection of a virtual asset exceeding a defined maximum normal size of a communication to a customer; a request to a virtual asset coming in from a location known to be associated with malicious entities, i.e., a black-listed origin location; an internal elapsed time of defined critical operations changing to a time outside a defined range of "normal" values; and/or any other trigger event, or combination of trigger events, as discussed herein, and/or as known in the art at the time of filing, and/or as developed/made available after the time of filing.

In one embodiment, one or more trigger parameters are defined such that if one or more of the one or more trigger parameters are detected in a message to, or from, a virtual asset, then that message is deemed a suspect message that is potentially associated with an intrusion or extrusion attack on the virtual asset, and/or the cloud computing environment.

In various embodiments, the trigger parameters can be dynamically added, removed, and/or modified to reflect various policies, and/or policy changes made in response to malware alerts.

In various embodiments, specific examples of trigger parameters include, but are not limited to, the presence of an IP address in a message indicating a designated suspect origin or destination. In one embodiment, this trigger parameter is used to detect messages coming from, or going to, a designated suspicious entity that is suspected of being associated with malware. In various embodiments, the IP addresses associated with designated suspicious entities, and/or the identity of the entities themselves, is provided by one or more third parties via alerts or other mechanisms.

In various embodiments, specific examples of trigger parameters include, but are not limited to, the presence of an IP address in a message indicating a designated suspect geographical region. In one embodiment, this trigger parameter is used to detect messages coming from, or going to, geographical locations that are known to be associated with malware. In various embodiments, the geographical locations known to be associated with malware are provided by the one or more third parties via alerts or other mechanisms.

In various embodiments, specific examples of trigger parameters include, but are not limited to, the presence of an IP address in a message indicating an origin or destination that is not included on a list of authorized, or expected, origins or destinations of messages to be received by, or transmitted from, the virtual assets. In one embodiment, this trigger parameter is used to detect message traffic that would not be expected to be generated in the normal course of operation of the virtual assets according to their operational mission.

In various embodiments, specific examples of trigger parameters include, but are not limited to, the presence of an IP address in a message indicating a geographical location that is not included on a list of authorized, or expected, geographical locations to be associated with messages to be received by, or transmitted from, and the virtual assets. In one embodiment, this trigger parameter is used to detect message traffic that would not be expected to be generated in the normal course of operation of the virtual assets according to their operational instructions.

In various embodiments, specific examples of trigger parameters include, but are not limited to, setting a threshold maximum message size and determining that a given message is of a size exceeding the threshold maximum message size. In one embodiment, this trigger parameter takes advantage of the fact that many forms of malware require message sizes larger than those normally associated with a given virtual asset in order to deliver the malware necessary to execute the malicious intent.

In various embodiments, specific examples of trigger parameters include, but are not limited to, setting a threshold minimum message size and determining that a given message is of a size that is less than the threshold minimum message size. In one embodiment, this trigger is used to detect messages of a size that is smaller than a message size determined to be typical with respect to a given virtual asset, and that are therefore suspicious.

In various embodiments, specific examples of trigger parameters include, but are not limited to, trigger parameters based on frequency analysis of the access pattern indicating that messages arrive too frequently or too infrequently.

In various embodiments, specific examples of trigger parameters include, but are not limited to, a hash value of at least part of the message data that is not included in a list of allowed hash values. In one embodiment, this trigger parameter is used in conjunction with a hash-based analysis of at least part of a given message being sent to, and/or transmitted from, a virtual asset. In one embodiment, allowable hash values are defined and then a hash is performed on at least part of a given message. In one embodiment, if the hash of the portion of the given message does not match any of the allowed hash values, the message is determined to be suspect.

In various embodiments, specific examples of trigger parameters include, but are not limited to, an MD5 value of the message data that is not included in a list of allowed MD5 values.

MD5 (Message-Digest algorithm five) is a widely used cryptographic hash function producing a 128 bit (16 byte) hash value that is typically expressed as a 32 digit hexadecimal number. In one embodiment, the MD5 algorithm is applied to at least part of the message data associated with a given message and the resulting MD5 value is compared with a list of allowed MD5 values. If the resulting MD5 value does not match any of the allowed MD5 values, then the message is considered suspect.

In various embodiments, specific examples of trigger parameters include, but are not limited to, the specific identity of the sender of the message and adding the ability to have a per-message offline analysis that determines whether to trigger a message as suspect. In one embodiment, the analysis can be in-line or asynchronously off-line and would typically miss an initial or first example of an intrusion or extrusion message but would be used for other "like messages" where the criteria for "like" is a trigger parameter that can be dynamically installed in the trigger monitoring system. Consequently, in one embodiment, new trigger parameters are discovered and applied heuristically to create a self-learning extrusion and/or intrusion detection system.

In various embodiments, specific examples of trigger parameters include, but are not limited to, the specific identity of the recipient of the message and adding the ability to have a per-message offline analysis that determines whether to trigger a message as suspect. In one embodiment, the analysis can be in-line or asynchronously off-line and would typically miss an initial or first example of an intrusion or extrusion message but would be used for other "like messages" where the criteria for "like" is a trigger parameter that can be dynamically installed in the trigger monitoring system. Consequently, in one embodiment, new trigger parameters are discovered and applied heuristically to create a self-learning extrusion and/or intrusion detection system.

In various other embodiments, any other trigger parameter, or combination of trigger parameters, as discussed herein, and/or as known in the art at the time of filing, and/or as developed after the time of filing is/are defined.

In one embodiment, once the trigger parameters are defined, machine-readable trigger data is generated representing the trigger parameters.

In one embodiment, all, or part, of the trigger data is provided to the trigger monitoring systems associated with the extrusion, and/or intrusion, detection capable virtual assets.

In one embodiment, the trigger data and the trigger monitoring systems are then used to monitor at least part of the message data associated with at least some of the message traffic to, and/or from, the virtual assets relayed by the network communications device. In one embodiment, at least part of the message data associated with at least some of the message traffic to, and/or from, the extrusion, and/or intrusion, detection capable virtual assets is monitored to detect one or more of the one or more trigger parameters within the message data.

In one embodiment, the part of the message data associated with at least some of the message traffic from the extrusion, and/or intrusion, detection capable virtual assets is decrypted by a decryption capability associated with the trigger monitoring system, and/or the network communications device, and/or the extrusion, and/or intrusion, detection capable virtual assets before the trigger data and the trigger monitoring systems are used to monitor at least part of the message data associated with at least some of the message traffic to and/or from the extrusion, and/or intrusion, detection capable virtual assets.

In one embodiment, if one or more of the one or more trigger parameters is detected within the message data associated with a given message, the classification data associated with that message is transformed into classification data indicating that the detected message including one or more of the one or more trigger parameters is a suspect message.

Returning to FIG. 1, trigger monitoring system 127 is shown implemented in extrusion detection capable virtual asset 125 and trigger monitoring system 137 is shown implemented in intrusion detection capable virtual asset 135.

As seen in FIG. 1, message copy data 129 is sent from extrusion detection capable virtual asset 125 to threat scoring service 151, illustratively shown in computing environment 14 in FIG. 1, via threat scoring channel 150, also referred to as a second communications channel. Likewise, message copy data 139 is sent from intrusion detection capable virtual asset 135 to threat scoring service 181, illustratively shown in computing environment 15 in FIG. 1, via threat scoring channel 180, also referred to as a second communications channel.

In one embodiment, threat scoring service 151 determines threat patterns for potential security threats using any one of a number of techniques. In one embodiment, threat scoring service 151 requests and receives security threat patterns from an information management security service provider or vendor. Threat scoring service 151 then updates a security threat pattern database with the received security threat patterns. In another embodiment, computing security analysts manually update the security threat pattern database through threat scoring service 151 after compiling, reverse-engineering, or otherwise analyzing traffic patterns between a malicious computing device and a service provider. For example, computing security analysts can simulate and monitor traffic patterns between a test computing system and a test asset hosting a test online service by configuring the test computing system to send or execute security threats on the test online service. Based on the traffic patterns monitored from the simulation, the analysts can determine and record particular patterns that are associated with particular types of security threats. In some embodiments, the types of threats for which security threat patterns are stored in the security threat pattern database include, but are not limited to, spoofing, tampering, repudiation, information disclosure, denial of service, and/or elevation of privilege, among others.

Threat scoring service 151 can determine threat patterns or potential security threats by establishing baseline time limits for the reasonable execution of one or more APIs associated with a virtual asset. For example, threat scoring service 151 can cause a virtual asset to execute a sample program that cycles through one or more APIs of the virtual asset. During the execution of the sample program, Threat scoring service 151 monitors the execution of the APIs and establishes minimum time delays that are likely to occur or that should occur during normal and/or non-malicious communications with the virtual asset, according to one embodiment. Threat scoring service 151 can then record, create, or determine baseline or normal traffic patterns for the service traffic and can determine or define deviations from the baseline as security threat patterns, according to one embodiment. In some embodiments, threat scoring service 151 defines login failure patterns based on APIs associated with login attempts, so that excessive attempts and excessively short delays between successive attempts to login can be flagged as security threat patterns. In some embodiments, the patterns include, but are not limited to, time references, such as "FAST," "SLOW," "LONG," "SHORT," "QUICK," "MEDIUM," "VERY SLOW," "VERY FAST," or the like. In other embodiments, the patterns include, but are not limited to, bandwidth references and/or payload size references, such as, "SMALL," "MEDIUM," "LARGE," "VERY LARGE," or the like.

Threat scoring service 151 can also determine defined anti-patterns, in one embodiment. By evaluating normal execution patterns of APIs for the virtual asset for extended periods of time, threat scoring service 151 can develop a sizable library in the threat scoring service 151 of reasonable, allowable, and/or "normal" API execution sequences. Threat scoring service 151 can then define any traffic patterns that do not fit within the predetermined model as a subset of security threat patterns, i.e., anti-patterns. When an anti-pattern occurs, threat scoring service 151 can flag or identify service traffic associated with the anti-pattern as being potentially malicious, according to one embodiment.

In one embodiment, threat score data 153 is provided to extrusion detection capable asset 125 via threat scoring channel 140, also referred to as a second communications channel. Turning back to FIG. 1, in one embodiment, threat score data 183 is generated by threat scoring service 181. In one embodiment, threat score data 183 is provided to intrusion detection capable virtual asset 135 via threat scoring channel 190, also referred to as a second communications channel.

In FIG. 1, threat scoring service 151 is illustratively shown as being implemented in computing environment 14. As noted above, the implementation of threat scoring service 151 in computing environment 14 is shown for illustrative purposes only and, in other embodiments, threat scoring service 151 could be implemented in computing environment 10, or computing environment 11, or computing environment 12, or computing environment 13, or computing environment 15, or partially implemented in any one or more of computing environment 10, computing environment 11, computing environment 12, computing environment 13, computing environment 14, and computing environment 15.

In one embodiment, threat scoring services, such as representative threat scoring services 151 and 181, are provided that are specifically implemented to analyze specific trigger parameters. Consequently, in one embodiment, the particular threat scoring service to which a given example of suspect message data is transmitted is determined, at least in part, by the specific trigger parameter detected in the suspect message from which the suspect message copy data was derived. Consequently, in one embodiment, the matching trigger data is used, at least in part, to determine which analysis system, such as representative threat scoring service 151, of one or more specialized analysis systems (not shown) is to receive message copy data 129 via message analysis channel 160.

In various embodiments, threat scoring services, services, such as representative threat scoring services 151 and 181, provide threat score data, such as representative threat score data 153 and 183 to extrusion/intrusion detection capable virtual assets such as representative extrusion detection capable virtual asset 125 and intrusion detection capable virtual asset 135 at various frequencies. In one embodiment, threat score data is transmitted to the extrusion/intrusion detection capable virtual assets on a periodic basis in digests, rather than in real time. In some embodiments, threat score data representing less significant potential threats are periodically transmitted to extrusion/intrusion detection capable virtual assets, e.g., on a weekly, semi-monthly, or monthly basis. In one embodiment, threat score data representing significant threats are immediately transmitted to the extrusion/intrusion detection capable virtual assets.

As seen in FIG. 1, message copy data 129 is sent from extrusion detection capable virtual asset 125 to analysis system 161, illustratively shown in computing environment 12 in FIG. 1, via message analysis channel 160, also referred to as a third communications channel. Likewise, message copy data 139 is sent from intrusion detection capable virtual asset 135 to analysis system 171, illustratively shown in computing environment 13 in FIG. 1, via message analysis channel 170, also referred to as a third communications channel.

Process

In accordance with one embodiment, a process for virtual asset assisted extrusion detection in a cloud computing environment includes providing a cloud computing environment. In one embodiment, the cloud computing environment includes one or more virtual assets. In one embodiment, one or more of the one or more virtual assets in the cloud computing environment is provided a trigger monitoring system; thereby transforming the one or more virtual assets in the cloud computing environment provided a trigger monitoring system into extrusion detection capable virtual assets for the cloud computing environment. In one embodiment, one or more trigger parameters are defined and trigger data representing the trigger parameters is generated. In one embodiment, the trigger data is provided to the trigger monitoring systems of the extrusion detection capable virtual assets. The trigger monitoring systems and the trigger data are then used to monitor at least a portion of the message traffic sent from the virtual assets in the cloud computing environment to detect any message including one or more of the one or more trigger parameters.

In one embodiment, any detected message including one or more of the one or more trigger parameters is identified as a suspect message and, for each suspect message, suspect message copy data representing a copy of at least a portion of the suspect message is generated. In one embodiment, the suspect message copy data is then transferred to one or more analysis systems for further analysis.

Figure 3:
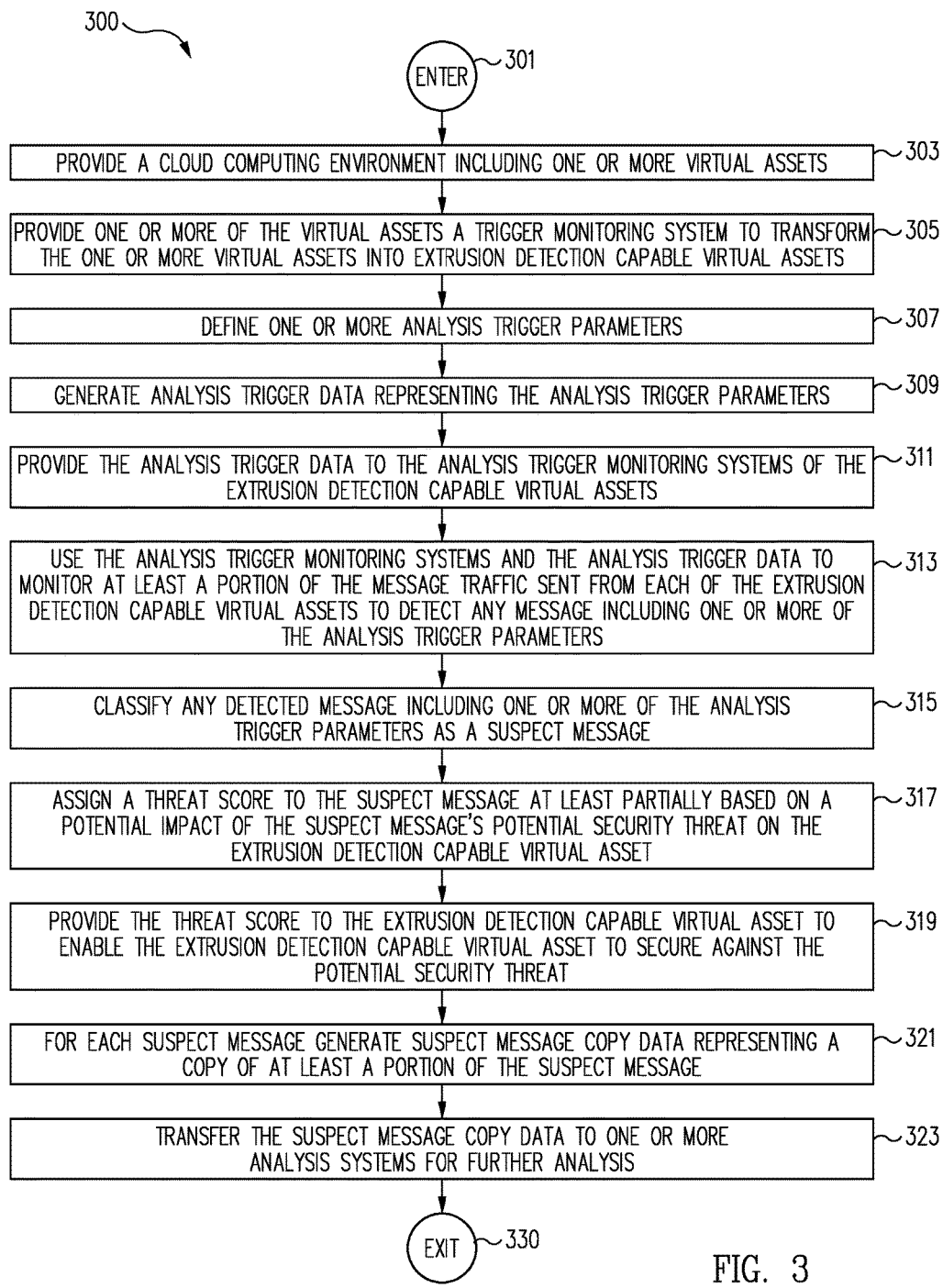
FIG. 3 is a flow chart depicting a process for virtual asset assisted extrusion detection in a cloud computing environment in accordance with one embodiment.

FIG. 3 is a flow chart of a process 300 for virtual asset assisted extrusion detection in a cloud computing environment in accordance with one embodiment. In one embodiment, process 300 for virtual asset assisted extrusion detection in a cloud computing environment begins at ENTER OPERATION 301 of FIG. 3 and process flow proceeds to PROVIDE A CLOUD COMPUTING ENVIRONMENT INCLUDING ONE OR MORE VIRTUAL ASSETS OPERATION 303.

In one embodiment, at PROVIDE A CLOUD COMPUTING ENVIRONMENT INCLUDING ONE OR MORE VIRTUAL ASSETS OPERATION 303 a cloud computing environment is provided.

In various embodiments, the cloud computing environment of PROVIDE A CLOUD COMPUTING ENVIRONMENT INCLUDING ONE OR MORE VIRTUAL ASSETS OPERATION 303 can be any form of cloud computing environment, such as, but not limited to, a Virtual Private Cloud, or VPC.

In many cases, a given application or service provided through a cloud computing environment may utilize, and interface with, multiple cloud computing environments, including multiple VPCs, in the course of providing the associated service. As noted above, each cloud computing environment includes allocated virtual assets associated with, and controlled or used by, the party utilizing the cloud computing environment.

As used herein, the term "virtual asset" includes any virtualized entity or resource, and/or part of an actual, or "bare metal" entity requiring access to various resources, and types of resources. In various embodiments, the virtual assets can be, but are not limited to, virtual machines, virtual servers, and instances implemented in a cloud computing environment; databases implemented, or associated with, a cloud computing environment, and/or instances implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc. requiring access to various resources, and/or types of resources, located within a data center, within a cloud computing environment, and/or any other physical or logical location, as discussed herein, and/or as known/available in the art at the time of filing, and/or as developed/made available after the time of filing.

In one embodiment, virtual asset creation data is generated through a virtual asset creation system such as a virtual asset template through which the creator of a virtual asset can generate operational logic and assign resources and attributes to the virtual assets to be instantiated in a cloud computing environment, such as a virtual private cloud computing environment.

In one embodiment, once a cloud computing environment is provided at PROVIDE A CLOUD COMPUTING ENVIRONMENT INCLUDING ONE OR MORE VIRTUAL ASSETS OPERATION 303, process flow proceeds to PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305.

In one embodiment, at PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 a network communications device is provided for each cloud computing environment of PROVIDE A CLOUD COMPUTING ENVIRONMENT INCLUDING ONE OR MORE VIRTUAL ASSETS OPERATION 303.

In various embodiments, the network communications devices of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 provided for the cloud computing environment of PROVIDE A CLOUD COMPUTING ENVIRONMENT INCLUDING ONE OR MORE VIRTUAL ASSETS OPERATION 303 include, but are not limited to, one or more of a switching system, such as a network switch; a router; a border router; any gateway system; a firewall system; a load balancing system; a hypervisor; or any communication, relay, or routing system, as discussed herein, and/or as known in the art at the time of filing, and/or as developed after the time of filing, through which message traffic on a network communications channel to, or from, an external network, such as the Internet, is relayed, and/or routed, to one or more virtual assets in a cloud computing environment.

In one embodiment, outgoing message traffic sent from one or more of the virtual assets associated with a given cloud computing environment of PROVIDE A CLOUD COMPUTING ENVIRONMENT INCLUDING ONE OR MORE VIRTUAL ASSETS OPERATION 303 to a destination external to the cloud computing environment, such as the Internet, is relayed through the network communications device for that cloud computing environment of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305.

In one embodiment, the outgoing message traffic is relayed through the network communications device of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 via at least one communications channel, e.g., a network communications channel, herein also referred to as a first communications channel.

As noted above, in various embodiments, the outgoing message traffic from the virtual assets associated with a given cloud computing environment of PROVIDE A CLOUD COMPUTING ENVIRONMENT INCLUDING ONE OR MORE VIRTUAL ASSETS OPERATION 303 are susceptible to the introduction of malware and, in particular, extrusion related malware.

As also noted above, the fact that malware can be introduced into the cloud computing environments of PROVIDE A CLOUD COMPUTING ENVIRONMENT INCLUDING ONE OR MORE VIRTUAL ASSETS OPERATION 303 is a long standing problem. As also noted above, some forms of malware take control of some, or all, of the infected virtual asset functionality and use the virtual asset to send outgoing messages and data through the message traffic relayed by the network communications device. This outbound malware mechanism is referred to as extrusion.

Consequently, the detection of malware extrusion is an important part of making the cloud computing environments of PROVIDE A CLOUD COMPUTING ENVIRONMENT INCLUDING ONE OR MORE VIRTUAL ASSETS OPERATION 303 more secure. However, as also noted above, a given cloud computing environment, and/or virtual private cloud computing environment, can include hundreds, thousands, or even millions, of virtual assets, owned or used by hundreds, thousands, or even millions, of parties. Consequently, detecting malware extrusion in a cloud computing environment is currently an extremely difficult and resource intensive task.

To address this issue, in one embodiment, at PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 one or more virtual assets within, and/or assigned to, the cloud computing environment of PROVIDE A CLOUD COMPUTING ENVIRONMENT INCLUDING ONE OR MORE VIRTUAL ASSETS OPERATION 303 are provided a trigger monitoring system.

In one embodiment, by virtue of the addition of the trigger monitoring system logic to one or more of the one or more virtual assets in the cloud computing environment at PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305, the one or more virtual assets in the cloud computing environment provided a trigger monitoring system are transformed into extrusion detection capable virtual assets for the cloud computing environment.

In various embodiments, the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 is a module of software and/or logic implemented in, or on, the one or more virtual assets and capable of monitoring at least a portion of the message traffic from one or more virtual assets instantiated in the cloud computing environment.

In various embodiments, process 300 for virtual asset assisted extrusion detection in a cloud computing environment is applied to network communications, e.g., message traffic, which is in plain text or is encrypted. Consequently, in some embodiments, the trigger monitoring system, and/or the network communications device, and/or the extrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 include a decryption capability to decrypt outgoing message traffic as part of the monitoring and analysis. In other embodiments, a decryption capability is provided to decrypt outgoing message traffic prior to being provided to trigger monitoring system and any monitoring and analysis.

As discussed below, in some embodiments, the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 allows for analysis policies to be added, or removed, dynamically based on alerts that are received.

In one embodiment, once one or more virtual assets within, and/or assigned to, the cloud computing environment of PROVIDE A CLOUD COMPUTING ENVIRONMENT INCLUDING ONE OR MORE VIRTUAL ASSETS OPERATION 303 are provided a trigger monitoring system at PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305, process flow proceeds to DEFINE ONE OR MORE TRIGGER PARAMETERS OPERATION 307.

In one embodiment, at DEFINE ONE OR MORE TRIGGER PARAMETERS OPERATION 307 one or more trigger parameters are defined such that if one or more of the one or more trigger parameters are detected in a message from a virtual asset, then that message is deemed a suspect message that is potentially associated with an extrusion attack on the virtual asset, and/or the cloud computing environment.

In various embodiments, the trigger parameters of DEFINE ONE OR MORE TRIGGER PARAMETERS OPERATION 307 can be dynamically added, removed, and/or modified to reflect various policies, and/or policy changes, made in response to malware alerts. In addition, as discussed below, in one embodiment, trigger parameters are applied heuristically and new trigger parameters that are discovered by the application of process 300 for virtual asset assisted extrusion detection in a cloud computing environment are added to create a self-learning extrusion detection system.

In various embodiments, specific examples of trigger parameters of DEFINE ONE OR MORE TRIGGER PARAMETERS OPERATION 307 include, but are not limited to, the presence of an IP address in a message indicating a designated suspect destination. In one embodiment, this trigger parameter is used to detect messages going to a designated suspicious entity that is suspected of being associated with malware. In various embodiments, the IP addresses associated with designated suspicious entities, and/or the identity of the entities themselves, is provided by one or more third parties via alerts or other mechanisms.

In various embodiments, specific examples of trigger parameters of DEFINE ONE OR MORE TRIGGER PARAMETERS OPERATION 307 include, but are not limited to, the presence of an IP address in a message indicating a designated suspect geographical region. In one embodiment, this trigger parameter is used to detect messages going to geographical locations that are known to be associated with malware. In various embodiments, the geographical locations known to be associated with malware are provided by the one or more third parties via alerts or other mechanisms.

In various embodiments, specific examples of trigger parameters of DEFINE ONE OR MORE TRIGGER PARAMETERS OPERATION 307 include, but are not limited to, the presence of an IP address in a message indicating a destination that is not included on a list of authorized, or expected, destinations of messages transmitted from the virtual assets. In one embodiment, this trigger parameter is used to detect message traffic that would not be expected to be generated in the normal course of operation of the virtual assets according to their operational mission.

In various embodiments, specific examples of trigger parameters of DEFINE ONE OR MORE TRIGGER PARAMETERS OPERATION 307 include, but are not limited to, the presence of an IP address in a message indicating a geographical location that is not included on a list of authorized, or expected, geographical locations to be associated with messages to be transmitted from the virtual assets. In one embodiment, this trigger parameter is used to detect message traffic that would not be expected to be generated in the normal course of operation of the virtual assets according to their operational instructions.

In various embodiments, specific examples of trigger parameters of DEFINE ONE OR MORE TRIGGER PARAMETERS OPERATION 307 include, but are not limited to, setting a threshold maximum message size and determining that the size of a given message exceeds the threshold maximum message size. In one embodiment, this trigger parameter takes advantage of the fact that many forms of malware require message sizes larger than those normally associated with a given virtual asset in order to deliver the malware necessary to execute the malicious intent associated with the malware.

In various embodiments, specific examples of trigger parameters of DEFINE ONE OR MORE TRIGGER PARAMETERS OPERATION 307 include, but are not limited to, setting a threshold minimum message size and determining that the size of a given message is less than the threshold minimum message size. In one embodiment, this trigger is used to detect messages that are smaller than a message size determined to be typical with respect to a given virtual asset, and that are therefore suspicious.

In various embodiments, specific examples of trigger parameters of DEFINE ONE OR MORE TRIGGER PARAMETERS OPERATION 307 include, but are not limited to, trigger parameters based on frequency analysis of the access pattern indicating that messages arrive too frequently or too infrequently.

In various embodiments, specific examples of trigger parameters of DEFINE ONE OR MORE TRIGGER PARAMETERS OPERATION 307 include, but are not limited to, a hash value of at least part of the message data that is not included in a list of allowed hash values. In one embodiment, this trigger parameter is used in conjunction with a hash-based analysis of at least part of a given message being transmitted from a virtual asset. In one embodiment, allowable hash values are defined and then a hash is performed on at least part of a given message. In one embodiment, if the hash of the portion of the given message does not match any of the allowed hash values, the message is determined to be suspect.

In various embodiments, specific examples of trigger parameters of DEFINE ONE OR MORE TRIGGER PARAMETERS OPERATION 307 include, but are not limited to, an MD5 value of the message data that is not included in a list of allowed MD5 values.

MD5 (Message-Digest algorithm five) is a widely used cryptographic hash function producing a 128 bit (16 byte) hash value that is typically expressed as a 32 digit hexadecimal number. In one embodiment, the MD5 algorithm is applied to at least part of the message data associated with a given message and the resulting MD5 value is compared with a list of allowed MD5 values. If the resulting MD5 value does not match any of the allowed MD5 values, then the message is considered suspect.

In various embodiments, specific examples of trigger parameters of DEFINE ONE OR MORE TRIGGER PARAMETERS OPERATION 307 include, but are not limited to, the specific identity of the sender of the message and adding the ability to have a per-message offline analysis that determines whether to trigger a message as suspect. In one embodiment, the analysis can be in-line or asynchronously off-line and would typically miss an initial or first example of an extrusion message but would be used for other "like messages" where the criteria for "like" is a trigger parameter that can be dynamically installed in the trigger monitoring system. In addition, as discussed below, in one embodiment, trigger parameters are applied heuristically and new trigger parameters that are discovered by the application of process 300 for virtual asset assisted extrusion detection in a cloud computing environment are added to create a self-learning extrusion detection system.

In various embodiments, specific examples of trigger parameters of DEFINE ONE OR MORE TRIGGER PARAMETERS OPERATION 307 include, but are not limited to, the specific identity of the recipient of the message and adding the ability to have a per-message offline analysis that determines whether to trigger a message as suspect. In one embodiment, the analysis can be in-line or asynchronously off-line and would typically miss an initial or first example of an extrusion message but would be used for other "like messages" where the criteria for "like" is a trigger parameter that can be dynamically installed in the trigger monitoring system. In addition, as discussed below, in one embodiment, trigger parameters are applied heuristically and new trigger parameters that are discovered by the application of process 300 for virtual asset assisted extrusion detection in a cloud computing environment are added to create a self-learning extrusion detection system.

In various other embodiments, any other trigger parameter, or combination of trigger parameters, as discussed herein, and/or as known in the art at the time of filing, and/or as developed after the time of filing is/are defined at DEFINE ONE OR MORE TRIGGER PARAMETERS OPERATION 307.

As noted above, in one embodiment, trigger parameters are applied heuristically and new trigger parameters that are discovered by the application of process 300 for virtual asset assisted extrusion detection in a cloud computing environment are added to create a self-learning extrusion detection system.

In one embodiment, once one or more trigger parameters are defined at DEFINE ONE OR MORE TRIGGER PARAMETERS OPERATION 307, process flow proceeds to GENERATE TRIGGER DATA REPRESENTING THE TRIGGER PARAMETERS OPERATION 309.

In one embodiment, at GENERATE TRIGGER DATA REPRESENTING THE TRIGGER PARAMETERS OPERATION 309 machine-readable trigger data is generated representing the trigger parameters of DEFINE ONE OR MORE TRIGGER PARAMETERS OPERATION 307.

In one embodiment, once machine-readable trigger data is generated representing the trigger parameters of DEFINE ONE OR MORE TRIGGER PARAMETERS OPERATION 307 at GENERATE TRIGGER DATA REPRESENTING THE TRIGGER PARAMETERS OPERATION 309, process flow proceeds PROVIDE THE TRIGGER DATA TO THE TRIGGER MONITORING SYSTEMS OF THE EXTRUSION DETECTION CAPABLE VIRTUAL ASSETS OPERATION 311.

In one embodiment, at PROVIDE THE TRIGGER DATA TO THE TRIGGER MONITORING SYSTEMS OF THE EXTRUSION DETECTION CAPABLE VIRTUAL ASSETS OPERATION 311 at least part of the trigger data of GENERATE TRIGGER DATA REPRESENTING THE TRIGGER PARAMETERS OPERATION 309 is provided to the trigger monitoring systems of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305.

In one embodiment, once at least part of the trigger data of GENERATE TRIGGER DATA REPRESENTING THE TRIGGER PARAMETERS OPERATION 309 is provided to the trigger monitoring systems of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 at PROVIDE THE TRIGGER DATA TO THE TRIGGER MONITORING SYSTEMS OF THE EXTRUSION DETECTION CAPABLE VIRTUAL ASSETS OPERATION 311, process flow proceeds to USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313.

In one embodiment, at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 the trigger data of GENERATE TRIGGER DATA REPRESENTING THE TRIGGER PARAMETERS OPERATION 309 and the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 are used to monitor at least part of the message data associated with at least some of the extrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305.

In one embodiment, at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 the at least part of the message data associated with at least some of the message traffic from the extrusion detection capable virtual assets is decrypted by the decryption capability associated with the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 before the trigger data of GENERATE TRIGGER DATA REPRESENTING THE TRIGGER PARAMETERS OPERATION 309 and the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 are used to monitor at least part of the message data associated with at least some of the message traffic from the extrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305.

In one embodiment, at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 a sample part of the message data associated with at least some of the message traffic from at least some of the extrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 is monitored to detect one or more of the one or more trigger parameters within the message data.

In one embodiment, at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 all of the message data from at least some of the extrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 is monitored to detect one or more of the one or more trigger parameters within the message data.

In one embodiment, at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 at least part of the message data from all of the extrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 is monitored to detect one or more of the one or more trigger parameters within the message data.

In one embodiment, at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 all of the message data associated with all of the extrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 is monitored to detect one or more of the one or more trigger parameters within the message data.

In one embodiment, the analysis of USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 is performed by the trigger monitoring systems in-line, or asynchronously off-line, on a per-message basis. Consequently, in some embodiments, an initial or first example of an extrusion message is passed through a given extrusion detection capable virtual asset but would be used to stop other "like messages" where the criteria for "like" is a trigger parameter that can be dynamically installed in the trigger monitoring system.

In addition, in one embodiment, trigger parameters are applied heuristically at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 and new trigger parameters that are discovered by the application of process 300 for virtual asset assisted extrusion detection in a cloud computing environment are added to create a self-learning extrusion detection system.

In one embodiment, once the trigger data of GENERATE TRIGGER DATA REPRESENTING THE TRIGGER PARAMETERS OPERATION 309 and the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 are used to monitor at least part of the message data associated with at least some of the extrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO EXTRUSION DETECTION CAPABLE VIRTUAL ASSETS OPERATION 305 at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313, process flow proceeds to CLASSIFY ANY DETECTED MESSAGE INCLUDING ONE OR MORE OF THE TRIGGER PARAMETERS AS A SUSPECT MESSAGE OPERATION 315.

In one embodiment, at CLASSIFY ANY DETECTED MESSAGE INCLUDING ONE OR MORE OF THE TRIGGER PARAMETERS AS A SUSPECT MESSAGE OPERATION 315, if one or more of the one or more trigger parameters of DEFINE ONE OR MORE TRIGGER PARAMETERS OPERATION 307 is detected within the message data associated with a given message, the classification data associated with that message is transformed into classification data indicating that the detected message including one or more of the one or more trigger parameters is a suspect message.

In one embodiment, once the classification data associated with messages having one or more of the one or more trigger parameters of DEFINE ONE OR MORE TRIGGER PARAMETERS OPERATION 307 is transformed into classification data indicating that the detected message including one or more of the one or more trigger parameters is a suspect message at CLASSIFY ANY DETECTED MESSAGE INCLUDING ONE OR MORE OF THE TRIGGER PARAMETERS AS A SUSPECT MESSAGE OPERATION 315, process flow proceeds to ASSIGN A THREAT SCORE TO THE SUSPECT MESSAGE AT LEAST PARTIALLY BASED ON A POTENTIAL IMPACT OF THE SUSPECT MESSAGE'S POTENTIAL SECURITY THREAT ON THE EXTRUSION DETECTION CAPABLE VIRTUAL ASSET OPERATION 317. In one embodiment, at ASSIGN A THREAT SCORE TO THE SUSPECT MESSAGE AT LEAST PARTIALLY BASED ON A POTENTIAL IMPACT OF THE SUSPECT MESSAGE'S POTENTIAL SECURITY THREAT ON THE EXTRUSION DETECTION CAPABLE VIRTUAL ASSET OPERATION 317, a threat score is assigned to the suspect message based, at least partially, on a potential impact of the suspect message's potential security threat on the extrusion detection capable virtual asset.

For example, if the potential security threat can compromise financial data, e.g., credit card information of users, the threat score will be higher than if the potential security threats cause minor decreases in network connectivity speeds, according to one embodiment. To determine the potential impact of the potential security threat, the process evaluates the context of the potential security threat. In other words, the process evaluates the characteristics of the extrusion detection capable virtual asset, the type of threat, the likelihood of success of the threat, and the like.

In one embodiment, a threat score is assigned to the suspect message based on the relative impact of a potential security threat to the extrusion detection capable virtual asset. For example, based on the impact of the potential security threat, a numerical score can be assigned to the suspect message. For example, a score of 10 can be assigned to suspect messages having potential security threats with the highest probability of successful attack and that acquire personal data of users of the extrusion detection capable virtual asset. A 0 (zero) can be assigned to suspect messages having potential security threats with the lowest probability of successful attack and/or that are likely to have a negligible effect on the performance of the extrusion detection capable virtual asset, according to one embodiment. Various factors, such as asset configuration, number of subscribers, security features developed into the extrusion detection capable virtual asset, notification of new security threats or external risks, or input from a third party vulnerability scanner, can provide context while assessing a potential security threat and assigning a threat score. In some embodiments, the threat scores range from 0 to 10. In other embodiments, the threat scores range from 0 to 100. In yet other embodiments, the threat scores include values or indicators such as, "LOW," "MEDIUM," and "HIGH." In one embodiment, the threat scores can include color coordinating so that high priority potential security threats are a first color such as red, low priority potential security threats are a second color different from the first color, such as orange, and the absence of potential security threats is indicated with a third color different from the first and second colors, such as green. As those of skill in the art will appreciate, other scoring ranges or values can be used while assigning a threat score to a suspect message having a potential security threat, according to various embodiments.

In one embodiment, once a threat score is assigned to the suspect message at ASSIGN A THREAT SCORE TO THE SUSPECT MESSAGE AT LEAST PARTIALLY BASED ON A POTENTIAL IMPACT OF THE SUSPECT MESSAGE'S POTENTIAL SECURITY THREAT ON THE EXTRUSION DETECTION CAPABLE VIRTUAL ASSET OPERATION 317, process flow proceeds to PROVIDE THE THREAT SCORE TO THE EXTRUSION DETECTION CAPABLE VIRTUAL ASSET TO ENABLE THE EXTRUSION DETECTION CAPABLE VIRTUAL ASSET TO SECURE AGAINST THE POTENTIAL SECURITY THREAT OPERATION 319.

In one embodiment, at PROVIDE THE THREAT SCORE TO THE EXTRUSION DETECTION CAPABLE VIRTUAL ASSET TO ENABLE THE EXTRUSION DETECTION CAPABLE VIRTUAL ASSET TO SECURE AGAINST THE POTENTIAL SECURITY THREAT OPERATION 319, the threat score is provided to the extrusion detection capable virtual asset to enable the extrusion detection capable virtual asset to secure against the potential security threat.

In some embodiments, threat scores associated with suspect messages are provided to the extrusion detection capable virtual assets on a periodic basis in digests, rather than in real time. In some embodiments, threat scores between 0 and 5 are periodically provided to the extrusion detection capable virtual assets, e.g., on a weekly, semi-monthly, or monthly basis. In one embodiment, threat scores of between 8 and 10 are immediately provided to the extrusion detection capable virtual assets. In one embodiment, threat scores are provided to the extrusion detection capable virtual assets according to the computing resources and human resources available.

The threat scores are provided to the extrusion detection capable virtual assets for consideration and/or remedial action, according to one embodiment. In some embodiments, one or more identifiers, e.g., an IP address, involved in the potential security threat are provided to the extrusion detection capable virtual assets to allow the extrusion detection capable virtual assets to block future communications associated with the suspect message.

In one embodiment, the extrusion detection capable virtual asset secures against the potential security threat by submitting the security threat to disciplinary authorities to track down and punish the author(s) of the security threat. In other embodiments, the extrusion detection capable virtual asset secures against the potential security threat by blocking access of one or more computing systems to the extrusion detection capable virtual asset.

In one embodiment, once the threat score is provided to the extrusion detection capable virtual asset at PROVIDE THE THREAT SCORE TO THE EXTRUSION DETECTION CAPABLE VIRTUAL ASSET TO ENABLE THE EXTRUSION DETECTION CAPABLE VIRTUAL ASSET TO SECURE AGAINST THE POTENTIAL SECURITY THREAT OPERATION 319, process flow proceeds to FOR EACH SUSPECT MESSAGE GENERATE SUSPECT MESSAGE COPY DATA REPRESENTING A COPY OF AT LEAST A PORTION OF THE SUSPECT MESSAGE OPERATION 321.

In one embodiment, the detected suspect messages of CLASSIFY ANY DETECTED MESSAGE INCLUDING ONE OR MORE OF THE TRIGGER PARAMETERS AS A SUSPECT MESSAGE OPERATION 315 are temporarily permitted to be transmitted from the virtual assets through the network communications channel with minimal delay.

In one embodiment, this transmission is permitted in order to avoid significantly disrupting or delaying the transmission of messages without further evidence that the suspect messages are indeed malicious. However, in one embodiment, at FOR EACH SUSPECT MESSAGE GENERATE SUSPECT MESSAGE COPY DATA REPRESENTING A COPY OF AT LEAST A PORTION OF THE SUSPECT MESSAGE OPERATION 321, for each detected suspect message of CLASSIFY ANY DETECTED MESSAGE INCLUDING ONE OR MORE OF THE TRIGGER PARAMETERS AS A SUSPECT MESSAGE OPERATION 315, suspect message copy data is generated representing a copy of at least part of the message data making up the suspect message.

In one embodiment, for each detected suspect message of CLASSIFY ANY DETECTED MESSAGE INCLUDING ONE OR MORE OF THE TRIGGER PARAMETERS AS A SUSPECT MESSAGE OPERATION 315, the at least part of the message data making up the suspect message is decrypted and decrypted suspect message copy data is generated representing a decrypted copy of at least part of the message data making up the suspect message at FOR EACH SUSPECT MESSAGE GENERATE SUSPECT MESSAGE COPY DATA REPRESENTING A COPY OF AT LEAST A PORTION OF THE SUSPECT MESSAGE OPERATION 321.

In one embodiment, once for each detected suspect message of CLASSIFY ANY DETECTED MESSAGE INCLUDING ONE OR MORE OF THE TRIGGER PARAMETERS AS A SUSPECT MESSAGE OPERATION 315, suspect message copy data is generated representing a copy of at least part of the message data making up the suspect message at FOR EACH SUSPECT MESSAGE GENERATE SUSPECT MESSAGE COPY DATA REPRESENTING A COPY OF AT LEAST A PORTION OF THE SUSPECT MESSAGE OPERATION 321, process flow proceeds to TRANSFER THE SUSPECT MESSAGE COPY DATA TO ONE OR MORE ANALYSIS SYSTEMS FOR FURTHER ANALYSIS OPERATION 323.

In one embodiment, at TRANSFER THE SUSPECT MESSAGE COPY DATA TO ONE OR MORE ANALYSIS SYSTEMS FOR FURTHER ANALYSIS OPERATION 323, the suspect message copy data of FOR EACH SUSPECT MESSAGE GENERATE SUSPECT MESSAGE COPY DATA REPRESENTING A COPY OF AT LEAST A PORTION OF THE SUSPECT MESSAGE OPERATION 321 is transmitted to one or more analysis systems for further analysis in an "off-line" environment.

In one embodiment, at TRANSFER THE SUSPECT MESSAGE COPY DATA TO ONE OR MORE ANALYSIS SYSTEMS FOR FURTHER ANALYSIS OPERATION 323, the suspect message copy data of FOR EACH SUSPECT MESSAGE GENERATE SUSPECT MESSAGE COPY DATA REPRESENTING A COPY OF AT LEAST A PORTION OF THE SUSPECT MESSAGE OPERATION 321 is transmitted to the one or more analysis systems via a message analysis channel, also referred to herein as a third communications channel, that is distinct from the network communications channel, i.e., the first communications channel through which messages are transmitted from the virtual assets relayed by the network communications device of PROVIDE A CLOUD COMPUTING ENVIRONMENT INCLUDING ONE OR MORE VIRTUAL ASSETS OPERATION 303. In this way, the transmission of the suspect message copy data, and the subsequent message data analysis, does not affect the operation of the virtual asset, and/or the cloud computing environment, application, service, enterprise, and/or infrastructure associated with the virtual asset.

In one embodiment, multiple analysis systems are provided at TRANSFER THE SUSPECT MESSAGE COPY DATA TO ONE OR MORE ANALYSIS SYSTEMS FOR FURTHER ANALYSIS OPERATION 323 that are specifically implemented to analyze specific trigger parameters of DEFINE ONE OR MORE TRIGGER PARAMETERS OPERATION 307.

Consequently, in one embodiment, the particular analysis system to which a given example of suspect message data is transmitted at TRANSFER THE SUSPECT MESSAGE COPY DATA TO ONE OR MORE ANALYSIS SYSTEMS FOR FURTHER ANALYSIS OPERATION 323 is determined, at least in part, by the specific trigger parameter detected in the suspect message at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 from which the suspect message copy data was derived at FOR EACH SUSPECT MESSAGE GENERATE SUSPECT MESSAGE COPY DATA REPRESENTING A COPY OF AT LEAST A PORTION OF THE SUSPECT MESSAGE OPERATION 321.

In one embodiment, if, as a result of the analysis of the suspect message copy data by one or more of the analysis systems at TRANSFER THE SUSPECT MESSAGE COPY DATA TO ONE OR MORE ANALYSIS SYSTEMS FOR FURTHER ANALYSIS OPERATION 323, it is determined that the suspect message is indeed associated with an extrusion attack, one or more systems, entities, and/or parties, are alerted to the situation so that appropriate protective action can be taken.

In one embodiment, if, as a result of the analysis of the suspect message copy data by one or more of the analysis systems at TRANSFER THE SUSPECT MESSAGE COPY DATA TO ONE OR MORE ANALYSIS SYSTEMS FOR FURTHER ANALYSIS OPERATION 323, it is determined that the suspect message is indeed associated with an extrusion attack, one or more protective actions are automatically taken to prevent further infection of the virtual assets, and/or other virtual assets, and/or the cloud computing environment, application, service, infrastructure, or computing environment, associated with the now identified infected virtual asset.

In various embodiments, the protective actions taken can include, but are not limited to, isolating the virtual asset such that the virtual asset can still continue to operate, but in total isolation of all other virtual assets; partially isolating the virtual asset such that the virtual asset is allowed to connect to some very specific virtual assets, but has most of its communication channels blocked; "killing" or terminating the virtual asset; repairing the virtual asset by re-loading the compromised sub-components of the virtual asset; and/or any other protective actions, or combination of protective actions, discussed herein, and/or as known in the art at the time of filing, and/or as developed, or become known, after the time of filing.

In addition, trigger parameters are applied heuristically at USE THE TRIGGER MONITORING SYSTEMS AND THE TRIGGER DATA TO MONITOR AT LEAST A PORTION OF THE MESSAGE TRAFFIC SENT FROM EACH OF THE EXTRUSION DETECTION CAPABLE VIRTUAL ASSETS TO DETECT ANY MESSAGE INCLUDING ONE OR MORE OF THE TRIGGER PARAMETERS OPERATION 313 and if, as a result of the analysis of the suspect message copy data by one or more of the analysis systems at TRANSFER THE SUSPECT MESSAGE COPY DATA TO ONE OR MORE ANALYSIS SYSTEMS FOR FURTHER ANALYSIS OPERATION 323, it is determined that the suspect message is indeed associated with an extrusion attack, new trigger parameters that are thereby discovered by the application of process 300 for virtual asset assisted extrusion detection in a cloud computing environment are added to create a self-learning extrusion detection system.

In one embodiment, once the suspect message copy data of FOR EACH SUSPECT MESSAGE GENERATE SUSPECT MESSAGE COPY DATA REPRESENTING A COPY OF AT LEAST A PORTION OF THE SUSPECT MESSAGE OPERATION 321 is transmitted to one or more analysis systems for further analysis in an "off-line" environment at TRANSFER THE SUSPECT MESSAGE COPY DATA TO ONE OR MORE ANALYSIS SYSTEMS FOR FURTHER ANALYSIS OPERATION 323, process flow proceeds to EXIT OPERATION 330.

In one embodiment, at EXIT OPERATION 330 process 300 for virtual asset assisted extrusion detection in a cloud computing environment is exited to await new data.

Using process 300 for virtual asset assisted extrusion detection in a cloud computing environment discussed above, extrusion attacks can be detected using largely existing cloud computing environment infrastructure, such as modified virtual assets with added trigger monitoring systems; without the need for devoting extensive and/or specialized resources. Consequently, using process 300 for virtual asset assisted extrusion detection in a cloud computing environment, extrusion events can be efficiently and effectively detected; thereby making distributed computing environments, such as cloud computing environments, more secure.

In accordance with one embodiment, a process for virtual asset assisted intrusion detection in a cloud computing environment includes providing a cloud computing environment. In one embodiment, the cloud computing environment includes one or more virtual assets. In one embodiment, one or more of the one or more virtual assets in the cloud computing environment is provided a trigger monitoring system; thereby transforming the one or more virtual assets in the cloud computing environment provided a trigger monitoring system into intrusion detection capable virtual assets for the cloud computing environment. In one embodiment, one or more trigger parameters are defined and trigger data representing the trigger parameters is generated. In one embodiment, the trigger data is provided to the trigger monitoring systems of the intrusion detection capable virtual assets. The trigger monitoring systems and the trigger data are then used to monitor at least a portion of the message traffic sent to the virtual assets in the cloud computing environment to detect any message including one or more of the one or more trigger parameters.

In one embodiment, any detected message including one or more of the one or more trigger parameters is identified as a suspect message and, for each suspect message, suspect message copy data representing a copy of at least a portion of the suspect message is generated. In one embodiment, the suspect message copy data is then transferred to one or more analysis systems for further analysis.

Figure 4:
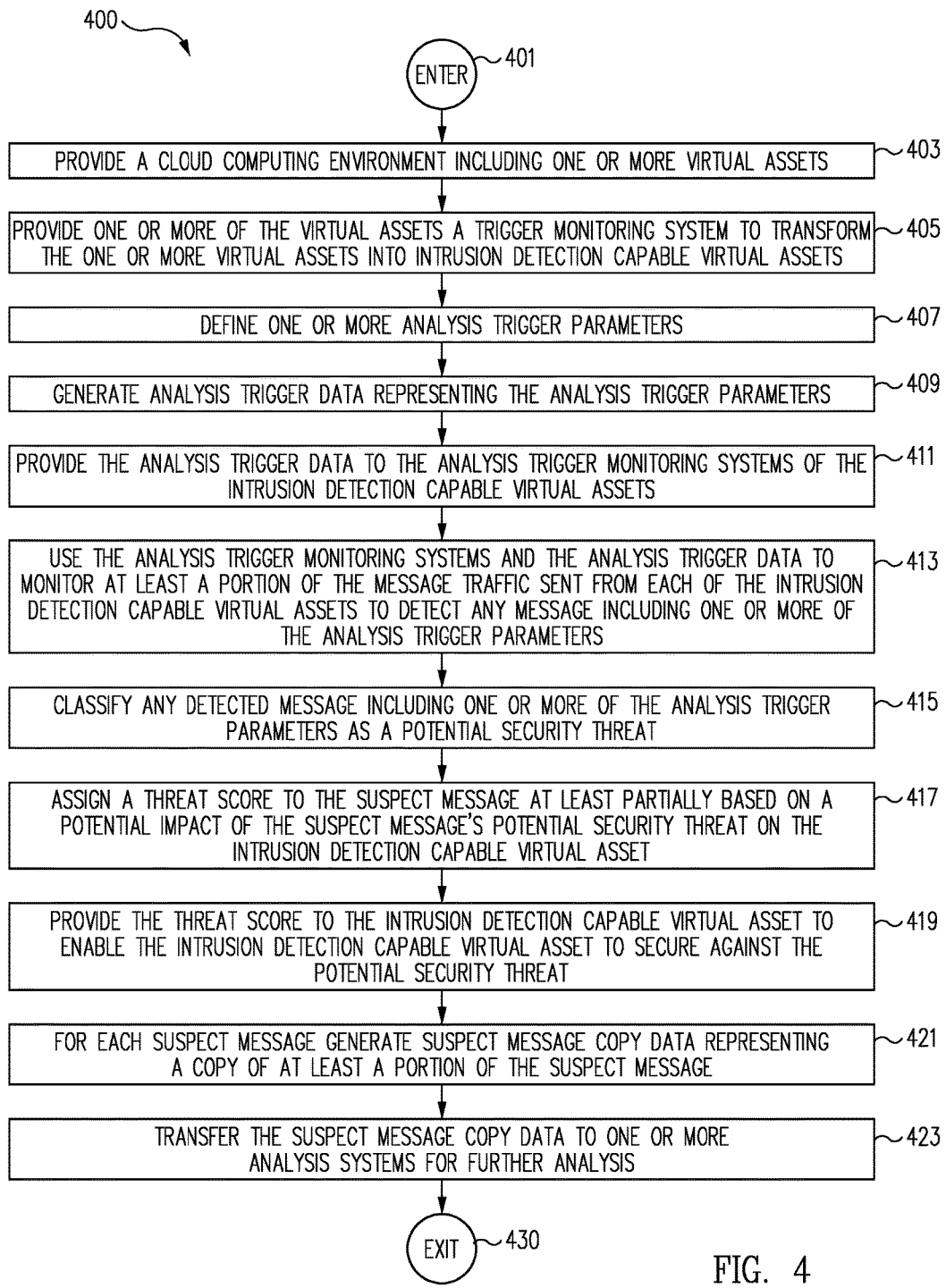
FIG. 4 is a flow chart depicting a process for virtual asset assisted intrusion detection in a cloud computing environment in accordance with one embodiment.

FIG. 4 is a flow chart of a process 400 for virtual asset assisted intrusion detection in a cloud computing environment in accordance with one embodiment. In one embodiment, process 400 for virtual asset assisted intrusion detection in a cloud computing environment begins at ENTER OPERATION 401 of FIG. 4 and process flow proceeds to PROVIDE A CLOUD COMPUTING ENVIRONMENT INCLUDING ONE OR MORE VIRTUAL ASSETS OPERATION 403.

In one embodiment, at PROVIDE A CLOUD COMPUTING ENVIRONMENT INCLUDING ONE OR MORE VIRTUAL ASSETS OPERATION 403 a cloud computing environment is provided.

In various embodiments, the cloud computing environment of PROVIDE A CLOUD COMPUTING ENVIRONMENT INCLUDING ONE OR MORE VIRTUAL ASSETS OPERATION 403 can be any form of cloud computing environment, such as, but not limited to, a Virtual Private Cloud, or VPC.

In many cases, a given application or service provided through a cloud computing infrastructure may utilize, and interface with, multiple cloud computing environments, including multiple VPCs, in the course of providing the associated service. As noted above, each cloud computing environment includes allocated virtual assets associated with, and controlled or used by, the party utilizing the cloud computing environment.

As used herein, the term "virtual asset" includes any virtualized entity or resource, and/or part of an actual, or "bare metal" entity requiring access to various resources, and types of resources. In various embodiments, the virtual assets can be, but are not limited to, virtual machines, virtual servers, and instances implemented in a cloud computing environment; databases implemented, or associated with, a cloud computing environment, and/or instances implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc. requiring access to various resources, and/or types of resources, located within a data center, within a cloud computing environment, and/or any other physical or logical location, as discussed herein, and/or as known/available in the art at the time of filing, and/or as developed/made available after the time of filing.

In one embodiment, virtual asset creation data is generated through a virtual asset creation system such as a virtual asset template through which the creator of a virtual asset can generate operational logic and assign resources and attributes to the virtual assets to be instantiated in a cloud computing environment, such as a virtual private cloud computing environment.

In one embodiment, once a cloud computing environment is provided at PROVIDE A CLOUD COMPUTING ENVIRONMENT INCLUDING ONE OR MORE VIRTUAL ASSETS OPERATION 403, process flow proceeds to PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405.

In one embodiment, at PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 a network communications device is provided for each cloud computing environment of PROVIDE A CLOUD COMPUTING ENVIRONMENT INCLUDING ONE OR MORE VIRTUAL ASSETS OPERATION 403.

In various embodiments, the network communications devices of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 provided for the cloud computing environments of PROVIDE A CLOUD COMPUTING ENVIRONMENT INCLUDING ONE OR MORE VIRTUAL ASSETS OPERATION 403 include, but are not limited to, one or more of a switching system, such as a network switch; a router; a border router; any gateway system; a firewall system; a load balancing system; a hypervisor; or any communication, relay, or routing system, as discussed herein, and/or as known in the art at the time of filing, and/or as developed after the time of filing, through which message traffic on a network communications channel to, or from, an external network, such as the Internet, is relayed, and/or routed, to one or more virtual assets in a cloud computing environment.

In one embodiment, incoming message traffic sent to one or more of the virtual assets associated with a given cloud computing environment of PROVIDE A CLOUD COMPUTING ENVIRONMENT INCLUDING ONE OR MORE VIRTUAL ASSETS OPERATION 403 from an origin external to the cloud computing environment, such as the Internet, is relayed through the network communications device for that cloud computing environment of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405.

In one embodiment, the incoming message traffic is relayed through the network communications device of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 via at least one communications channel, e.g., a network communications channel, herein also referred to as a first communications channel.

As noted above, in various embodiments, the incoming message traffic from the virtual assets associated with a given cloud computing environment of PROVIDE A CLOUD COMPUTING ENVIRONMENT INCLUDING ONE OR MORE VIRTUAL ASSETS OPERATION 403 are susceptible to the introduction of malware and, in particular, intrusion related malware.

As also noted above, the fact that malware can be introduced into the cloud computing environments of PROVIDE A CLOUD COMPUTING ENVIRONMENT INCLUDING ONE OR MORE VIRTUAL ASSETS OPERATION 403 is a long standing problem. Consequently, the detection of malware intrusion is an important part of making the cloud computing environments of PROVIDE A CLOUD COMPUTING ENVIRONMENT INCLUDING ONE OR MORE VIRTUAL ASSETS OPERATION 403 more secure. However, as also noted above, a given cloud computing environment, and/or virtual private cloud computing environment, can include hundreds, thousands, or even millions, of virtual assets, owned or used by hundreds, thousands, or even millions, of parties. Consequently, detecting malware intrusion in a cloud computing environment is currently an extremely difficult and resource intensive task.

To address this issue, in one embodiment, at PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 one or more virtual assets within, and/or assigned to, the cloud computing environment of PROVIDE A CLOUD COMPUTING ENVIRONMENT INCLUDING ONE OR MORE VIRTUAL ASSETS OPERATION 403 are provided a trigger monitoring system.

In one embodiment, by virtue of the addition of the trigger monitoring system logic to one or more of the one or more virtual assets in the cloud computing environment at PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 the one or more virtual assets in the cloud computing environment provided a trigger monitoring system are transformed into intrusion detection capable virtual assets for the cloud computing environment.

In various embodiments, the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 is a module of software and/or logic implemented in, or on, the one or more virtual assets and capable of monitoring at least a portion of the message traffic to one or more virtual assets instantiated in the cloud computing environment.

In various embodiments, process 400 for virtual asset assisted intrusion detection in a cloud computing environment is applied to network communications, e.g., message traffic, which is in plain text or is encrypted. Consequently, in some embodiments, the trigger monitoring system, and/or the network communications device, and/or the intrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 include a decryption capability to decrypt incoming message traffic as part of the monitoring and analysis. In other embodiments, a decryption capability is provided to decrypt incoming message traffic prior to being provided to trigger monitoring system and any monitoring and analysis.

As discussed below, in some embodiments, the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 allows for analysis policies to be added, or removed, dynamically based on alerts that are received.

In one embodiment, once one or more virtual assets within, and/or assigned to, the cloud computing environment of PROVIDE A CLOUD COMPUTING ENVIRONMENT INCLUDING ONE OR MORE VIRTUAL ASSETS OPERATION 403 are provided a trigger monitoring system at PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405, process flow proceeds to DEFINE ONE OR MORE TRIGGER PARAMETERS OPERATION 407.

In one embodiment, at DEFINE ONE OR MORE TRIGGER PARAMETERS OPERATION 407 one or more trigger parameters are defined such that if one or more of the one or more trigger parameters are detected in a message to a virtual asset, then that message is deemed a suspect message that is potentially associated with an intrusion attack on the virtual asset, and/or the cloud computing environment.

In various embodiments, the trigger parameters of DEFINE ONE OR MORE TRIGGER PARAMETERS OPERATION 407 can be dynamically added, removed, and/or modified to reflect various policies, and/or policy changes made in response to malware alerts. In addition, as discussed below, in one embodiment, trigger parameters are applied heuristically and new trigger parameters that are discovered by the application of process 400 for virtual asset assisted intrusion detection in a cloud computing environment are added to create a self-learning intrusion detection system.

In various embodiments, specific examples of trigger parameters of DEFINE ONE OR MORE TRIGGER PARAMETERS OPERATION 407 include, but are not limited to, the presence of an IP address in a message indicating a designated suspect origin. In one embodiment, this trigger parameter is used to detect messages coming from a designated suspicious entity that is suspected of being associated with malware. In various embodiments, the IP addresses associated with designated suspicious entities, and/or the identity of the entities themselves, is provided by one or more third parties via alerts or other mechanisms.

In various embodiments, specific examples of trigger parameters of DEFINE ONE OR MORE TRIGGER PARAMETERS OPERATION 407 include, but are not limited to, the presence of an IP address in a message indicating a designated suspect geographical region. In one embodiment, this trigger parameter is used to detect messages coming from geographical locations that are known to be associated with malware. In various embodiments, the geographical locations known to be associated with malware are provided by the one or more third parties via alerts or other mechanisms.

In various embodiments, specific examples of trigger parameters of DEFINE ONE OR MORE TRIGGER PARAMETERS OPERATION 407 include, but are not limited to, the presence of an IP address in a message indicating an origin that is not included on a list of authorized, or expected, origins of messages transmitted to the virtual assets. In one embodiment, this trigger parameter is used to detect message traffic that would not be expected to be received in the normal course of operation of the virtual assets according to their operational mission.

In various embodiments, specific examples of trigger parameters of DEFINE ONE OR MORE TRIGGER PARAMETERS OPERATION 407 include, but are not limited to, the presence of an IP address in a message indicating a geographical location that is not included on a list of authorized, or expected, geographical locations to be associated with messages to be transmitted to the virtual assets. In one embodiment, this trigger parameter is used to detect message traffic that would not be expected to be received in the normal course of operation of the virtual assets according to their operational instructions.

In various embodiments, specific examples of trigger parameters of DEFINE ONE OR MORE TRIGGER PARAMETERS OPERATION 407 include, but are not limited to, setting a threshold maximum message size and determining that a given message is of a size exceeding the threshold maximum message size. In one embodiment, this trigger parameter takes advantage of the fact that many forms of malware require message sizes larger than those normally associated with a given virtual asset in order to export the malware necessary to execute the malicious intent.

In various embodiments, specific examples of trigger parameters of DEFINE ONE OR MORE TRIGGER PARAMETERS OPERATION 407 include, but are not limited to, setting a threshold minimum message size and determining that a given message is of a size that is less than the threshold minimum message size. In one embodiment, this trigger is used to detect messages of a size that is smaller than a message size determined to be typical with respect to a given virtual asset, and that are therefore suspicious.

In various embodiments, specific examples of trigger parameters of DEFINE ONE OR MORE TRIGGER PARAMETERS OPERATION 407 include, but are not limited to, trigger parameters based on frequency analysis of the access pattern indicating that messages arrive too frequently or too infrequently.

In various embodiments, specific examples of trigger parameters of DEFINE ONE OR MORE TRIGGER PARAMETERS OPERATION 407 include, but are not limited to, a hash value of at least part of the message data that is not included in a list of allowed hash values. In one embodiment, this trigger parameter is used in conjunction with a hash-based analysis of at least part of a given message being transmitted to a virtual asset. In one embodiment, allowable hash values are defined and then a hash is performed on at least part of a given message. In one embodiment, if the hash of the portion of the given message does not match any of the allowed hash values, the message is determined to be suspect.

In various embodiments, specific examples of trigger parameters of DEFINE ONE OR MORE TRIGGER PARAMETERS OPERATION 407 include, but are not limited to, an MD5 value of the message data that is not included in a list of allowed MD5 values.

MD5 (Message-Digest algorithm five) is a widely used cryptographic hash function producing a 128 bit (16 byte) hash value that is typically expressed as a 32 digit hexadecimal number. In one embodiment, the MD5 algorithm is applied to at least part of the message data associated with a given message and the resulting MD5 value is compared with a list of allowed MD5 values. If the resulting MD5 value does not match any of the allowed MD5 values, then the message is considered suspect.

In various embodiments, specific examples of trigger parameters of DEFINE ONE OR MORE TRIGGER PARAMETERS OPERATION 407 include, but are not limited to, the specific identity of the sender of the message and adding the ability to have a per-message offline analysis that determines whether to trigger a message as suspect. In one embodiment, the analysis can be in-line or asynchronously off-line and would typically miss an initial or first example of an intrusion message but would be used for other "like messages" where the criteria for "like" is a trigger parameter that can be dynamically installed in the trigger monitoring system. In addition, as discussed below, in one embodiment, trigger parameters are applied heuristically and new trigger parameters that are discovered by the application of process 400 for virtual asset assisted intrusion detection in a cloud computing environment are added to create a self-learning intrusion detection system.

In various embodiments, specific examples of trigger parameters of DEFINE ONE OR MORE TRIGGER PARAMETERS OPERATION 407 include, but are not limited to, the specific identity of the recipient of the message and adding the ability to have a per-message offline analysis that determines whether to trigger a message as suspect. In one embodiment, the analysis can be in-line or asynchronously off-line and would typically miss an initial or first example of an intrusion message but would be used for other "like messages" where the criteria for "like" is a trigger parameter that can be dynamically installed in the trigger monitoring system. In addition, as discussed below, in one embodiment, trigger parameters are applied heuristically and new trigger parameters that are discovered by the application of process 400 for virtual asset assisted intrusion detection in a cloud computing environment are added to create a self-learning intrusion detection system.

In various other embodiments, any other trigger parameter, or combination of trigger parameters, as discussed herein, and/or as known in the art at the time of filing, and/or as developed after the time of filing is/are defined at DEFINE ONE OR MORE TRIGGER PARAMETERS OPERATION 407. In addition, as discussed below, in one embodiment, trigger parameters are applied heuristically and new trigger parameters that are discovered by the application of process 400 for virtual asset assisted intrusion detection in a cloud computing environment are added to create a self-learning intrusion detection system.

In one embodiment, once one or more trigger parameters are defined at DEFINE ONE OR MORE TRIGGER PARAMETERS OPERATION 407, process flow proceeds to GENERATE TRIGGER DATA REPRESENTING THE TRIGGER PARAMETERS OPERATION 409.

In one embodiment, at GENERATE TRIGGER DATA REPRESENTING THE TRIGGER PARAMETERS OPERATION 409 machine-readable trigger data is generated representing the trigger parameters of DEFINE ONE OR MORE TRIGGER PARAMETERS OPERATION 407.

In one embodiment, once machine-readable trigger data is generated representing the trigger parameters of DEFINE ONE OR MORE TRIGGER PARAMETERS OPERATION 407 at GENERATE TRIGGER DATA REPRESENTING THE TRIGGER PARAMETERS OPERATION 409, process flow proceeds PROVIDE THE TRIGGER DATA TO THE TRIGGER MONITORING SYSTEMS OF THE INTRUSION DETECTION CAPABLE VIRTUAL ASSETS OPERATION 411.

In one embodiment, at PROVIDE THE TRIGGER DATA TO THE TRIGGER MONITORING SYSTEMS OF THE INTRUSION DETECTION CAPABLE VIRTUAL ASSETS OPERATION 411 at least part of the trigger data of GENERATE TRIGGER DATA REPRESENTING THE TRIGGER PARAMETERS OPERATION 409 is provided to the trigger monitoring systems of PROVIDE A NETWORK COMMUNICATIONS DEVICE FOR RELAYING MESSAGE TRAFFIC SENT TO EACH OF THE VIRTUAL ASSETS OPERATION 405.

In one embodiment, once at least part of the trigger data of GENERATE TRIGGER DATA REPRESENTING THE TRIGGER PARAMETERS OPERATION 409 is provided to the trigger monitoring systems of PROVIDE A NETWORK COMMUNICATIONS DEVICE FOR RELAYING MESSAGE TRAFFIC SENT TO EACH OF THE VIRTUAL ASSETS OPERATION 405 at PROVIDE THE TRIGGER DATA TO THE TRIGGER MONITORING SYSTEMS OF THE INTRUSION DETECTION CAPABLE VIRTUAL ASSETS OPERATION 411, process flow proceeds to USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413.

In one embodiment, at USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413 the trigger data of GENERATE TRIGGER DATA REPRESENTING THE TRIGGER PARAMETERS OPERATION 409 and the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 are used to monitor at least part of the message data associated with at least some of the intrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405.

In one embodiment, at USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413 the at least part of the message data associated with at least some of the message traffic to the intrusion detection capable virtual assets is decrypted by the decryption capability associated with the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 before the trigger data of GENERATE TRIGGER DATA REPRESENTING THE TRIGGER PARAMETERS OPERATION 409 and the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 are used to monitor at least part of the message data associated with at least some of the message traffic to the intrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405.

In one embodiment, at USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413 a sample part of the message data associated with at least some of the message traffic to at least some of the intrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 is monitored to detect one or more of the one or more trigger parameters within the message data.

In one embodiment, at USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413 all of the message data to at least some of the intrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 is monitored to detect one or more of the one or more trigger parameters within the message data.

In one embodiment, at USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413 at least part of the message data from all of the intrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 is monitored to detect one or more of the one or more trigger parameters within the message data.

In one embodiment, at USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413 all of the message data associated with all of the intrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 is monitored to detect one or more of the one or more trigger parameters within the message data.

In one embodiment, the analysis of USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413 is performed by the trigger monitoring systems in-line, or asynchronously off-line, on a per-message basis. Consequently, in some embodiments, an initial or first example of an intrusion message is passed through a given intrusion detection capable virtual asset but would be used to stop other "like messages" where the criteria for "like" is a trigger parameter that can be dynamically installed in the trigger monitoring system.

In addition, in one embodiment, trigger parameters are applied heuristically at USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413 and new trigger parameters that are discovered by the application of process 400 for virtual asset assisted intrusion detection in a cloud computing environment are added to create a self-learning intrusion detection system.

In one embodiment, once the trigger data of GENERATE TRIGGER DATA REPRESENTING THE TRIGGER PARAMETERS OPERATION 409 and the trigger monitoring system of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 are used to monitor at least part of the message data associated with at least some of the intrusion detection capable virtual assets of PROVIDE ONE OR MORE OF THE VIRTUAL ASSETS A TRIGGER MONITORING SYSTEM TO TRANSFORM THE ONE OR MORE VIRTUAL ASSETS INTO INTRUSION DETECTION CAPABLE VIRTUAL ASSETS OPERATION 405 at USE THE TRIGGER MONITORING SYSTEMS AND THE TRIGGER DATA TO MONITOR AT LEAST A PORTION OF THE MESSAGE TRAFFIC SENT TO EACH OF THE INTRUSION DETECTION CAPABLE VIRTUAL ASSETS TO DETECT ANY MESSAGE INCLUDING ONE OR MORE OF THE TRIGGER PARAMETERS OPERATION 413, process flow proceeds to CLASSIFY ANY DETECTED MESSAGE INCLUDING ONE OR MORE OF THE TRIGGER PARAMETERS AS A POTENTIAL SECURITY THREAT OPERATION 415.

In one embodiment, at CLASSIFY ANY DETECTED MESSAGE INCLUDING ONE OR MORE OF THE TRIGGER PARAMETERS AS A POTENTIAL SECURITY THREAT OPERATION 415, if one or more of the one or more trigger parameters of DEFINE ONE OR MORE TRIGGER PARAMETERS OPERATION 407 is detected within the message data associated with a given message, the classification data associated with that message is transformed into classification data indicating that the detected message including one or more of the one or more trigger parameters is a suspect message.

In one embodiment, once the classification data associated with messages having one or more of the one or more trigger parameters of DEFINE ONE OR MORE TRIGGER PARAMETERS OPERATION 407 is transformed into classification data indicating that the detected message including one or more of the one or more trigger parameters is a suspect message at CLASSIFY ANY DETECTED MESSAGE INCLUDING ONE OR MORE OF THE TRIGGER PARAMETERS AS A POTENTIAL SECURITY THREAT OPERATION 415, process flow proceeds to ASSIGN A THREAT SCORE TO THE SUSPECT MESSAGE AT LEAST PARTIALLY BASED ON A POTENTIAL IMPACT OF THE SUSPECT MESSAGE'S POTENTIAL SECURITY THREAT ON THE INTRUSION DETECTION CAPABLE VIRTUAL ASSET OPERATION 417.

In one embodiment, at ASSIGN A THREAT SCORE TO THE SUSPECT MESSAGE AT LEAST PARTIALLY BASED ON A POTENTIAL IMPACT OF THE SUSPECT MESSAGE'S POTENTIAL SECURITY THREAT ON THE INTRUSION DETECTION CAPABLE VIRTUAL ASSET OPERATION 417, a threat score is assigned to the suspect message based, at least partially, on a potential impact of the suspect message's potential security threat on the intrusion detection capable virtual asset.

For example, if the potential security threat can compromise financial data, e.g., credit card information of users, the threat score will be higher than if the potential security threats cause minor decreases in network connectivity speeds, according to one embodiment. To determine the potential impact of the potential security threat, the process evaluates the context of the potential security threat. In other words, the process evaluates the characteristics of the intrusion detection capable virtual asset, the type of threat, the likelihood of success of the threat, and the like.

In one embodiment, a threat score is assigned to a suspect message based on the relative impact of a potential security threat to the intrusion detection capable virtual asset. For example, based on the impact of the potential security threat, a numerical threat score can be assigned to the suspect message. For example, a threat score of 10 can be assigned to suspect messages having potential security threats with the highest probability of successful attack and that acquire personal data of users of the intrusion detection capable virtual asset. A 0 (zero) can be assigned to suspect messages having potential security threats with the lowest probability of successful attack and/or that are likely to have a negligible effect on the performance of the intrusion detection capable virtual asset, according to one embodiment. Various factors, such as asset configuration, number of subscribers, security features developed into the intrusion detection capable virtual asset, notification of new security threats or external risks, or input from a third party vulnerability scanner, can provide context while assessing a potential security threat and assigning a threat score. In some embodiments, the threat scores range between 0-10. In other embodiments, the threat scores range between 0 and 100. In yet other embodiments, the threat scores include values, such as, "LOW," "MEDIUM," and "HIGH." In one embodiment, the threat scores can include color coordinating so that high priority potential security threats are red, low priority potential security threats are orange, and the absence of potential security threats is indicated with green. As those of skill in the art will appreciate, other scoring ranges or values can be used while assigning a threat score to a suspect message having a potential security threat, according to various embodiments.

In one embodiment, once a threat score is assigned to the suspect message at ASSIGN A THREAT SCORE TO THE SUSPECT MESSAGE AT LEAST PARTIALLY BASED ON A POTENTIAL IMPACT OF THE SUSPECT MESSAGE'S POTENTIAL SECURITY THREAT ON THE INTRUSION DETECTION CAPABLE VIRTUAL ASSET OPERATION 417, process flow proceeds to PROVIDE THE THREAT SCORE TO THE INTRUSION DETECTION CAPABLE VIRTUAL ASSET TO ENABLE THE INTRUSION DETECTION CAPABLE VIRTUAL ASSET TO SECURE AGAINST THE POTENTIAL SECURITY THREAT OPERATION 419.

In one embodiment, at PROVIDE THE THREAT SCORE TO THE INTRUSION DETECTION CAPABLE VIRTUAL ASSET TO ENABLE THE INTRUSION DETECTION CAPABLE VIRTUAL ASSET TO SECURE AGAINST THE POTENTIAL SECURITY THREAT OPERATION 419, the threat score is provided to the intrusion detection capable virtual asset to enable the intrusion detection capable virtual asset to secure against the potential security threat.

In some embodiments, threat scores associated with suspect messages are provided to the intrusion detection capable virtual assets on a periodic basis in digests, rather than in real time. In some embodiments, threat scores between 0 and 5 are periodically provided to the intrusion detection capable virtual assets, e.g., on a weekly, semi-monthly, or monthly basis. In one embodiment, higher threat scores, e.g. threat scores of between 8 and 10, for example, are immediately provided to the intrusion detection capable virtual assets. In one embodiment, threat scores are provided to the intrusion detection capable virtual assets according to the computing resources and human resources available.

The threat scores are provided to the intrusion detection capable virtual assets for consideration and/or remedial action, according to one embodiment. In some embodiments, one or more identifiers, e.g., an IP address, involved in the potential security threat are provided to the intrusion detection capable virtual assets to allow the intrusion detection capable virtual assets to block future communications associated with the suspect message.

In one embodiment, the intrusion detection capable virtual asset secures against the potential security threat by submitting the security threat to disciplinary authorities to track down and punish the author(s) of the security threat. In other embodiments, the intrusion detection capable virtual asset secures against the potential security threat by blocking access of one or more computing systems to the intrusion detection capable virtual asset.

In one embodiment, once the threat score is provided to the intrusion detection capable virtual asset at PROVIDE THE THREAT SCORE TO THE INTRUSION DETECTION CAPABLE VIRTUAL ASSET TO ENABLE THE INTRUSION DETECTION CAPABLE VIRTUAL ASSET TO SECURE AGAINST THE POTENTIAL SECURITY THREAT OPERATION 419, process flow proceeds to FOR EACH SUSPECT MESSAGE GENERATE SUSPECT MESSAGE COPY DATA REPRESENTING A COPY OF AT LEAST A PORTION OF THE SUSPECT MESSAGE OPERATION 421.

In one embodiment, the detected suspect messages of CLASSIFY ANY DETECTED MESSAGE INCLUDING ONE OR MORE OF THE TRIGGER PARAMETERS AS A POTENTIAL SECURITY THREAT OPERATION 415 are temporarily permitted to be transmitted to the virtual assets through the network communications channel with minimal delay.

In one embodiment, this transmission is permitted in order to avoid significantly disrupting or delaying the transmission of messages without further evidence that the suspect messages are indeed malicious. However, in one embodiment, at FOR EACH SUSPECT MESSAGE GENERATE SUSPECT MESSAGE COPY DATA REPRESENTING A COPY OF AT LEAST A PORTION OF THE SUSPECT MESSAGE OPERATION 421, for each detected suspect message of CLASSIFY ANY DETECTED MESSAGE INCLUDING ONE OR MORE OF THE TRIGGER PARAMETERS AS A POTENTIAL SECURITY THREAT OPERATION 415, suspect message copy data is generated representing a copy of at least part of the message data making up the suspect message.

In one embodiment, for each detected suspect message of CLASSIFY ANY DETECTED MESSAGE INCLUDING ONE OR MORE OF THE TRIGGER PARAMETERS AS A POTENTIAL SECURITY THREAT OPERATION 415, the at least part of the message data making up the suspect message is decrypted and decrypted suspect message copy data is generated representing a decrypted copy of at least part of the message data making up the suspect message at FOR EACH SUSPECT MESSAGE GENERATE SUSPECT MESSAGE COPY DATA REPRESENTING A COPY OF AT LEAST A PORTION OF THE SUSPECT MESSAGE OPERATION 421.

In one embodiment, once suspect message copy data is generated representing a copy of at least part of the message data making up the suspect message at FOR EACH SUSPECT MESSAGE GENERATE SUSPECT MESSAGE COPY DATA REPRESENTING A COPY OF AT LEAST A PORTION OF THE SUSPECT MESSAGE OPERATION 421 for each detected suspect message of CLASSIFY ANY DETECTED MESSAGE INCLUDING ONE OR MORE OF THE TRIGGER PARAMETERS AS A POTENTIAL SECURITY THREAT OPERATION 415, process flow proceeds to TRANSFER THE SUSPECT MESSAGE COPY DATA TO ONE OR MORE ANALYSIS SYSTEMS FOR FURTHER ANALYSIS OPERATION 423.

In one embodiment, at TRANSFER THE SUSPECT MESSAGE COPY DATA TO ONE OR MORE ANALYSIS SYSTEMS FOR FURTHER ANALYSIS OPERATION 423, the suspect message copy data of FOR EACH SUSPECT MESSAGE GENERATE SUSPECT MESSAGE COPY DATA REPRESENTING A COPY OF AT LEAST A PORTION OF THE SUSPECT MESSAGE OPERATION 421 is transmitted to one or more analysis systems for further analysis in an "off-line" environment.

In one embodiment, at TRANSFER THE SUSPECT MESSAGE COPY DATA TO ONE OR MORE ANALYSIS SYSTEMS FOR FURTHER ANALYSIS OPERATION 423, the suspect message copy data of FOR EACH SUSPECT MESSAGE GENERATE SUSPECT MESSAGE COPY DATA REPRESENTING A COPY OF AT LEAST A PORTION OF THE SUSPECT MESSAGE OPERATION 421 is transmitted to the one or more analysis systems via a message analysis channel, also referred to herein as a third communications channel, that is distinct from the network communications channel, i.e., the first communications channel through which messages are transmitted from the virtual assets relayed by the network communications device of PROVIDE A CLOUD COMPUTING ENVIRONMENT INCLUDING ONE OR MORE VIRTUAL ASSETS OPERATION 403. In this way, the transmission of the suspect message copy data, and the subsequent message data analysis, does not affect the operation of the virtual asset, and/or the cloud computing environment, application, service, enterprise, and/or infrastructure associated with the virtual asset.

In one embodiment, multiple analysis systems are provided at TRANSFER THE SUSPECT MESSAGE COPY DATA TO ONE OR MORE ANALYSIS SYSTEMS FOR FURTHER ANALYSIS OPERATION 423 that are specifically implemented to analyze specific trigger parameters of DEFINE ONE OR MORE TRIGGER PARAMETERS OPERATION 407.

Consequently, in one embodiment, the particular analysis system to which a given example of suspect message data is transmitted at TRANSFER THE SUSPECT MESSAGE COPY DATA TO ONE OR MORE ANALYSIS SYSTEMS FOR FURTHER ANALYSIS OPERATION 423 is determined, at least in part, by the specific trigger parameter detected in the suspect message at USE THE TRIGGER MONITORING SYSTEM AND THE TRIGGER DATA TO MONITOR AT LEAST A PORTION OF THE MESSAGE TRAFFIC SENT TO EACH OF THE ONE OR MORE VIRTUAL ASSETS TO DETECT ANY MESSAGE INCLUDING ONE OR MORE OF THE ONE OR MORE TRIGGER PARAMETERS OPERATION 413 from which the suspect message copy data was derived at FOR EACH SUSPECT MESSAGE GENERATE SUSPECT MESSAGE COPY DATA REPRESENTING A COPY OF AT LEAST A PORTION OF THE SUSPECT MESSAGE OPERATION 421.

In one embodiment, if, as a result of the analysis of the suspect message copy data by one or more of the analysis systems at TRANSFER THE SUSPECT MESSAGE COPY DATA TO ONE OR MORE ANALYSIS SYSTEMS FOR FURTHER ANALYSIS OPERATION 423, it is determined that the suspect message is indeed associated with an intrusion attack, one or more systems, entities, and/or parties, are alerted to the situation so that appropriate protective action can be taken.

In one embodiment, if, as a result of the analysis of the suspect message copy data by one or more of the analysis systems at TRANSFER THE SUSPECT MESSAGE COPY DATA TO ONE OR MORE ANALYSIS SYSTEMS FOR FURTHER ANALYSIS OPERATION 423, it is determined that the suspect message is indeed associated with an intrusion attack, one or more protective actions are automatically taken to prevent further infection of the virtual assets, and/or other virtual assets, and/or the cloud computing environment, application, service, infrastructure, or computing environment, associated with the now identified infected virtual asset.

In various embodiments, the protective actions taken can include, but are not limited to, isolating the virtual asset such that the virtual asset can still continue to operate, but in total isolation of all other virtual assets; partially isolating the virtual asset such that the virtual asset is allowed to connect to some very specific virtual assets, but has most of its communication channels blocked; "killing" or terminating the virtual asset; repairing the virtual asset by re-loading the compromised sub-components of the virtual asset; and/or any other protective actions, or combination of protective actions, discussed herein, and/or as known in the art at the time of filing, and/or as developed, or become known, after the time of filing.

In addition, in one embodiment, trigger parameters are applied heuristically at USE THE TRIGGER MONITORING SYSTEM AND THE TRIGGER DATA TO MONITOR AT LEAST A PORTION OF THE MESSAGE TRAFFIC SENT TO EACH OF THE ONE OR MORE VIRTUAL ASSETS TO DETECT ANY MESSAGE INCLUDING ONE OR MORE OF THE ONE OR MORE TRIGGER PARAMETERS OPERATION 413 and if, as a result of the analysis of the suspect message copy data by one or more of the analysis systems at TRANSFER THE SUSPECT MESSAGE COPY DATA TO ONE OR MORE ANALYSIS SYSTEMS FOR FURTHER ANALYSIS OPERATION 423, it is determined that the suspect message is indeed associated with an intrusion attack, new trigger parameters that are thereby discovered by the application of process 400 for virtual asset assisted intrusion detection in a cloud computing environment are added at to create a self-learning intrusion detection system.

In one embodiment, once the suspect message copy data of FOR EACH SUSPECT MESSAGE GENERATE SUSPECT MESSAGE COPY DATA REPRESENTING A COPY OF AT LEAST A PORTION OF THE SUSPECT MESSAGE OPERATION 421 is transmitted to one or more analysis systems for further analysis in an "off-line" environment at TRANSFER THE SUSPECT MESSAGE COPY DATA TO ONE OR MORE ANALYSIS SYSTEMS FOR FURTHER ANALYSIS OPERATION 423, process flow proceeds to EXIT OPERATION 430.

In one embodiment, at EXIT OPERATION 430 process 400 for virtual asset assisted intrusion detection in a cloud computing environment is exited to await new data.

Using process 400 for virtual asset assisted intrusion detection in a cloud computing environment discussed above, intrusion attacks can be detected using largely existing cloud computing environment infrastructure, such as modified virtual assets with added trigger monitoring systems; without the need for devoting extensive and/or specialized resources. Consequently, using process 400 for virtual asset assisted intrusion detection in a cloud computing environment, intrusion events can be efficiently and effectively detected; thereby making distributed computing environments, such as cloud computing environments, more secure.

As previously discussed, in addition to extrusion and intrusion capabilities for which virtual assets depicted and described herein may be configured, in various embodiments, further disclosure is made regarding virtual assets having self-monitoring and self-reporting characteristics and function. As one of ordinary skill will readily appreciate, virtual assets may be configured to perform any or all of the features and process operations described herein.

In one embodiment, self-monitoring and self-reporting virtual assets, and/or self-monitoring, self-reporting, and self-repairing virtual assets, are instantiated to include at least the virtual asset self-monitoring logic, the virtual asset self-reporting logic, and the virtual asset self-reporting communications logic, using a self-monitoring, self-reporting, and self-repairing virtual asset creation template.

Figure 5:
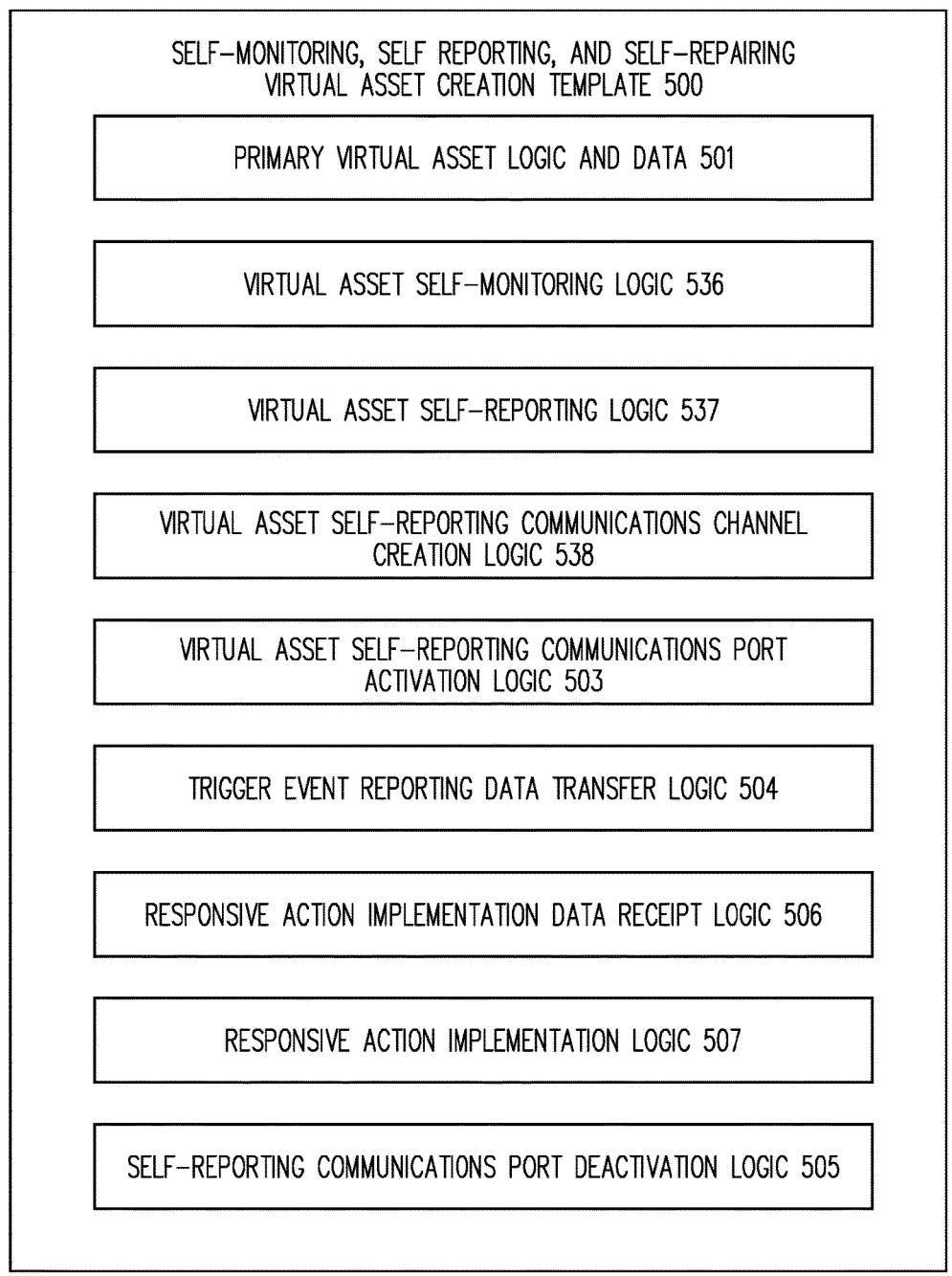
FIG. 5 is a functional diagram of a virtual asset creation template in accordance with one embodiment.

FIG. 5 shows a simplified block diagram of a self-monitoring, self-reporting, and self-repairing virtual asset creation template 500. As seen in FIG. 5, in one embodiment, self-monitoring, self-reporting, and self-repairing virtual asset creation template 500 includes primary virtual asset logic and data 501.

In one embodiment, primary virtual asset logic and data 501 includes primary virtual asset logic and data, and instructions associated with the self-monitoring, self-reporting, and self-repairing virtual asset itself, and/or the normal functions and operations of the self-monitoring, self-reporting, and self-repairing virtual asset, and/or the operating environment of the self-monitoring, self-reporting, and self-repairing virtual asset, such as a cloud computing environment and/or one or more management systems for the cloud computing environment.

As specific illustrative examples, in various embodiments, primary virtual asset logic and data 501 includes, but is not limited to, one or more of, data indicating the self-monitoring, self-reporting, and self-repairing virtual asset's identification; data indicating the region associated with the self-monitoring, self-reporting, and self-repairing virtual asset; data indicating the availability zone associated with the self-monitoring, self-reporting, and self-repairing virtual asset; data representing and/or indicating software modules and code residing within, or assigned to, the self-monitoring, self-reporting, and self-repairing virtual asset; data indicating a number of software modules residing within, or associated with, the self-monitoring, self-reporting, and self-repairing virtual asset; data representing or indicating files and/or file names residing within, or assigned to, the self-monitoring, self-reporting, and self-repairing virtual asset; data representing and/or indicating the exact configuration of the self-monitoring, self-reporting, and self-repairing virtual asset; data indicating a boot sequence for the self-monitoring, self-reporting, and self-repairing virtual asset; any data provided by a hypervisor or virtualization layer associated with the self-monitoring, self-reporting, and self-repairing virtual asset; any data provided from a cloud control plane associated with the self-monitoring, self-reporting, and self-repairing virtual asset; any data provided by any management system associated with the computing environment of the self-monitoring, self-reporting, and self-repairing virtual asset; communications and data transfer logic associated with the self-monitoring, self-reporting, and self-repairing virtual asset, such as logic and instructions for providing "normal" communications channels and data transfer mechanisms to be used by self-monitoring, self-reporting, and self-repairing virtual asset once the self-monitoring, self-reporting, and self-repairing virtual asset is instantiated, and/or deployed; and/or any combination of "inside" or "normal" operational virtual asset logic and data as discussed herein, and/or as known in the art at the time of filing, and/or as developed after the time of filing.

In one embodiment, using at least part of primary virtual asset logic and data 501, a self-monitoring, self-reporting, and self-repairing virtual asset can be instantiated, or launched, in a computing environment. In one embodiment, as a specific illustrative example, self-monitoring, self-reporting, and self-repairing virtual asset is a self-monitoring, self-reporting, and self-repairing virtual machine, or self-monitoring, self-reporting, and self-repairing virtual server instance, to be launched in a cloud computing environment.

In one embodiment, self-monitoring, self-reporting, and self-repairing virtual asset creation template 500 includes virtual asset self-monitoring logic 536.

In one embodiment, self-monitoring, self-reporting, and self-repairing virtual asset creation template 500 includes virtual asset self-reporting logic 537.

In one embodiment, self-monitoring, self-reporting, and self-repairing virtual asset creation template 500 includes virtual asset self-reporting communication channel creation logic 538.

In one embodiment, self-monitoring, self-reporting, and self-repairing virtual asset creation template 500 includes virtual asset self-reporting communication port activation logic 503. In one embodiment, virtual asset self-reporting communication port activation logic 503 includes instructions and data for generating and activating a self-reporting communications door in response to detection of a trigger event by virtual asset self-monitoring logic 536 and instructions from virtual asset self-reporting communications channel creation logic 538.

In one embodiment, self-monitoring, self-reporting, and self-repairing virtual asset creation template 500 includes trigger event reporting data transfer logic 504.

In one embodiment, self-monitoring, self-reporting, and self-repairing virtual asset creation template 500 includes responsive action implementation data receipt logic 506.

In one embodiment, self-monitoring, self-reporting, and self-repairing virtual asset creation template 500 includes responsive action implementation logic 507.

In one embodiment, self-monitoring, self-reporting, and self-repairing virtual asset creation template 500 includes virtual asset self-reporting communication port deactivation logic 505. In one embodiment, virtual asset self-reporting communication port deactivation logic 505 includes instructions and data for deactivating the self-reporting communications door in response instructions from virtual asset self-reporting communications channel creation logic 538.

Using the methods and systems for providing self-monitoring and self-reporting, and/or self-monitoring, self-reporting, and self-repairing virtual assets, discussed herein, self-monitoring and self-reporting, and/or self-monitoring, self-reporting, and self-repairing virtual assets are provided that can independently and automatically detect one or more trigger events within the self-monitoring and self-reporting, and/or self-monitoring, self-reporting, and self-repairing virtual assets, generate suspicious event reporting data from the self-monitoring and self-reporting, and/or self-monitoring, self-reporting, and self-repairing virtual assets, and provide the reporting data to a monitoring system external to the self-monitoring and self-reporting, and/or self-monitoring, self-reporting, and self-repairing virtual assets, all without relying detection of the suspicious event by entities outside the self-monitoring and self-reporting virtual assets, and/or self-monitoring, self-reporting, and self-repairing virtual assets, and/or normal communications channels.

Therefore, using the self-monitoring and self-reporting, and/or self-monitoring, self-reporting, and self-repairing virtual assets, and the methods and systems for providing self-monitoring and self-reporting, and/or self-monitoring, self-reporting, and self-repairing virtual assets discussed herein, virtual assets, and the data processed and stored by virtual assets, are made more secure.

In one embodiment, a self-monitoring and self-reporting virtual asset is instantiated including virtual asset self-monitoring logic, virtual asset self-reporting logic, and virtual asset self-reporting communications channel creation logic.

In one embodiment, when a trigger event is detected in the self-monitoring and self-reporting virtual asset using the virtual asset self-monitoring logic, the self-monitoring and self-reporting virtual asset uses the virtual asset self-reporting logic to generate trigger event reporting data indicating the detected trigger event.

In one embodiment, the self-monitoring and self-reporting virtual asset then uses the virtual asset self-reporting communications channel creation logic to open a self-reporting communications channel between the self-monitoring and self-reporting virtual asset and a virtual asset monitoring system. In one embodiment, the self-monitoring and self-reporting virtual asset then uses the self-reporting communications channel to report the trigger event to the virtual asset monitoring system.

Figure 6:
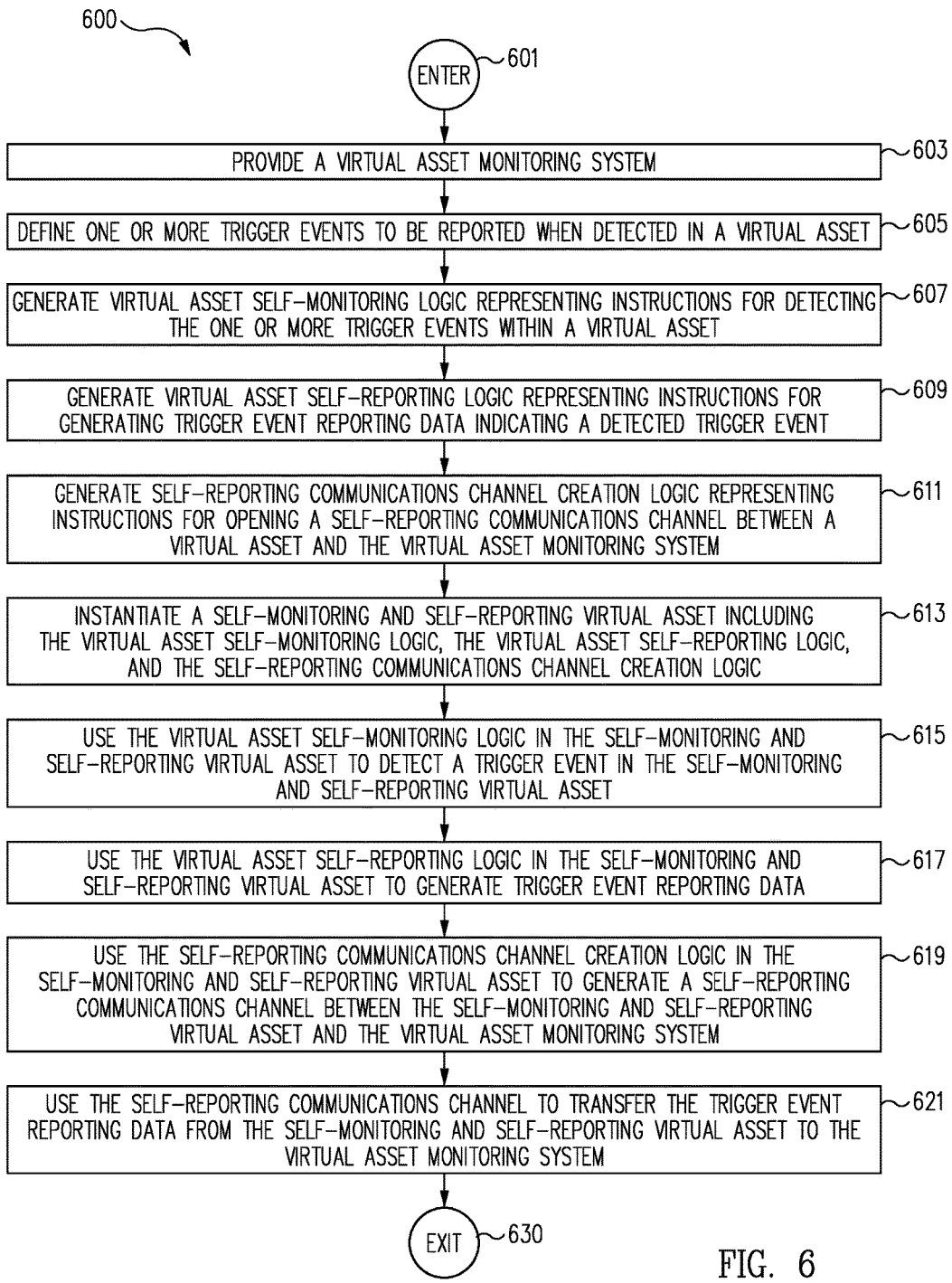
FIG. 6 is a flow chart depicting a process for providing self-monitoring and self-reporting virtual assets in accordance with one embodiment.

FIG. 6 is a flow chart of a process 600 for providing self-monitoring and self-reporting virtual assets in accordance with one embodiment. In one embodiment, process 600 for providing self-monitoring and self-reporting virtual assets begins at ENTER OPERATION 601 of FIG. 6 and process flow proceeds to PROVIDE A VIRTUAL ASSET MONITORING SYSTEM OPERATION 603.

In one embodiment, at PROVIDE A VIRTUAL ASSET MONITORING SYSTEM OPERATION 603, a virtual asset monitoring system is provided.

In one embodiment, at PROVIDE A VIRTUAL ASSET MONITORING SYSTEM OPERATION 603 the virtual asset monitoring system is implemented in a first computing environment that is distinct from the computing environment in which the self-monitoring and self-reporting virtual assets are implemented, operated, and/or instantiated.

In one embodiment, at PROVIDE A VIRTUAL ASSET MONITORING SYSTEM OPERATION 603 the virtual asset monitoring system is implemented, at least in part, in a data center associated with an application being implemented and/or an owner of the self-monitoring and self-reporting virtual assets.

In various embodiments, at PROVIDE A VIRTUAL ASSET MONITORING SYSTEM OPERATION 603 the virtual asset monitoring system is implemented in software, hardware, and/or a combination of software and hardware. In one embodiment, at PROVIDE A VIRTUAL ASSET MONITORING SYSTEM OPERATION 603 the virtual asset monitoring system includes a virtual asset monitoring module. In one embodiment, at PROVIDE A VIRTUAL ASSET MONITORING SYSTEM OPERATION 603 the virtual asset monitoring module of the virtual asset monitoring system includes a trigger event reporting data receipt module which is used to receive detected trigger event data from the self-monitoring and self-reporting virtual assets.

In one embodiment, once a virtual asset monitoring system is provided at PROVIDE A VIRTUAL ASSET MONITORING SYSTEM OPERATION 403, process flow proceeds to DEFINE ONE OR MORE TRIGGER EVENTS TO BE REPORTED WHEN DETECTED IN A VIRTUAL ASSET OPERATION 605.

In one embodiment, at DEFINE ONE OR MORE TRIGGER EVENTS TO BE REPORTED WHEN DETECTED IN A VIRTUAL ASSET OPERATION 605, one or more trigger events are defined.

In various embodiments, the one or more trigger events defined at DEFINE ONE OR MORE TRIGGER EVENTS TO BE REPORTED WHEN DETECTED IN A VIRTUAL ASSET OPERATION 605 are events, states, or occurrences, that when detected in a virtual asset represent a potential security vulnerability, and/or a deviation from normal virtual asset operation.

In various embodiments, the one or more trigger events defined at DEFINE ONE OR MORE TRIGGER EVENTS TO BE REPORTED WHEN DETECTED IN A VIRTUAL ASSET OPERATION 605 can include, but are not limited to, one or more of, a network message from a virtual asset directed to a location known to be associated with malicious entities, i.e., a black-listed destination; the frequency of outgoing network messages changing to a level above a defined threshold level, i.e., the frequency of outgoing network messages changing to a level deemed "not normal"; a response to a customer request being directed to a destination that is not the customer location of record; a virtual asset receiving a high-frequency of login attempts that fail; a size of the parameters sent into a virtual asset being outside a defined "normal" range of sizes for parameters; a size of outgoing network messages being outside a defined "normal" range of sizes of outgoing messages; a total amount of data in any one communication connection of a virtual asset exceeding a defined maximum normal size of a communication to a customer; a request to a virtual asset coming in from a location known to be associated with malicious entities, i.e., a black-listed origin location; an internal elapsed time of defined critical operations changing to a time outside a defined range of "normal" values; and/or any other trigger event, or combination of trigger events, as discussed herein, and/or as known in the art at the time of filing, and/or as developed/made available after the time of filing.

In one embodiment, once one or more trigger events are defined at DEFINE ONE OR MORE TRIGGER EVENTS TO BE REPORTED WHEN DETECTED IN A VIRTUAL ASSET OPERATION 605, process flow proceeds to GENERATE VIRTUAL ASSET SELF-MONITORING LOGIC REPRESENTING INSTRUCTIONS FOR DETECTING

THE ONE OR MORE TRIGGER EVENTS WITHIN A VIRTUAL ASSET OPERATION 607.

In one embodiment, at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607 virtual asset self-monitoring logic is generated for monitoring the operational logic of a virtual asset and detecting the one or more defined trigger events of DEFINE ONE OR MORE TRIGGER EVENTS TO BE REPORTED WHEN DETECTED IN A VIRTUAL ASSET OPERATION 605.

In one embodiment, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607 includes machine-readable code and instructions for monitoring the primary operational logic and data of the virtual asset and detecting the one or more defined trigger events within the virtual asset.

In one embodiment, once virtual asset self-monitoring logic is generated for monitoring the operational logic of a virtual asset and detecting the one or more defined trigger events of DEFINE ONE OR MORE TRIGGER EVENTS TO BE REPORTED WHEN DETECTED IN A VIRTUAL ASSET OPERATION 605 at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607, process flow proceeds to GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 609.

In one embodiment, at GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 609, virtual asset self-reporting logic is generated for generating trigger event reporting data indicating a detected trigger event of DEFINE ONE OR MORE TRIGGER EVENTS TO BE REPORTED WHEN DETECTED IN A VIRTUAL ASSET OPERATION 605 if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607.

In one embodiment, the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 609 includes machine-readable code and instructions for creating detected trigger event data indicating a detected trigger event, and/or describing the detected trigger event, and/or generating log data representing the detected trigger event.

In one embodiment, once virtual asset self-reporting logic is generated for generating trigger event reporting data indicating a detected trigger event of DEFINE ONE OR MORE TRIGGER EVENTS TO BE REPORTED WHEN DETECTED IN A VIRTUAL ASSET OPERATION 605 if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607 at GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 609, process flow proceeds to GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 611.

In one embodiment, at GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 611, virtual asset self-reporting communications channel creation logic is generated for opening a self-reporting communications channel between a virtual asset and the virtual asset monitoring system of PROVIDE A VIRTUAL ASSET MONITORING SYSTEM OPERATION 603 if one of the one or more trigger events of DEFINE ONE OR MORE TRIGGER EVENTS TO BE REPORTED WHEN DETECTED IN A VIRTUAL ASSET OPERATION 605 is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607.

In one embodiment, the virtual asset self-reporting communication channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 611 includes machine-readable code and instructions for activating a virtual asset self-reporting communications port, or door, pre-deployed, and/or implemented by, the virtual asset self-reporting communications channel creation logic in the virtual asset and thereby opening a self-reporting communications channel between a virtual asset and the virtual asset monitoring system.

In one embodiment, once virtual asset self-reporting communications channel creation logic is generated for opening a self-reporting communications channel between a virtual asset and the virtual asset monitoring system of PROVIDE A VIRTUAL ASSET MONITORING SYSTEM OPERATION 603 when one of the one or more trigger events of DEFINE ONE OR MORE TRIGGER EVENTS TO BE REPORTED WHEN DETECTED IN A VIRTUAL ASSET OPERATION 605 is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607 at GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 611, process flow proceeds to INSTANTIATE A SELF-MONITOR- ING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613.

In one embodiment, at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613, one or more self-monitoring and self-reporting virtual assets are instantiated in a computing environment.

In one embodiment, at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613 the one or more self-monitoring and self-reporting virtual assets are instantiated in a second computing environment that is distinct from the first computing environment in which the virtual asset monitoring system of PROVIDE A VIRTUAL ASSET MONITORING SYSTEM OPERATION 603 is implemented.

In one embodiment, at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613 the one or more self-monitoring and self-reporting virtual assets are instantiated in a cloud computing environment that is distinct from a data center in which the virtual asset monitoring system of PROVIDE A VIRTUAL ASSET MONITORING SYSTEM OPERATION 603 is implemented.

As noted above, as used herein, the term "virtual asset", such as used in the term "self-monitoring and self-reporting virtual asset" includes any virtualized entity or resource, and/or part of an actual, or "bare metal" entity.

In various embodiments, any, or all, of the assets making up a given production environment, the computing systems, and/or computing entities discussed herein, and/or as known in the art at the time of filing, and/or as developed after the time of filing, can be implemented as virtual assets, and more particularly as, self-monitoring and self-reporting virtual assets.

As also noted above, virtual assets, including self-monitoring and self-reporting virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system.

Other examples of virtual asset creation templates include, but are not limited to, any virtual appliance used to instantiate virtual assets. One specific illustrative example of such a virtual asset creation template is an Amazon Machine Image (AMI).

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

In one embodiment, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607, the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 609, and the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 611, are provided to each of the one or more self-monitoring and self-reporting virtual assets instantiated at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613.

In one embodiment, the virtual asset self-monitoring logic, the virtual asset self-reporting logic, and the virtual asset self-reporting communications channel creation logic, are provided to each of the one or more self-monitoring and self-reporting virtual assets instantiated in the computing environment at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613 using one or more self-monitoring, self-reporting, and self-repairing virtual asset creation templates.

In one embodiment, once one or more self-monitoring and self-reporting virtual assets are instantiated in a computing environment at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613, process flow proceeds to USE THE VIRTUAL ASSET SELF-MONITORING LOGIC IN THE SELF-MONITORING AND SELF-REPORTING VIRTUAL ASSET TO DETECT A TRIGGER EVENT IN THE SELF-MONITORING AND SELF-REPORTING VIRTUAL ASSET OPERATION 615.

In one embodiment, at USE THE VIRTUAL ASSET SELF-MONITORING LOGIC IN THE SELF-MONITOR- ING AND SELF-REPORTING VIRTUAL ASSET TO DETECT A TRIGGER EVENT IN THE SELF-MONITORING AND SELF-REPORTING VIRTUAL ASSET OPERATION 615, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607 provided to the one or more self-monitoring and self-reporting virtual assets at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613 is used to monitor and detect any of the defined trigger events of DEFINE ONE OR MORE TRIGGER EVENTS TO BE REPORTED WHEN DETECTED IN A VIRTUAL ASSET OPERATION 605 within the self-monitoring and self-reporting virtual assets.

In one embodiment, at USE THE VIRTUAL ASSET SELF-MONITORING LOGIC IN THE SELF-MONITORING AND SELF-REPORTING VIRTUAL ASSET TO DETECT A TRIGGER EVENT IN THE SELF-MONITORING AND SELF-REPORTING VIRTUAL ASSET OPERATION 615 the virtual asset self-monitoring logic is used to monitor and detect any of the defined trigger events within the self-monitoring and self-reporting virtual assets by monitoring primary virtual asset logic and data used by the self-monitoring and self-reporting virtual assets in the course of their normal operations and the performance of their assigned functions.

In one embodiment, once the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 607 provided to the one or more self-monitoring and self-reporting virtual assets at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613 is used to monitor and detect any of the defined trigger events of DEFINE ONE OR MORE TRIGGER EVENTS TO BE REPORTED WHEN DETECTED IN A VIRTUAL ASSET OPERATION 605 within the self-monitoring and self-reporting virtual assets at USE THE VIRTUAL ASSET SELF-MONITORING LOGIC IN THE SELF-MONITORING AND SELF-REPORTING VIRTUAL ASSET TO DETECT A TRIGGER EVENT IN THE SELF-MONITORING AND SELF-REPORTING VIRTUAL ASSET OPERATION 615, process flow proceeds to USE THE VIRTUAL ASSET SELF-REPORTING LOGIC IN THE SELF-MONITORING AND SELF-REPORTING VIRTUAL ASSET TO GENERATE TRIGGER EVENT REPORTING DATA OPERATION 617.

In one embodiment, if one of the defined trigger events is detected within one of the self-monitoring and self-reporting virtual assets by the virtual asset self-monitoring logic at USE THE VIRTUAL ASSET SELF-MONITORING LOGIC IN THE SELF-MONITORING AND SELF-REPORTING VIRTUAL ASSET TO DETECT A TRIGGER EVENT IN THE SELF-MONITORING AND SELF-REPORTING VIRTUAL ASSET OPERATION 615, then at USE THE VIRTUAL ASSET SELF-REPORTING LOGIC IN THE SELF-MONITORING AND SELF-REPORTING VIRTUAL ASSET TO GENERATE TRIGGER EVENT REPORTING DATA OPERATION 617 detected trigger event data associated with, describing, or representing log data associated with, the detected trigger event is generated by the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 609 provided to the affected self-monitoring and self-reporting virtual asset at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613.

In one embodiment, once detected trigger event data associated with, describing, or representing log data associated with, the detected trigger event is generated by the virtual asset self-reporting logic provided to the affected self-monitoring and self-reporting at USE THE VIRTUAL ASSET SELF-REPORTING LOGIC IN THE SELF-MONITORING AND SELF-REPORTING VIRTUAL ASSET TO GENERATE TRIGGER EVENT REPORTING DATA OPERATION 617, process flow proceeds to USE THE SELF-REPORTING COMMUNICATIONS CHANNEL CREATION LOGIC IN THE SELF-MONITORING AND SELF-REPORTING VIRTUAL ASSET TO GENERATE A SELF-REPORTING COMMUNICATIONS CHANNEL BETWEEN THE SELF-MONITORING AND SELF-REPORTING VIRTUAL ASSET AND THE VIRTUAL ASSET MONITORING SYSTEM OPERATION 619.

In one embodiment, once a defined trigger event is detected within the self-monitoring and self-reporting virtual asset by the virtual asset self-monitoring logic at USE THE VIRTUAL ASSET SELF-MONITORING LOGIC IN THE SELF-MONITORING AND SELF-REPORTING VIRTUAL ASSET TO DETECT A TRIGGER EVENT IN THE SELF-MONITORING AND SELF-REPORTING VIRTUAL ASSET OPERATION 615, at USE THE SELF-REPORTING COMMUNICATIONS CHANNEL CREATION LOGIC IN THE SELF-MONITORING AND SELF-REPORTING VIRTUAL ASSET TO GENERATE A SELF-REPORTING COMMUNICATIONS CHANNEL BETWEEN THE SELF-MONITORING AND SELF-REPORTING VIRTUAL ASSET AND THE VIRTUAL ASSET MONITORING SYSTEM OPERATION 619 the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 611 provided to the self-monitoring and self-reporting virtual asset at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613, is used to generate a self-reporting communications channel between the self-monitoring and self-reporting virtual asset and the virtual asset monitoring system of PROVIDE A VIRTUAL ASSET MONITORING SYSTEM OPERATION 603.

As noted above, in one embodiment, the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 611 generates a self-reporting communications channel at USE THE SELF-REPORTING COMMUNICATIONS CHANNEL CREATION LOGIC IN THE SELF-MONITORING AND SELF-REPORTING VIRTUAL ASSET TO GENERATE A SELF-REPORTING COMMUNICATIONS CHANNEL BETWEEN THE SELF-MONITORING AND SELF-REPORTING VIRTUAL ASSET AND THE VIRTUAL ASSET MONITORING SYSTEM OPERATION 619 by activating a self-reporting virtual asset self-reporting communications port pre-deployed, and/or implemented by, the virtual asset self-reporting communications channel creation logic.

In one embodiment, the self-reporting communications channel generated by the virtual asset self-reporting communications channel creation logic at USE THE SELF-REPORTING COMMUNICATIONS CHANNEL CREATION LOGIC IN THE SELF-MONITORING AND SELF-REPORTING VIRTUAL ASSET TO GENERATE A SELF-REPORTING COMMUNICATIONS CHANNEL BETWEEN THE SELF-MONITORING AND SELF-REPORTING VIRTUAL ASSET AND THE VIRTUAL ASSET MONITORING SYSTEM OPERATION 619 is a communications channel distinct, and separate from, the various other "normal" communications channels utilized by the self-monitoring and self-reporting virtual assets and/or other assets within the computing environment, and/or production environment, associated with the self-monitoring and self-reporting virtual assets.

Consequently, in one embodiment, the self-reporting communications channel generated by the virtual asset self-reporting communications channel creation logic at USE THE SELF-REPORTING COMMUNICATIONS CHANNEL CREATION LOGIC IN THE SELF-MONITORING AND SELF-REPORTING VIRTUAL ASSET TO GENERATE A SELF-REPORTING COMMUNICATIONS CHANNEL BETWEEN THE SELF-MONITORING AND SELF-REPORTING VIRTUAL ASSET AND THE VIRTUAL ASSET MONITORING SYSTEM OPERATION 619 is not subject to manipulation, and/or termination, by a malicious party that may have taken control of the self-monitoring and self-reporting virtual asset. In addition, the self-reporting communications channel generated by the virtual asset self-reporting communications channel creation logic is not dependent on security policy implementation systems and entities outside of the self-monitoring and self-reporting virtual asset, other than the virtual asset monitoring system.

In one embodiment, once the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 611 provided to the self-monitoring and self-reporting virtual asset at INSTANTIATE A SELF-MONITORING AND SELF-REPORTING VIRTUAL ASSET INCLUDING THE VIRTUAL ASSET SELF-MONITORING LOGIC, THE VIRTUAL ASSET SELF-REPORTING LOGIC, AND THE SELF-REPORTING COMMUNICATIONS CHANNEL CREATION LOGIC OPERATION 613, is used to generate a self-reporting communications channel between the self-monitoring and self-reporting virtual asset and the virtual asset monitoring system of PROVIDE A VIRTUAL ASSET MONITORING SYSTEM OPERATION 603 at USE THE SELF-REPORTING COMMUNICATIONS CHANNEL CREATION LOGIC IN THE SELF-MONITORING AND SELF-REPORTING VIRTUAL ASSET TO GENERATE A SELF-REPORTING COMMUNICATIONS CHANNEL BETWEEN THE SELF-MONITORING AND SELF-REPORTING VIRTUAL ASSET AND THE VIRTUAL ASSET MONITORING SYSTEM OPERATION 619, process flow proceeds to USE THE SELF-REPORTING COMMUNICATIONS CHANNEL TO TRANSFER THE TRIGGER EVENT REPORTING DATA FROM THE SELF-MONITORING AND SELF-REPORTING VIRTUAL ASSET TO THE VIRTUAL ASSET MONITORING SYSTEM OPERATION 621.

In one embodiment, at USE THE SELF-REPORTING COMMUNICATIONS CHANNEL TO TRANSFER THE TRIGGER EVENT REPORTING DATA FROM THE SELF-MONITORING AND SELF-REPORTING VIRTUAL ASSET TO THE VIRTUAL ASSET MONITORING SYSTEM OPERATION 621 the detected trigger event data of USE THE VIRTUAL ASSET SELF-REPORTING LOGIC IN THE SELF-MONITORING AND SELF-REPORTING VIRTUAL ASSET TO GENERATE TRIGGER EVENT REPORTING DATA OPERATION 617 is transferred from the self-monitoring and self-reporting virtual asset to the virtual asset monitoring system of PROVIDE A VIRTUAL ASSET MONITORING SYSTEM OPERATION 603 using the virtual asset self-reporting communications channel generated by the virtual asset self-reporting communications channel creation logic at USE THE SELF-REPORTING COMMUNICATIONS CHANNEL CREATION LOGIC IN THE SELF-MONITORING AND SELF-REPORTING VIRTUAL ASSET TO GENERATE A SELF-REPORTING COMMUNICATIONS CHANNEL BETWEEN THE SELF-MONITORING AND SELF-REPORTING VIRTUAL ASSET AND THE VIRTUAL ASSET MONITORING SYSTEM OPERATION 619.

In one embodiment, once the detected trigger event data of USE THE VIRTUAL ASSET SELF-REPORTING LOGIC IN THE SELF-MONITORING AND SELF-REPORTING VIRTUAL ASSET TO GENERATE TRIGGER EVENT REPORTING DATA OPERATION 617 is transferred from the self-monitoring and self-reporting virtual asset to the virtual asset monitoring system of PROVIDE A VIRTUAL ASSET MONITORING SYSTEM OPERATION 603 using the virtual asset self-reporting communications channel generated by the virtual asset self-reporting communications channel creation logic at USE THE SELF-REPORTING COMMUNICATIONS CHANNEL TO TRANSFER THE TRIGGER EVENT REPORTING DATA FROM THE SELF-MONITORING AND SELF-REPORTING VIRTUAL ASSET TO THE VIRTUAL ASSET MONITORING SYSTEM OPERATION 621, process flow proceeds to EXIT OPERATION 630.

In one embodiment, at EXIT OPERATION 630 process 600 for providing self-monitoring and self-reporting virtual assets is exited to await new data.

Using the self-monitoring and self-reporting virtual assets of process 400 for providing self-monitoring and self-reporting virtual assets, self-monitoring and self-reporting virtual assets are provided that can independently and automatically detect one or more trigger events within the self-monitoring and self-reporting virtual assets, generate suspicious event reporting data from the self-monitoring and self-reporting virtual assets, and provide the reporting data to a monitoring system external to self-monitoring and self-reporting virtual assets, all without relying detection of the suspicious event by entities outside the self-monitoring and self-reporting virtual assets themselves, and/or normal communications channels.

Therefore, using the self-monitoring and self-reporting virtual assets, and the methods and systems for providing self-monitoring and self-reporting virtual assets discussed herein, virtual assets, and the data processed and stored by virtual assets, are made more secure.

In the specific illustrative embodiments discussed above where the detected trigger event is detected in a self-monitoring and self-reporting virtual asset, once the detected trigger event data is transferred from the self-monitoring and self-reporting virtual asset to the virtual asset monitoring system, analysis is performed at the virtual asset monitoring system and appropriate investigative and/or protective action is taken in response to the detected trigger event.

However, where the detected trigger event is detected in a self-monitoring, self-reporting, and self-repairing virtual asset, once the detected trigger event data is transferred from the self-monitoring and self-reporting virtual asset to the virtual asset monitoring system, further analysis and actions are taken automatically.

In one embodiment, a self-monitoring, self-reporting, and self-repairing virtual asset is instantiated including virtual asset self-monitoring logic, virtual asset self-reporting logic, and virtual asset self-reporting communications channel creation logic.

In one embodiment, when a trigger event is detected in the self-monitoring, self-reporting, and self-repairing virtual asset using the virtual asset self-monitoring logic, the self-monitoring, self-reporting, and self-repairing virtual asset uses the virtual asset self-reporting logic to generate trigger event reporting data indicating the detected trigger event.

In one embodiment, the self-monitoring, self-reporting, and self-repairing virtual asset then uses the virtual asset self-reporting communications channel creation logic to open a self-reporting communications channel between the self-monitoring, self-reporting, and self-repairing virtual asset and a virtual asset monitoring system. In one embodiment, the self-monitoring, self-reporting, and self-repairing virtual asset then uses the self-reporting communications channel to report the trigger event to the virtual asset monitoring system.

In one embodiment, responsive action implementation data representing instructions for implementing one or more responsive actions to the trigger event is then generated and sent to the self-monitoring, self-reporting, and self-repairing virtual asset where the self-monitoring, self-reporting, and self-repairing virtual asset uses the responsive action implementation data to respond to the trigger event.

Figure 7:
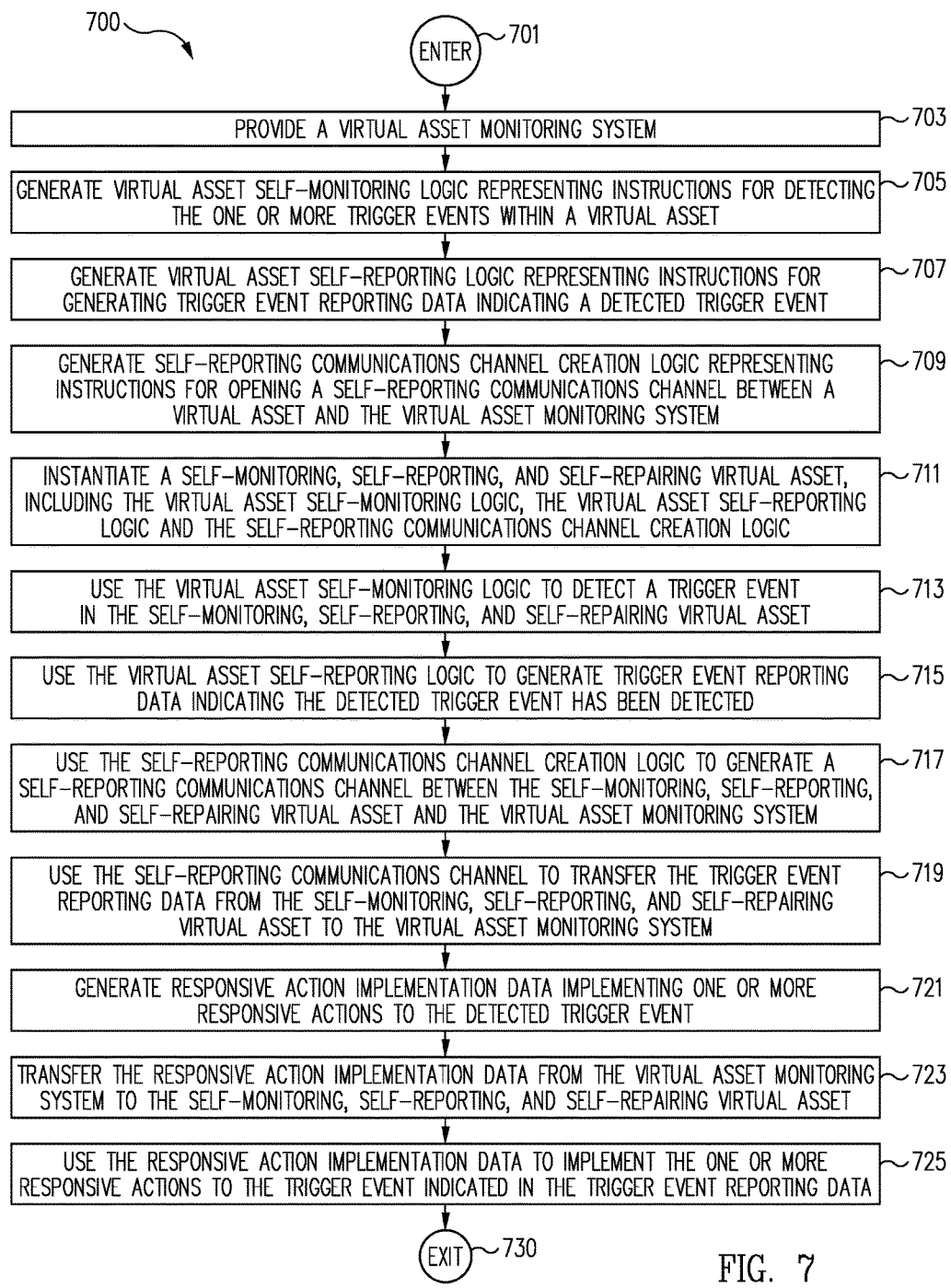
FIG. 7 is a flow chart depicting a process for providing self-monitoring, self-reporting, and self-repairing virtual assets in accordance with one embodiment.

FIG. 7 is a flow chart of a process 700 for providing self-monitoring, self-reporting, and self-repairing virtual assets in accordance with one embodiment. In one embodiment, process 700 for providing self-monitoring, self-reporting, and self-repairing virtual assets begins at ENTER OPERATION 701 of FIG. 7 and process flow proceeds to PROVIDE A VIRTUAL ASSET MONITORING SYSTEM OPERATION 703.

In one embodiment, at PROVIDE A VIRTUAL ASSET MONITORING SYSTEM OPERATION 703, a virtual asset monitoring system is provided.

In one embodiment, the virtual asset monitoring system of PROVIDE A VIRTUAL ASSET MONITORING SYSTEM OPERATION 703 is implemented in a first computing environment that is distinct from the computing environment in which the self-monitoring, self-reporting, and self-repairing virtual assets are implemented, operated, and/or instantiated.

In one embodiment, the virtual asset monitoring system of PROVIDE A VIRTUAL ASSET MONITORING SYSTEM OPERATION 703 is implemented, at least in part, in a data center associated with the application being implemented, and/or an owner of the self-monitoring, self-reporting, and self-repairing virtual assets. In various embodiments, the virtual asset monitoring system is implemented in software, hardware, and/or a combination of software and hardware.

In one embodiment, the virtual asset monitoring system of PROVIDE A VIRTUAL ASSET MONITORING SYSTEM OPERATION 703 includes a virtual asset monitoring module and a response action implementation module.

In one embodiment, the virtual asset monitoring module of the virtual asset monitoring system of PROVIDE A VIRTUAL ASSET MONITORING SYSTEM OPERATION 703 includes a trigger event reporting data receipt module which, as discussed below, is used to receive detected trigger event data from the self-monitoring, self-reporting, and self-repairing virtual assets.

In one embodiment, the responsive action implementation module of the virtual asset monitoring system of PROVIDE A VIRTUAL ASSET MONITORING SYSTEM OPERATION 703 includes the capability to analyze the detected trigger event data received from the self-monitoring, self-reporting, and self-repairing virtual assets. In one embodiment, the analysis capability of the responsive action implementation module takes the form of a mapping module used to map specific detected trigger event data to specific responsive action data.

In a specific illustrative example, in one embodiment, the responsive action implementation module receives the detected trigger event data from the trigger event reporting data receipt module and a mapping module is used to analyze the detected trigger event data and identify the detected trigger event. In this specific illustrative example, the mapping module then maps the detected trigger event to a specific responsive action represented and implemented by associated responsive action data.

In one embodiment, once a virtual asset monitoring system is provided at PROVIDE A VIRTUAL ASSET MONITORING SYSTEM OPERATION 703, process flow proceeds to GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705.

In one embodiment, at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705, one or more trigger events are defined and virtual asset self-monitoring logic is generated for monitoring the operational logic of a virtual asset and detecting the one or more defined trigger events.

In various embodiments, the one or more trigger events defined at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705 are events, states, or occurrences, that when detected in a virtual asset represent a potential security vulnerability, and/or a deviation from normal virtual asset operation.

In various embodiments, the one or more trigger events defined at GENERATE VIRTUAL ASSET SELF-MONI- TORING LOGIC REPRESENTING INSTRUCTIONS FOR DETECTING THE ONE OR MORE TRIGGER EVENTS WITHIN A VIRTUAL ASSET OPERATION 705 can include, but are not limited to, one or more of, a network message from a virtual asset directed to a location known to be associated with malicious entities, i.e., a black-listed destination; the frequency of outgoing network messages changing to a level above a defined threshold level, i.e., the frequency of outgoing network messages changing to a level deemed "not normal"; a response to a customer request being directed to a destination that is not the customer location of record; a virtual asset receiving a high-frequency of login attempts that fail; a size of the parameters sent into a virtual asset being outside a defined "normal" range of sizes for parameters; a size of outgoing network messages being outside a defined "normal" range of sizes of outgoing messages; a total amount of data in any one communication connection of a virtual asset exceeding a defined maximum normal size of a communication to a customer; a request to a virtual asset coming in from a location known to be associated with malicious entities, i.e., a black-listed origin location; an internal elapsed time of defined critical operations changing to a time outside a defined range of "normal" values; and/or any other trigger event, or combination of trigger events, as discussed herein, and/or as known in the art at the time of filing, and/or as developed/made available after the time of filing.

In one embodiment, once one or more trigger events are defined at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705, virtual asset self-monitoring logic is generated for monitoring the operational logic of a virtual asset and detecting the one or more defined trigger events.

In one embodiment, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705 includes machine-readable code and instructions for monitoring the operational logic of the virtual asset and detecting the one or more defined trigger events within the virtual asset.

In one embodiment, once one or more trigger events are defined and virtual asset self-monitoring logic is generated for monitoring the operational logic of a virtual asset and detecting the one or more defined trigger events at GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705, process flow proceeds to GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 707.

In one embodiment, at GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 707, virtual asset self-reporting logic is generated for generating trigger event reporting data indicating a detected trigger event if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705.

In one embodiment, the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 707 includes machine-readable code and instructions for creating detected trigger event data indicating a detected trigger event, and/or describing the detected trigger event, and/or generating log data representing the detected trigger event.

In one embodiment, once virtual asset self-reporting logic is generated for generating trigger event reporting data indicating a detected trigger event if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705 at GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 707, process flow proceeds to GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 709.

In one embodiment, at GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 709, virtual asset self-reporting communications channel creation logic is generated for opening a self-reporting communications channel between a virtual asset and the virtual asset monitoring system of PROVIDE A VIRTUAL ASSET MONITORING SYSTEM OPERATION 703 if one of the one or more trigger events is detected in a virtual asset by the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705.

In one embodiment, the virtual asset self-reporting communication channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 709 includes machine-readable code and instructions for activating a self-reporting communications port, or door, implemented by the virtual asset self-reporting communications channel creation logic in the virtual and thereby opening a self-reporting communications channel between a virtual asset and the virtual asset monitoring system.

In one embodiment, once virtual asset self-reporting communications channel creation logic is generated for opening a self-reporting communications channel between a virtual asset and the virtual asset monitoring system if one of the one or more trigger events is detected in a virtual asset by the virtual asset self-monitoring logic at GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 709, process flow proceeds to INSTANTIATE A SELF-MONITORING, SELF-REPORTING, AND SELF-REPAIRING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 711.

In one embodiment, at INSTANTIATE A SELF-MONITORING, SELF-REPORTING, AND SELF-REPAIRING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 711, one or more self-monitoring, self-reporting, and self-repairing virtual assets, are instantiated in a computing environment.

In one embodiment, the one or more self-monitoring, self-reporting, and self-repairing virtual assets, are instantiated at INSTANTIATE A SELF-MONITORING, SELF-REPORTING, AND SELF-REPAIRING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 711 in a second computing environment that is distinct from the first computing environment in which the virtual asset monitoring system is implemented.

In one embodiment, the one or more self-monitoring, self-reporting, and self-repairing virtual assets, are instantiated at INSTANTIATE A SELF-MONITORING, SELF-REPORTING, AND SELF-REPAIRING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 711 in a cloud computing environment that is distinct from a data center in which the virtual asset monitoring system is implemented.

As noted above, as used herein, the term "virtual asset", such as used in the term "self-monitoring, self-reporting, and self-repairing virtual asset" includes any virtualized entity or resource, and/or part of an actual, or "bare metal" entity.

In various embodiments, any, or all, of the assets making up a given production environment, the computing systems, and/or computing entities discussed herein, and/or as known in the art at the time of filing, and/or as developed after the time of filing, can be implemented as virtual assets, and more particularly as self-monitoring, self-reporting, and self-repairing virtual assets.

In one embodiment, the virtual asset self-monitoring logic of GENERATE VIRTUAL ASSET SELF-MONITORING LOGIC REPRESENTING INSTRUCTIONS FOR DETECTING THE ONE OR MORE TRIGGER EVENTS WITHIN A VIRTUAL ASSET OPERATION 705, the virtual asset self-reporting logic of GENERATE VIRTUAL ASSET SELF-REPORTING LOGIC REPRESENTING INSTRUCTIONS FOR GENERATING TRIGGER EVENT REPORTING DATA INDICATING A DETECTED TRIGGER EVENT OPERATION 707, and the virtual asset self-reporting communications channel creation logic of GENERATE SELF-REPORTING COMMUNICATIONS CHANNEL CREATION LOGIC REPRESENTING INSTRUCTIONS FOR OPENING A SELF-REPORTING COMMUNICATIONS CHANNEL BETWEEN A VIRTUAL ASSET AND THE VIRTUAL ASSET MONITORING SYSTEM OPERATION 709, are provided to each of the one or more self-monitoring, self-reporting, and self-repairing virtual assets of INSTANTIATE A SELF-MONITORING, SELF-REPORTING, AND SELF-REPAIRING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 711.

In one embodiment, at INSTANTIATE A SELF-MONITORING, SELF-REPORTING, AND SELF-REPAIRING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 711 the virtual asset self-monitoring logic, the virtual asset self-reporting logic, and the virtual asset self-reporting communications channel creation logic, are provided to each of the one or more self-monitoring, self-reporting, and self-repairing virtual assets, using one or more self-monitoring, self-reporting, and self-repairing virtual asset creation templates.

In one embodiment, once one or more self-monitoring, self-reporting, and self-repairing virtual assets, are instantiated in a computing environment at INSTANTIATE A SELF-MONITORING, SELF-REPORTING, AND SELF-REPAIRING VIRTUAL ASSET, INCLUDING THE VIRTUAL ASSET SELF-MONITORING LOGIC, THE VIRTUAL ASSET SELF-REPORTING LOGIC AND THE SELF-REPORTING COMMUNICATIONS CHANNEL CREATION LOGIC OPERATION 711, process flow proceeds to USE THE VIRTUAL ASSET SELF-MONITORING LOGIC TO DETECT A TRIGGER EVENT IN THE SELF-MONITORING, SELF-REPORTING, AND SELF-REPAIRING VIRTUAL ASSET OPERATION 713.

In one embodiment, at USE THE VIRTUAL ASSET SELF-MONITORING LOGIC TO DETECT A TRIGGER EVENT IN THE SELF-MONITORING, SELF-REPORTING, AND SELF-REPAIRING VIRTUAL ASSET OPERATION 713, the virtual asset self-monitoring logic provided to the self-monitoring, self-reporting, and self-repairing virtual assets is used to monitor and detect any of the defined trigger events within the self-monitoring, self-reporting, and self-repairing virtual assets.

In one embodiment, at USE THE VIRTUAL ASSET SELF-MONITORING LOGIC TO DETECT A TRIGGER EVENT IN THE SELF-MONITORING, SELF-REPORTING, AND SELF-REPAIRING VIRTUAL ASSET OPERATION 713 the virtual asset self-monitoring logic is used to monitor and detect any of the defined trigger events within the self-monitoring, self-reporting, and self-repairing virtual assets by monitoring primary virtual asset logic and data used by the self-monitoring, self-reporting, and self-repairing virtual assets in the course of their normal operations and the performance of their assigned functions.

In one embodiment, once the virtual asset self-monitoring logic provided to the self-monitoring, self-reporting, and self-repairing virtual assets is used to monitor and detect any of the defined trigger events within the self-monitoring, self-reporting, and self-repairing virtual assets at USE THE VIRTUAL ASSET SELF-MONITORING LOGIC TO DETECT A TRIGGER EVENT IN THE SELF-MONITORING, SELF-REPORTING, AND SELF-REPAIRING VIR- TUAL ASSET OPERATION 713, process flow proceeds to USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 715.

In one embodiment, if one of the defined trigger events is detected within an affected one of the self-monitoring, self-reporting, and self-repairing virtual assets by the virtual asset self-monitoring logic at USE THE VIRTUAL ASSET SELF-MONITORING LOGIC TO DETECT A TRIGGER EVENT IN THE SELF-MONITORING, SELF-REPORTING, AND SELF-REPAIRING VIRTUAL ASSET OPERATION 713, then, at USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 715, detected trigger event data associated with, describing, or representing log data associated with, the detected trigger event is generated by the virtual asset self-reporting logic provided to the affected self-monitoring, self-reporting, and self-repairing virtual asset.

In one embodiment, once detected trigger event data associated with, describing, or representing log data associated with, the detected trigger event is generated by the virtual asset self-reporting logic provided to the affected self-monitoring, self-reporting, and self-repairing virtual asset at USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 715, process flow proceeds to USE THE SELF-REPORTING COMMUNICATIONS CHANNEL CREATION LOGIC TO GENERATE A SELF-REPORTING COMMUNICATIONS CHANNEL BETWEEN THE SELF-MONITORING, SELF-REPORTING, AND SELF-REPAIRING VIRTUAL ASSET AND THE VIRTUAL ASSET MONITORING SYSTEM OPERATION 717.

In one embodiment, once a defined trigger event is detected within the self-monitoring, self-reporting, and self-repairing virtual asset by the virtual asset self-monitoring logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING, SELF-REPORTING, AND SELF-REPAIRING VIRTUAL ASSET AND THE VIRTUAL ASSET MONITORING SYSTEM OPERATION 717, the virtual asset self-reporting communications channel creation logic provided to the self-monitoring, self-reporting, and self-repairing virtual asset, is used to generate a self-reporting communications channel between the self-monitoring, self-reporting, and self-repairing virtual asset and the virtual asset monitoring system.

As noted above, in one embodiment, at USE THE SELF-REPORTING COMMUNICATIONS CHANNEL CREATION LOGIC TO GENERATE A SELF-REPORTING COMMUNICATIONS CHANNEL BETWEEN THE SELF-MONITORING, SELF-REPORTING, AND SELF-REPAIRING VIRTUAL ASSET AND THE VIRTUAL ASSET MONITORING SYSTEM OPERATION 717, the virtual asset self-reporting communications channel creation logic generates a self-reporting communications channel by activating a self-reporting virtual asset self-reporting communications port pre-deployed, and/or implemented by, the virtual asset self-reporting communications channel creation logic.

In one embodiment, the self-reporting communications channel generated by the virtual asset self-reporting communications channel creation logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING, SELF-REPORTING, AND SELF-REPAIRING VIRTUAL ASSET AND THE VIRTUAL ASSET MONITORING SYSTEM OPERATION 717 is a communications channel distinct, and separate from, the various other "normal" communications channels utilized by the self-monitoring, self-reporting, and self-repairing virtual assets, and/or other assets within the computing environment, and/or production environment, associated with the self-monitoring, self-reporting, and self-repairing virtual assets.

Consequently, in one embodiment, the self-reporting communications channel generated by the virtual asset self-reporting communications channel creation logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING, SELF-REPORTING, AND SELF-REPAIRING VIRTUAL ASSET AND THE VIRTUAL ASSET MONITORING SYSTEM OPERATION 717 is not subject to manipulation, and/or termination, by a malicious party that may have taken control of the self-monitoring, self-reporting, and self-repairing virtual asset.

In addition, the self-reporting communications channel generated by the virtual asset self-reporting communications channel creation logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING, SELF-REPORTING, AND SELF-REPAIRING VIRTUAL ASSET AND THE VIRTUAL ASSET MONITORING SYSTEM OPERATION 717 is not dependent on security policy implementation systems and entities outside of the self-monitoring, self-reporting, and self-repairing virtual asset, other than the virtual asset monitoring system.

In one embodiment, once the virtual asset self-reporting communications channel creation logic provided to the self-monitoring, self-reporting, and self-repairing virtual asset, is used to generate a self-reporting communications channel between the self-monitoring, self-reporting, and self-repairing virtual asset and the virtual asset monitoring system at USE THE SELF-REPORTING COMMUNICATIONS CHANNEL CREATION LOGIC TO GENERATE A SELF-REPORTING COMMUNICATIONS CHANNEL BETWEEN THE SELF-MONITORING, SELF-REPORTING, AND SELF-REPAIRING VIRTUAL ASSET AND THE VIRTUAL ASSET MONITORING SYSTEM OPERATION 717, process flow proceeds to USE THE SELF-REPORTING COMMUNICATIONS CHANNEL TO TRANSFER THE TRIGGER EVENT REPORTING DATA FROM THE SELF-MONITORING, SELF-REPORTING, AND SELF-REPAIRING VIRTUAL ASSET TO THE VIRTUAL ASSET MONITORING SYSTEM OPERATION 719.

In one embodiment, at USE THE SELF-REPORTING COMMUNICATIONS CHANNEL TO TRANSFER THE TRIGGER EVENT REPORTING DATA FROM THE SELF-MONITORING, SELF-REPORTING, AND SELF-REPAIRING VIRTUAL ASSET TO THE VIRTUAL ASSET MONITORING SYSTEM OPERATION 719, the detected trigger event data generated by the virtual asset self-reporting logic at USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 715 is transferred from the self-monitoring, self-reporting, and self-repairing virtual asset to the virtual asset monitoring system of PROVIDE A VIRTUAL ASSET MONITORING SYSTEM OPERATION 703 using the virtual asset self-reporting communications channel generated by the virtual asset self-reporting communications channel creation logic at USE THE SELF-REPORTING COMMUNICATIONS CHANNEL CREATION LOGIC TO GENERATE A SELF-REPORTING COMMUNICATIONS CHANNEL BETWEEN THE SELF-MONITORING, SELF-REPORTING, AND SELF-REPAIRING VIRTUAL ASSET AND THE VIRTUAL ASSET MONITORING SYSTEM OPERATION 717.

In one embodiment, once the detected trigger event data generated by the virtual asset self-reporting logic at USE THE VIRTUAL ASSET SELF-REPORTING LOGIC TO GENERATE TRIGGER EVENT REPORTING DATA INDICATING THE DETECTED TRIGGER EVENT HAS BEEN DETECTED OPERATION 715 is transferred from the self-monitoring, self-reporting, and self-repairing virtual asset to the virtual asset monitoring system of PROVIDE A VIRTUAL ASSET MONITORING SYSTEM OPERATION 703 using the virtual asset self-reporting communications channel generated by the virtual asset self-reporting communications channel creation logic at USE THE SELF-REPORTING COMMUNICATIONS CHANNEL TO TRANSFER THE TRIGGER EVENT REPORTING DATA FROM THE SELF-MONITORING, SELF-REPORTING, AND SELF-REPAIRING VIRTUAL ASSET TO THE VIRTUAL ASSET MONITORING SYSTEM OPERATION 719, process flow proceeds to GENERATE RESPONSIVE ACTION IMPLEMENTATION DATA IMPLEMENTING ONE OR MORE RESPONSIVE ACTIONS TO THE DETECTED TRIGGER EVENT OPERATION 721.

In one embodiment, at GENERATE RESPONSIVE ACTION IMPLEMENTATION DATA IMPLEMENTING ONE OR MORE RESPONSIVE ACTIONS TO THE DETECTED TRIGGER EVENT OPERATION 721, analysis is performed at the virtual asset monitoring system and the appropriate, or mapped, responsive action implementation data associated with the received trigger event data is identified.

In one embodiment, the analysis performed at GENERATE RESPONSIVE ACTION IMPLEMENTATION DATA IMPLEMENTING ONE OR MORE RESPONSIVE ACTIONS TO THE DETECTED TRIGGER EVENT OPERATION 721 includes mapping the detected trigger event data received to associated responsive action implementation data representing instructions for implementing one or more responsive actions to the trigger event indicated in the trigger event reporting data.

In various embodiments, the one or more responsive actions to the trigger event indicated in the trigger event reporting data represented in the associated responsive action implementation data includes data and instructions for, but not limited to, any of the following operations: ignoring the detected trigger event; requesting that the detected trigger event data no longer be reported; performing one or more scans on all, or part, of the logic and data contained and/or processed by the self-monitoring, self-reporting, and self-repairing virtual assets, in one embodiment to attempt to identify malicious code or activity; obtaining data from the self-monitoring, self-reporting, and self-repairing virtual assets; destroying data within the self-monitoring, self-reporting, and self-repairing virtual assets; directing a transfer of data from within the self-monitoring, self-reporting, and self-repairing virtual assets to a location outside the self-monitoring, self-reporting, and self-repairing virtual assets, e.g., pulling data from the self-monitoring, self-reporting, and self-repairing virtual assets prior to destroying the self-monitoring, self-reporting, and self-repairing virtual assets; closing down one or more communications channels used by the self-monitoring, self-reporting, and self-repairing virtual assets; shutting down, or off, one or more capabilities of the self-monitoring, self-reporting, and self-repairing virtual assets; aborting one or more operations being performed by the self-monitoring, self-reporting, and self-repairing virtual assets; destroying the self-monitoring, self-reporting, and self-repairing virtual assets; and/or generating and/or transferring incorrect and/or deceptive data from the self-monitoring, self-reporting, and self-repairing virtual assets to a location outside the self-monitoring, self-reporting, and self-repairing virtual asset, such as a location or source associated with a malicious party; and/or any other desired responsive actions, or combination of responsive actions, as discussed herein, and/or as known in the art at the time of filing, and/or as developed/become available after the time of filing.

In one embodiment, once analysis is performed at the virtual asset monitoring system and the appropriate, or mapped, responsive action implementation data associated with the received trigger event data is identified at GENERATE RESPONSIVE ACTION IMPLEMENTATION DATA IMPLEMENTING ONE OR MORE RESPONSIVE ACTIONS TO THE DETECTED TRIGGER EVENT OPERATION 721, process flow proceeds to TRANSFER THE RESPONSIVE ACTION IMPLEMENTATION DATA FROM THE VIRTUAL ASSET MONITORING SYSTEM TO THE SELF-MONITORING, SELF-REPORTING, AND SELF-REPAIRING VIRTUAL ASSET OPERATION 723.

In one embodiment, at TRANSFER THE RESPONSIVE ACTION IMPLEMENTATION DATA FROM THE VIRTUAL ASSET MONITORING SYSTEM TO THE SELF-MONITORING, SELF-REPORTING, AND SELF-REPAIRING VIRTUAL ASSET OPERATION 723, the appropriate, or mapped, responsive action implementation data associated with the received trigger event data of GENERATE RESPONSIVE ACTION IMPLEMENTATION DATA IMPLEMENTING ONE OR MORE RESPONSIVE ACTIONS TO THE DETECTED TRIGGER EVENT OPERATION 721 is provided to the self-monitoring, self-reporting, and self-repairing virtual asset.

In one embodiment, at TRANSFER THE RESPONSIVE ACTION IMPLEMENTATION DATA FROM THE VIRTUAL ASSET MONITORING SYSTEM TO THE SELF-MONITORING, SELF-REPORTING, AND SELF-REPAIRING VIRTUAL ASSET OPERATION 723, the appropriate, or mapped, responsive action implementation data associated with the received trigger event data of GENERATE RESPONSIVE ACTION IMPLEMENTATION DATA IMPLEMENTING ONE OR MORE RESPONSIVE ACTIONS TO THE DETECTED TRIGGER EVENT OPERATION 721 is provided to the self-monitoring, self-reporting, and self-repairing virtual asset using the virtual asset self-reporting communication channel, and the virtual asset self-reporting communications port, generated by the virtual asset self-reporting communications channel creation logic provided to the self-monitoring, self-reporting, and self-repairing virtual asset.

In one embodiment, once the appropriate, or mapped, responsive action implementation data associated with the received trigger event data of GENERATE RESPONSIVE ACTION IMPLEMENTATION DATA IMPLEMENTING ONE OR MORE RESPONSIVE ACTIONS TO THE DETECTED TRIGGER EVENT OPERATION 721 is provided to the self-monitoring, self-reporting, and self-repairing virtual asset at TRANSFER THE RESPONSIVE ACTION IMPLEMENTATION DATA FROM THE VIRTUAL ASSET MONITORING SYSTEM TO THE SELF-MONITORING, SELF-REPORTING, AND SELF-REPAIRING VIRTUAL ASSET OPERATION 723, process flow proceeds to USE THE RESPONSIVE ACTION IMPLEMENTATION DATA TO IMPLEMENT THE ONE OR MORE RESPONSIVE ACTIONS TO THE TRIGGER EVENT INDICATED IN THE TRIGGER EVENT REPORTING DATA OPERATION 725.

In one embodiment, at USE THE RESPONSIVE ACTION IMPLEMENTATION DATA TO IMPLEMENT THE ONE OR MORE RESPONSIVE ACTIONS TO THE TRIGGER EVENT INDICATED IN THE TRIGGER EVENT REPORTING DATA OPERATION 725, the appropriate, or mapped, responsive action implementation data is used by the self-monitoring, self-reporting, and self-repairing virtual asset to implement the responsive action associated with the responsive action implementation data.

As noted above, in various embodiments the responsive actions associated with the responsive action implementation data implemented at USE THE RESPONSIVE ACTION IMPLEMENTATION DATA TO IMPLEMENT THE ONE OR MORE RESPONSIVE ACTIONS TO THE TRIGGER EVENT INDICATED IN THE TRIGGER EVENT REPORTING DATA OPERATION 725 can include, but are not limited to, any one or more of, ignoring the detected trigger data; requesting the detected trigger data no longer be sent; performing a scan of selected data within the self-monitoring, self-reporting, and self-repairing virtual asset; obtaining data from the self-monitoring, self-reporting, and self-repairing virtual asset; directing a transfer of data from within the self-monitoring, self-reporting, and self-repairing virtual asset to a location outside the self-monitoring, self-reporting, and self-repairing virtual asset; closing down one or more communications channels used by the self-monitoring, self-reporting, and self-repairing virtual asset; shutting down one or more capabilities of the self-monitoring, self-reporting, and self-repairing virtual asset; aborting one or more operations performed by the self-monitoring, self-reporting, and self-repairing virtual asset; destroying the self-monitoring, self-reporting, and self-repairing virtual asset; generating and/or transferring incorrect and/or deceptive data from the self-monitoring, self-reporting, and self-repairing virtual asset to a location outside the self-monitoring, self-reporting, and self-repairing virtual asset associated with a malicious entity; and/or any other desired responsive actions, or combination of responsive actions, as discussed herein, and/or as known in the art at the time of filing, and/or as developed/become available after the time of filing.

In one embodiment, once the appropriate, or mapped, responsive action implementation data is used by the self-monitoring, self-reporting, and self-repairing virtual asset to implement the responsive action associated with the responsive action implementation data at USE THE RESPONSIVE ACTION IMPLEMENTATION DATA TO IMPLEMENT THE ONE OR MORE RESPONSIVE ACTIONS TO THE TRIGGER EVENT INDICATED IN THE TRIGGER EVENT REPORTING DATA OPERATION 725, process flow proceeds to EXIT OPERATION 730.

In one embodiment, at EXIT OPERATION 730 process 700 for providing self-monitoring, self-reporting, and self-repairing virtual assets is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "aggregating," "alerting," "applying," "analyzing," "associating," "calculating," "capturing," "categorizing," "classifying," "comparing," "creating," "defining," "detecting," "determining," "distributing," "encrypting," "extracting," "filtering," "forwarding," "generating," "identifying," "implementing," "informing," "monitoring," "obtaining," "posting," "processing," "providing," "receiving," "requesting," "saving,"

"sending," "storing," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system comprising:
one or more processors; and
at least one memory coupled to the one or more processors, the at least one memory having stored therein instructions which when executed by any set of the one or more processors, perform a process including:
providing a cloud computing environment, the cloud computing environment including a virtual asset instantiated and executing within the cloud computing environment by a computing processor, the virtual asset being a component of a network switch, the one or more virtual assets comprising, at instantiation:
virtual asset self-monitoring logic, the virtual asset self-monitoring logic including data and instructions for detecting one or more trigger events of the virtual asset, the trigger events including deviations from pre-established baseline traffic patterns, the virtual asset self monitoring logic further including data and instructions to detect, as a trigger event, a response to a customer request being directed to a destination that is not the customer location of record and further including data and instructions to detect, as a trigger event, an internal elapsed time of defined critical operations changing to a time outside a defined range and further including data and instructions to detect, as a trigger event, an access pattern indicating that messages arrive too infrequently;
virtual asset self-reporting logic, the virtual asset self-reporting logic including data and instructions for generating trigger event reporting data if one of the one or more trigger events is detected in the virtual asset by the virtual asset self-monitoring logic;
self-reporting communications channel creation logic, the self-reporting communications channel creation logic including data and instructions for opening a self-reporting communications channel between the virtual asset and a virtual asset monitoring system responsive to one of the one or more trigger events being detected in the virtual asset by the virtual asset self-monitoring logic; and
trigger event reporting data transfer logic, the trigger event reporting data transfer logic including data and instructions for transferring the trigger event reporting data from the virtual asset to the virtual asset monitoring system when one of the one or more trigger events is detected in the virtual asset by the virtual asset self-monitoring logic;
using the virtual asset self-monitoring logic to monitor at least a portion of message traffic sent to the virtual asset to detect any message meeting one or more initial trigger parameters;
classifying one or more portions of the detected at least one message as being suspect, the classified portions of the detected message satisfying the one or more pre-defined trigger parameters;
determining, based on the satisfied one or more trigger parameters, which of a plurality of threat scoring services to analyze the classified one or more suspect portions, each of the threat scoring services configured to analyze specific trigger parameters;
transferring the one or more suspect portions to the determined threat scoring services;
assigning, by the determined threat scoring services, threat scores to the suspect message at least partially based on a potential impact of the suspect message's potential security threat on the virtual asset, wherein the assigned threat scores are higher if the potential impact includes compromising financial data of users, and the assigned threat score is lower if the potential security threat is expected to cause a minor decrease in network connectivity speeds;
enabling, by providing the threat score to the virtual asset, the virtual asset to secure against the suspect message;
for each suspect message, generating suspect message copy data representing a copy of at least a portion of the suspect message;

transferring the suspect message copy data to one or more analysis systems for further analysis;

determining, through analysis by the one or more analysis systems, an identity of a specific recipient of the detected at least one message;

determining one or more second trigger parameters having criteria defining similar messages to the detected at least one message;

updating the initial trigger parameters to include the one or more second trigger parameters; and detecting at least one suspect message using the updated initial trigger parameters.

2. The system of claim 1 further comprising providing the virtual assets, at instantiation:

responsive action implementation data receipt logic, the responsive action implementation data receipt logic including data and instructions for receiving responsive action implementation data from the virtual asset monitoring system; and responsive action implementation logic, the responsive action implementation logic including data and instructions for implementing the one or more responsive actions indicated in the responsive action implementation data received by the responsive action implementation data receipt logic.

3. The system of claim 1, wherein at least one of the one or more trigger events is selected from the group of trigger events consisting of:

a network message from a virtual asset directed to a location known to be associated with malicious entities;

a frequency of outgoing network messages changing level above a defined threshold level;

a virtual asset receiving a high-frequency of login attempts that fail;

a size of the parameters sent into a virtual asset being outside a defined range;

a size of outgoing network messages being outside a defined range;

a total amount of data in any one communication connection of a virtual asset exceeding a defined maximum; and a request to a virtual asset coming in from a location known to be associated with malicious entities.

4. The system of claim 1 wherein the suspect message copy data associated with a given suspect message is transferred to a specific analysis system of the one or more analysis systems for further analysis based, at least in part, on the specific trigger parameter of the one or more trigger parameters detected in the suspect message.

5. The system of claim 1 wherein if, as a result of the further analysis at the one or more analysis systems, the suspect message is determined to be an intrusion related message, one or more protective actions are automatically implemented.

6. The system of claim 1, wherein the virtual asset is a virtual asset selected from the group of the virtual assets consisting of:

a virtual machine;
a virtual server;
a database or data store;
an instance in a cloud environment;
a cloud environment access system;
part of a mobile device;
part of a remote sensor;
part of a server computing system; and
part of a desktop computing system.

7. The system of claim 1, wherein defining one or more trigger parameters includes retrieving trigger parameters from an information management security vendor.

8. The system of claim 1, wherein assigning the threat score includes assigning a number of a predetermined range of numbers to the suspect message, wherein a higher number is associated with a higher security priority.

9. The system of claim 1, wherein providing the threat score includes delaying transmission of the threat score based on a priority of the suspect message.

10. The system of claim 1, wherein assigning the threat score to the suspect message includes evaluating a service configuration to determine a vulnerability of the virtual asset.

11. The system of claim 10, wherein the service configuration includes hardware characteristics of a host computing system of the virtual asset, and a type of information stored and provided by the virtual asset.

12. A computing system implemented method, which when executed by one or more computing processors, performs process operations comprising:

providing a cloud computing environment, the cloud computing environment including one or more virtual assets instantiated within the cloud computing environment, the one or more virtual assets being a component of a network switch, the one or more virtual assets comprising, at instantiation:

virtual asset self-monitoring logic including data and instructions for detecting one or more trigger events of the virtual asset, the trigger events including deviations from pre-established baseline traffic patterns, the virtual asset self monitoring logic further including data and instructions to detect, as a trigger event, a response to a customer request being directed to a destination that is not the customer location of record and further including data and instructions to detect, as a trigger event, an internal elapsed time of defined critical operations changing to a time outside a defined range and further including data and instructions to detect, as a trigger event, an access pattern indicating that messages arrive too infrequently;

virtual asset self-reporting logic including data and instructions for generating trigger event reporting data if one of the one or more trigger events is detected in the virtual asset by the virtual asset self-monitoring logic;

self-reporting communications channel creation logic including data and instructions for opening a self-reporting communications channel between the virtual asset and a virtual asset monitoring system responsive to one of the one or more trigger events being detected in the virtual asset by the virtual asset self-monitoring logic; and trigger event reporting data transfer logic including data and instructions for transferring the trigger event reporting data from the virtual asset to the virtual asset monitoring system when one of the one or more trigger events is detected in the virtual asset by the virtual asset self-monitoring logic;

using the virtual asset self-monitoring logic to monitor at least a portion of message traffic sent to the virtual asset to detect any message meeting one or more initial trigger parameters;

classifying one or more portions of a detected message as being suspect, the classified portions of the detected message satisfying the one or more initial trigger parameters;

determining, based on the satisfied one or more trigger parameters, which of a plurality of threat scoring services to analyze the classified one or more suspect portions, each of the threat scoring services configured to analyze specific trigger parameters;

transferring the one or more suspect portions to the determined threat scoring services;

assigning, by the determined threat scoring services, threat scores to the suspect message at least partially based on a potential impact of the suspect message's potential security threat to the virtual asset, wherein the assigned threat scores are higher if the potential impact includes compromising financial data of users, and the assigned threat score is lower if the potential security threat is expected to cause a minor decrease in network connectivity speeds;

enabling, by providing the threat score to the virtual asset, the virtual asset to secure against the suspect message;

for each suspect message, generating suspect message copy data representing a copy of at least a portion of the suspect message;

transferring the suspect message copy data to one or more analysis systems for further analysis;

determining, through analysis by the one or more analysis systems, an identity of a specific recipient of the detected at least one message;

determining one or more second trigger parameters having criteria defining similar messages to the detected at least one message;

updating the initial trigger parameters to include the one or more second trigger parameters; and detecting at least one suspect message using the updated initial trigger parameters.

13. The computing system implemented method of claim 12 further comprising providing the virtual assets, at instantiation:

responsive action implementation data receipt logic, the responsive action implementation data receipt logic including data and instructions for receiving responsive action implementation data from the virtual asset monitoring system; and responsive action implementation logic, the responsive action implementation logic including data and instructions for implementing the one or more responsive actions indicated in the responsive action implementation data received by the responsive action implementation data receipt logic.

14. The computing system implemented method of claim 12 wherein at least one of the one or more trigger events is selected from the group of trigger events consisting of:

a network message from a virtual asset directed to a location known to be associated with malicious entities;

a frequency of outgoing network messages changing level above a defined threshold level;

a virtual asset receiving a high-frequency of login attempts that fail;

a size of the parameters sent into a virtual asset being outside a defined range;

a size of outgoing network messages being outside a defined range;

a total amount of data in any one communication connection of a virtual asset exceeding a defined maximum; and a request to a virtual asset coming in from a location known to be associated with malicious entities.

15. The computing system implemented method of claim 12 wherein the suspect message copy data associated with a given suspect message is transferred to a specific analysis system of the one or more analysis systems for further analysis based, at least in part, on the specific trigger parameter of the one or more trigger parameters detected in the suspect message.

16. The computing system implemented method of claim 12 wherein if, as a result of the further analysis at the one or more analysis systems, the suspect message is determined to be an intrusion related message, one or more protective actions are automatically implemented.

17. The computing system implemented method of claim 12, wherein the virtual asset is a virtual asset selected from the group of the virtual assets consisting of:

a virtual machine;
a virtual server;
a database or data store;
an instance in a cloud environment;
a cloud environment access system;
part of a mobile device;
part of a remote sensor;
part of a server computing system; and
part of a desktop computing system.

18. The computing system implemented method of claim 12, wherein defining one or more trigger parameters includes retrieving trigger parameters from an information management security vendor.

19. The computing system implemented method of claim 12, wherein assigning the threat score includes assigning a number of a predetermined range of numbers to the suspect message, wherein a higher number is associated with a higher security priority.

20. The computing system implemented method of claim 12, wherein providing the threat score includes delaying transmission of the threat score based on a priority of the suspect message.

21. The computing system implemented method of claim 12, wherein assigning the threat score to the suspect message includes evaluating a service configuration to determine a vulnerability of the virtual asset.

22. The computing system implemented method of claim 21, wherein the service configuration includes hardware characteristics of a host computing system of the virtual asset, and a type of information stored and provided by the virtual asset.

* * * * *